United States Patent [19]
Shimomaki et al.

[11] Patent Number: 5,753,937
[45] Date of Patent: May 19, 1998

[54] COLOR LIQUID CRYSTAL DISPLAY DEVICE HAVING A SEMITRANSPARENT LAYER ON THE INNER SURFACE OF ONE OF THE SUBSTRATES

[75] Inventors: Shinichi Shimomaki, Akishima; Tetsushi Yoshida, Kanagawa-ken, both of Japan

[73] Assignee: Casio Computer Co., Ltd., Tokyo, Japan

[21] Appl. No.: 455,898

[22] Filed: May 31, 1995

[30] Foreign Application Priority Data

| | | | |
|---|---|---|---|
| May 31, 1994 | [JP] | Japan | 6-118256 |
| Jun. 7, 1994 | [JP] | Japan | 6-125234 |
| Jun. 7, 1994 | [JP] | Japan | 6-125235 |
| Jun. 7, 1994 | [JP] | Japan | 6-125236 |
| Jun. 8, 1994 | [JP] | Japan | 6-126361 |
| Jun. 9, 1994 | [JP] | Japan | 6-127567 |

[51] Int. Cl.$^6$ .................. A01C 29/04; A01C 31/036
[52] U.S. Cl. .................. 257/59; 257/72; 349/67; 349/80; 349/96
[58] Field of Search .................. 359/37, 60, 63, 359/70, 73, 75, 93; 257/59, 72; 349/67, 80, 96

[56] References Cited

U.S. PATENT DOCUMENTS

| | | | |
|---|---|---|---|
| 4,367,924 | 1/1983 | Clark et al. | 357/350 |
| 4,688,900 | 8/1987 | Duane et al. | 359/52 |
| 4,741,600 | 5/1988 | Pirs et al. | 359/70 |
| 4,927,240 | 5/1990 | Stolov et al. | 359/63 |
| 5,066,110 | 11/1991 | Mizushima et al. | 359/54 |
| 5,227,903 | 7/1993 | Miyazawa et al. | 359/73 |
| 5,274,483 | 12/1993 | Itoh | 359/54 |
| 5,398,134 | 3/1995 | Ikegaya | 359/634 |
| 5,426,526 | 6/1995 | Yamamoto et al. | 359/51 |
| 5,463,481 | 10/1995 | Yamamura | 359/53 |
| 5,508,134 | 4/1996 | Shirai | 359/67 |

*Primary Examiner*—Tom Thomas
*Assistant Examiner*—Fetsum Abraham
*Attorney, Agent, or Firm*—Frishauf, Holtz, Goodman, Langer & Chick

[57] ABSTRACT

A color liquid crystal display device includes a front substrate having a surface on which a plurality of pixel electrodes are arranged in the form of a matrix, and two-terminal nonlinear resistor elements are arranged to correspond to the pixel electrodes. An aligning film covers the pixel electrodes and the nonlinear resistor elements. A rear substrate opposes the front substrate and has an inner surface on which counter electrodes are arranged to oppose the pixel electrodes, for forming a plurality of pixels. An aligning film covers the pixel and counter electrodes. A liquid crystal layer is sandwiched between the front and rear substrates and has an initial aligned state in which liquid crystal molecules are aligned in a predetermined direction by the aligning films. A polarizing member is arranged on an outer side of the front substrate such that a polarization axis of the polarizing member crosses an aligning direction of liquid crystal molecules adjacent to the aligning film on the front substrate side at an angle other than a right angle. A reflecting member is arranged on the rear substrate side. The two-terminal nonlinear resistor elements have one terminal connected to the pixel electrode, and another terminal receiving a signal voltage.

9 Claims, 28 Drawing Sheets

COLOR LIQUID CRYSTAL DISPLAY DEVICE HAVING A SEMITRANSPARENT LAYER ON THE INNER SURFACE OF ONE OF THE SUBSTRATES

BACKGROUND OF THE INVENTION

1. Field of the Invention

The present invention relates to a reflection type color liquid crystal display device which uses an active matrix liquid crystal cell using two-terminal nonlinear resistor elements as active elements and displays a plurality of colors with the birefringence effect of a liquid crystal layer.

2. Description of the Related Art

As an active matrix liquid crystal display device, a twisted nematic liquid crystal display device (TN liquid crystal display device) in which thin-film transistors are used as active elements and a liquid crystal layer sealed between substrates is twisted/aligned at an angle of almost 90° is known.

An active matrix liquid crystal display device of a TN scheme comprises a liquid crystal cell having liquid crystal molecules twisted/aligned at a twist angle of almost 90°, and a pair of polarizing plates arranged on the front and rear surface sides of the liquid crystal cell. In a general active matrix liquid crystal display device, a pair of polarizing plates are arranged such that their transmission axes are parallel to each other, and the transmission axes are almost parallel to the aligning direction of the liquid crystal molecule on one substrate of the liquid crystal cell.

In the active matrix liquid crystal cell using the nonlinear resistor elements as active elements, a liquid crystal is sandwiched between a pair of transparent substrates, a plurality of transparent pixel electrodes and a plurality of active elements corresponding to the respective pixel electrodes are arranged on the inner surface of one of the pair of substrates, and a transparent counter electrode is formed on the inner surface of the other substrate. The aligning directions of the liquid crystal molecules are restricted by aligning films respectively formed on the electrode formation surfaces of the two substrates, and the liquid crystal molecules are twisted/aligned between the substrates at a twist angle of almost 90°. Note that a nematic liquid crystal having a positive dielectric anisotropy is used as the above liquid crystal.

According to the liquid crystal display device of the TN scheme, external light is linearly polarized by the polarizing action of one polarizing plate first and is then incident on the liquid crystal cell, and emergence of light passing through the liquid crystal cell is controlled by the analyzing action of the other polarizing plate, thereby performing a display operation. While no ON voltage is applied between the electrodes on the two substrates of the liquid crystal cell, i.e., the liquid crystal molecules are twisted/aligned, linearly polarized light incident on the liquid crystal cell emerges from the liquid crystal cell after the polarization direction of the linearly polarized light is shifted by almost 90°. This linearly polarized light is absorbed by or transmitted through the other polarizing plate, resulting in a dark or bright display.

When an ON voltage is applied between the electrodes of the liquid crystal cell, the liquid crystal molecules are aligned almost vertically with respect the substrate surfaces. As a result, linearly polarized light incident on the liquid crystal cell emerges from the liquid crystal cell without being polarized. This linearly polarized light is transmitted through or absorbed by the other polarizing plate, resulting in a bright or dark display.

Liquid crystal display devices include a transmission type device and a reflection type device having a reflecting plate arranged behind the display device. In a reflection type liquid crystal display device, light incident from the front surface side passes through the polarizing plate on the front surface side, the liquid crystal cell, and the polarizing plate on the rear surface side and is reflected by the above reflecting plate. The reflected light passes through the polarizing plate on the rear surface side, the liquid crystal cell, and the polarizing plate on the front surface side and emerges from the device.

Some of the active matrix liquid crystal display devices of the above TN scheme are designed to display multicolor images. In a color liquid crystal display device, filters of a plurality of colors, e.g., red, green, and blue color filters, are arranged on one substrate of the above liquid crystal cell in correspondence with each pixel electrode.

The above conventional color liquid crystal display device is designed to color light by using color filters. For this reason, in a reflection type liquid crystal display device, the display is so dark that it cannot be visually recognized.

Such a dark display is caused by absorption of light in the color filters. Each color filter absorbs not only light outside a wavelength range corresponding to the color of the filter but also light in the wavelength range at a considerably high absorption index. For this reason, light colored by the color filter is much smaller in light amount than light which falls within the wavelength range and is to be incident on the color filter.

In a transmission liquid crystal display device, a display can be brighten by using a backlight emitting large amount of light. However, in a reflection type liquid crystal display device using external light such as natural light or indoor illumination light, an incident light amount is limited to a predetermined value. In addition, while light colored by color filters is reflected by a rear reflecting plate and emerges from the front surface side of the liquid crystal display device, the light passes through the color filters. For this reason, an amount of light absorbed by the color filters further increases, and the display is so dark that it cannot be visually recognized.

In the reflection type liquid crystal display device described above, the display is further darkened when external light is weak, and the display cannot be visually recognized at all when no external light is present.

In addition, as described above, in the active matrix liquid crystal display device using thin-film transistors, active matrix elements have a complex structure, and a method of manufacturing the active matrix elements is complex. For this reason, the production yield is low, and the reflection type liquid crystal display device is disadvantageously manufactured at high cost.

SUMMARY OF THE INVENTION

It is the primary object of the present invention to provide a reflection type liquid crystal display device capable of performing a bright color display operation without using a color filter.

It is another object of the present invention to provide a reflection type color liquid crystal display device which can be easily manufactured and performs a bright color display operation.

It is still another object of the present invention to provide a color liquid crystal display device which can perform a bright color display operation without using a color filter and has a reflection color display function of performing a bright color display operation using external light and a transmission type color display function of performing a color display operation using light from a built-in light source.

In order to achieve the above objects, according to the first aspect of the present invention, there is provided a color liquid crystal display device comprising: a first substrate having a surface on which a plurality of pixel electrodes arranged in the form of a matrix, two-terminal nonlinear resistor elements arranged to correspond to the pixel electrodes and each having one terminal connected to a corresponding one of the pixel electrodes and the other terminal applied with a signal voltage, and a first aligning film covering the pixel electrodes and the nonlinear resistor elements are arranged; a second substrate arranged to oppose the first substrate and having an inner surface on which counter electrodes, arranged to oppose the plurality of pixel electrodes, for forming a plurality of pixels in areas opposing the pixel electrodes and a second aligning film covering the pixel and counter electrodes are arranged; a liquid crystal layer sandwiched between the first and second substrates and having an initial aligned state in which liquid crystal molecules are aligned in a predetermined direction by the first and second aligning films; at least one polarizing member arranged on an outer side of at least a light incident substrate of the first and second substrates such that a polarization axis of the polarizing member crosses an aligning direction of liquid crystal molecules adjacent to the first or second aligning film on the substrate side at an angle other than a right angle; and a reflecting member, arranged on a substrate side opposing the light incident substrate of the first and second substrates, for reflecting light incident from the polarizing member and transmitted through the liquid crystal layer.

In the liquid crystal display device of the present invention, as the two-terminal nonlinear resistor element, an MIM element having two conductive films and a thin insulating layer interposed between the two conductive films, a diode formed by a thin film, or the like is used. One conductive film of the two-terminal element is connected to the pixel electrode, and the other conductive film is applied with the signal voltage. The reflecting member is formed on the inner surface side of one of the first and second substrates or the outer surface side of each of the first and second substrates. When the reflecting member is formed on the inner surface of one of the first and second substrates, the reflecting member is constituted such that a pixel or counter electrode arranged on the first or second substrate is formed by a metal film, and this electrode can also have the function of the reflecting member. In this case, a light-scattering film for scattering transmitted light is preferably arranged on the surface of a polarizing member on an exit. In the liquid crystal display device, a light-shielding member for preventing leakage of light between the plurality of pixels is arranged on the inner surface side of one of the first and second substrates, or a retardation plate is arranged between the light incident substrate and the polarizing member adjacent to the substrate such that the direction of the optical axis of the retardation plate crosses the direction of the optical axis of the polarizing member at an angle other than a right angle. In addition, as the polarizing member, only one polarizing member may be arranged only on the outer side of the light incident substrate.

According to the color liquid crystal display device of the present invention, light incident from the front substrate side of the liquid crystal display device is polarized into linearly polarized light by the polarizing action of the polarizing plate arranged on the front surface side, light passing through the liquid crystal cell is reflected by the reflecting member formed on the inner surface of the substrate, transmitted through the liquid crystal cell again, and incident on the polarizing plate arranged on the front surface side, and the transmitted light is controlled by the analyzing action of the polarizing plate. Otherwise, light polarized into linearly polarized light by being incident on the front polarizing plate from the front substrate side is incident on the polarizing plate arranged on the rear surface side, and the transmitted light is controlled by the analyzing action of the rear polarizing plate. Thereafter, the light is reflected by the reflecting member and transmitted through the rear polarizing plate and the liquid crystal cell again to emerge from the front surface side of the liquid crystal display device.

In this liquid crystal display device, the transmission axis of the front polarizing plate is obliquely shifted with respect to a liquid crystal molecule aligning direction on the front substrate of the liquid crystal cell. For this reason, while the linearly polarized light incident through the front polarizing plate passes through the liquid crystal cell, the linearly polarized light is polarized by the birefringence effect of the liquid crystal layer into elliptically polarized light components whose polarized states are different from each other at respective wavelengths. Of the elliptically polarized light components, a light component transmitted through the rear polarizing plate emerges from the rear polarizing plate. The exit light become colored light. The colored light is reflected by the reflecting plate and emerges from the front surface side of the liquid crystal display device.

More specifically, in this liquid crystal display device, light is colored using the birefringence effect of the liquid crystal cell and the polarizing/analyzing actions of the pair of polarizing plates without using a color filter. Although the liquid crystal display device is of a reflection type, a bright color display can be obtained by increasing the transmittance for light.

Furthermore, in the liquid crystal display device, the aligned state of the liquid crystal molecules is changed in accordance with the magnitude of a voltage applied to the liquid crystal layer of the liquid crystal cell, and the birefringence effect of the liquid crystal cell changes accordingly. For this reason, the color of the colored light can be changed by controlling the voltage applied to the liquid crystal cell. Therefore, a plurality of colors can be displayed by one pixel.

In a liquid crystal display device having a retardation plate, incident light receives the birefringence effects of the retardation plate and a liquid crystal cell and is polarized into elliptically polarized light components whose polarized states are different from each other at respective wavelengths. Since the elliptically polarized light components are incident on a rear polarizing plate, colored light having a vivid color can be obtained.

In addition, in the color liquid crystal display device of the present invention, two-terminal nonlinear resistor elements are used as active elements, and the two-terminal nonlinear resistor elements have simple structure and can be easily manufactured. For this reason, an yield of production increases, and the two-terminal nonlinear resistor elements can be manufactured at low cost.

According to the second aspect of the present invention, there is provided a color liquid crystal display device comprising: a first substrate having a surface on which a plurality of pixel electrodes arranged in the form of a matrix, two-terminal nonlinear resistor elements arranged to correspond to the pixel electrodes and each having one terminal connected to a corresponding one of the pixel electrodes and the other terminal applied with a signal voltage, and a first aligning film covering the pixel electrodes and the nonlinear resistor elements are arranged; a second substrate arranged to oppose the first substrate and having an inner surface on which counter electrodes, arranged to oppose the plurality of pixel electrodes, for forming a plurality of pixels in areas opposing the pixel electrodes and a second aligning film covering the pixel and counter electrodes are arranged; a liquid crystal layer sandwiched between the first and second substrates and having an initial aligned state in which liquid crystal molecules are aligned in a predetermined direction by the first and second aligning films; a first polarizing member arranged on an outer side of at least a light incident substrate of the first and second substrates such that a polarization axis of the first polarizing member crosses an aligning direction of liquid crystal molecules adjacent to the first or second aligning film on the substrate side at an angle other than a right angle; a semitransparent reflecting member, arranged on a substrate side opposing the light incident substrate of the first and second substrates, for reflecting part of light incident from the first polarizing member and transmitted through the liquid crystal layer and causing another part of the incident light to transmit the semitransparent reflecting member; and a second polarizing member arranged on an outer side of the reflecting member.

In the liquid crystal display device of the present invention, as the two-terminal nonlinear resistor element, an MIM element having two conductive films and a thin insulating layer interposed between the two conductive films, a diode formed by a thin film, or the like is used. One conductive film of the two-terminal element is connected to the pixel electrode, and the other conductive film is applied with the signal voltage. The semitransparent reflecting member is formed by a metal film in which a large number of small light-transmitting holes are formed, and the semitransparent reflecting member is formed on the inner surface side of one of the first and second substrates. When the plurality of pixel electrodes or the plurality of counter electrodes are formed by a metal film in which a large number of small light-transmitting holes are formed and have a function of the semitransparent reflecting member, the counter or pixel electrode is formed by a transparent electrode. In this case, a light-scattering film serving to scatter light transmitted therethrough is desirably formed on the front surface of the first polarizing member on an exit side. In this liquid crystal display device, a first optical path in which light incident from the second substrate is transmitted through the liquid crystal layer, reflected by the pixel electrodes to return, and transmitted through the liquid crystal layer again to emerge from the second substrate and a second optical path in which light incident from the first substrate is transmitted through the pixel electrodes and the liquid crystal layer to emerge from the second substrate are formed.

In addition, in the liquid crystal display device, light-shielding members for preventing leakage of light between the plurality of pixels are arranged on the inner surface side of one of the first and second substrates, or a retardation plate may be arranged between the light incident substrate and the polarizing member adjacent to the light incident substrate such that the direction of the optical axis of the retardation plate crosses the direction of the optical axis of the polarizing member at an angle other than a right angle.

In a bright place where an amount of external light is large, the liquid crystal display device of the present invention performs a reflection type display operation using the external light. In this case, external light incident on the liquid crystal display device from its front surface side is linearly polarized by the polarizing action of the first polarizing plate arranged on the front surface side of the liquid crystal cell, and the linearly polarized light is incident on the liquid crystal cell. At the same time, light transmitted through the liquid crystal layer is incident on the semitransparent reflecting films arranged on the inner surface of the rear substrate of the liquid crystal cell, and light reflected by the semitransparent reflecting films is transmitted through the liquid crystal layer again to be incident on the first polarizing plate. The light transmitted through the polarizing plate emerges as image light from the front surface side of the liquid crystal display device.

In a dark place where an amount of external light is small, the liquid crystal display device can perform a display operation by using light from a light source. In this case, light from the light source is linearly polarized by the polarizing action of the second polarizing plate arranged on the rear surface side of the liquid crystal cell, and the linearly polarized light is incident on the liquid crystal cell from its rear surface side. Light transmitted through the semitransparent reflecting films passes through the liquid crystal layer to be incident on the first polarizing plate. The light transmitted through the polarizing plate emerges as image light from the front surface side of the liquid crystal display device.

In the liquid crystal display device, the transmittance axis of the first polarizing plate is obliquely shifted with respect to the liquid crystal molecule aligning direction on the front substrate of the liquid crystal cell, and the transmission axis of the second polarizing plate is obliquely shifted with respect to the liquid crystal molecule aligning direction on the rear substrate of the liquid crystal cell. For this reason, in the reflection type display operation using external light, while linearly polarized light incident through the first polarizing plate passes through the liquid crystal cell, the linearly polarized light is polarized by the birefringence effect of the liquid crystal layer into elliptically polarized light components whose polarized states are different from each other at respective wavelengths. While, of the elliptically polarized light components, a light component reflected by the semitransparent reflecting films passes through the liquid crystal layer again, the polarized state of this light component is further changed, and light having the light component is incident on the first polarizing plate. The light having the light component transmitted through the first polarizing plate becomes colored light.

In the transmission type display operation using light from the light source, while, of linearly polarized light incident through the second polarizing plate, light transmitted through the semitransparent reflecting films passes through the liquid crystal cell, the linearly polarized light is polarized by the birefringence effect of the liquid crystal layer into elliptically polarized light components whose polarized states are different from each other at respective wavelengths. The elliptically polarized light components are incident on the first polarizing plate, and light having a light component transmitted through the first polarizing plate becomes colored light.

More specifically, in the liquid crystal display device, during a reflection type display operation, light is colored by using the birefringence effect of the liquid crystal layer of the liquid crystal cell and the polarizing/analyzing actions of the first polarizing plate. During the transmission display operation, light is colored by using the birefringence effect of the liquid crystal layer of the liquid crystal cell, the polarizing action of the second polarizing plate, and the analyzing action of the first polarizing plate.

Since the liquid crystal display device colors light without using a color filter, the loss of an amount of transmitted light can be considerably smaller than that in a case wherein light passes through a color filter, and colored light having a high luminance can be obtained. Therefore, a bright color image can be displayed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

First Embodiment

Figure 1:
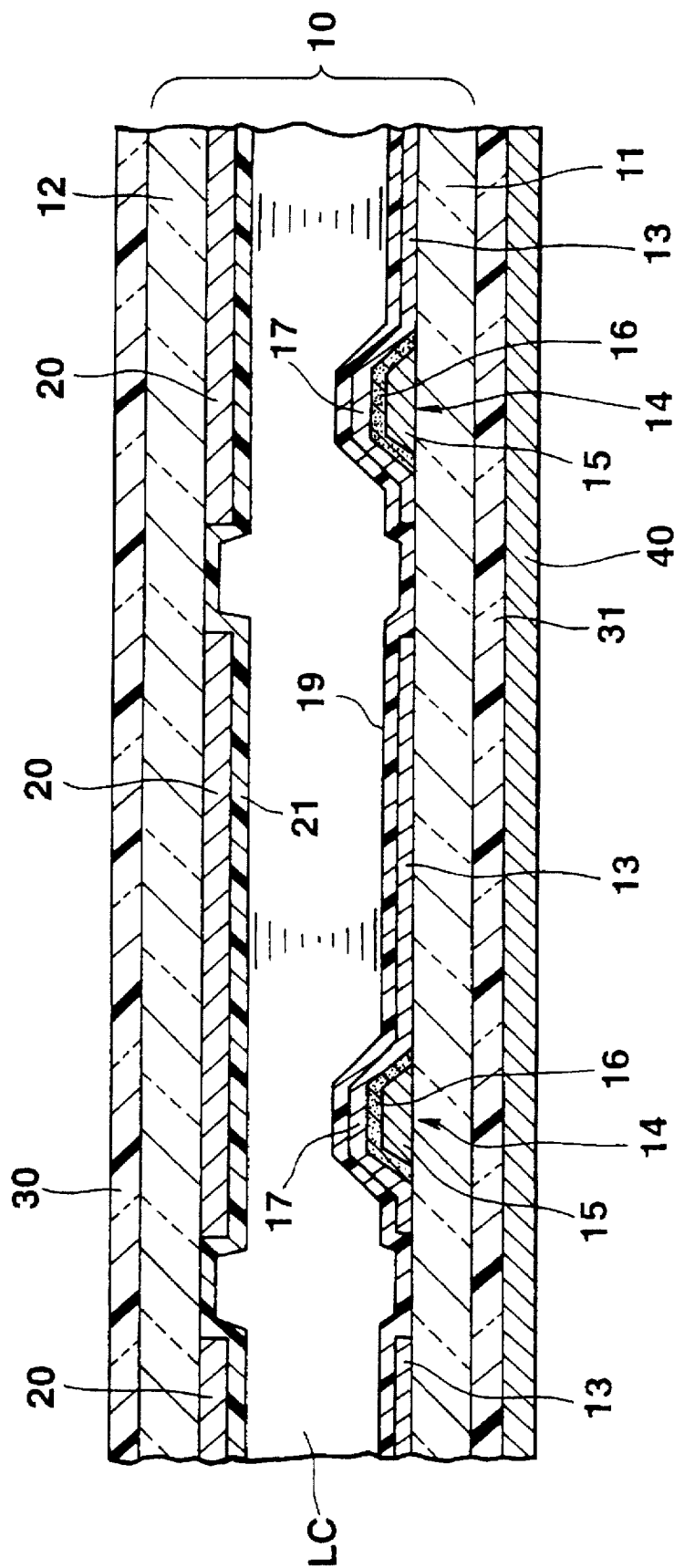
FIG. 1 is a sectional view showing part of a color liquid crystal display device according to the first embodiment of the present invention.
Figure 2:
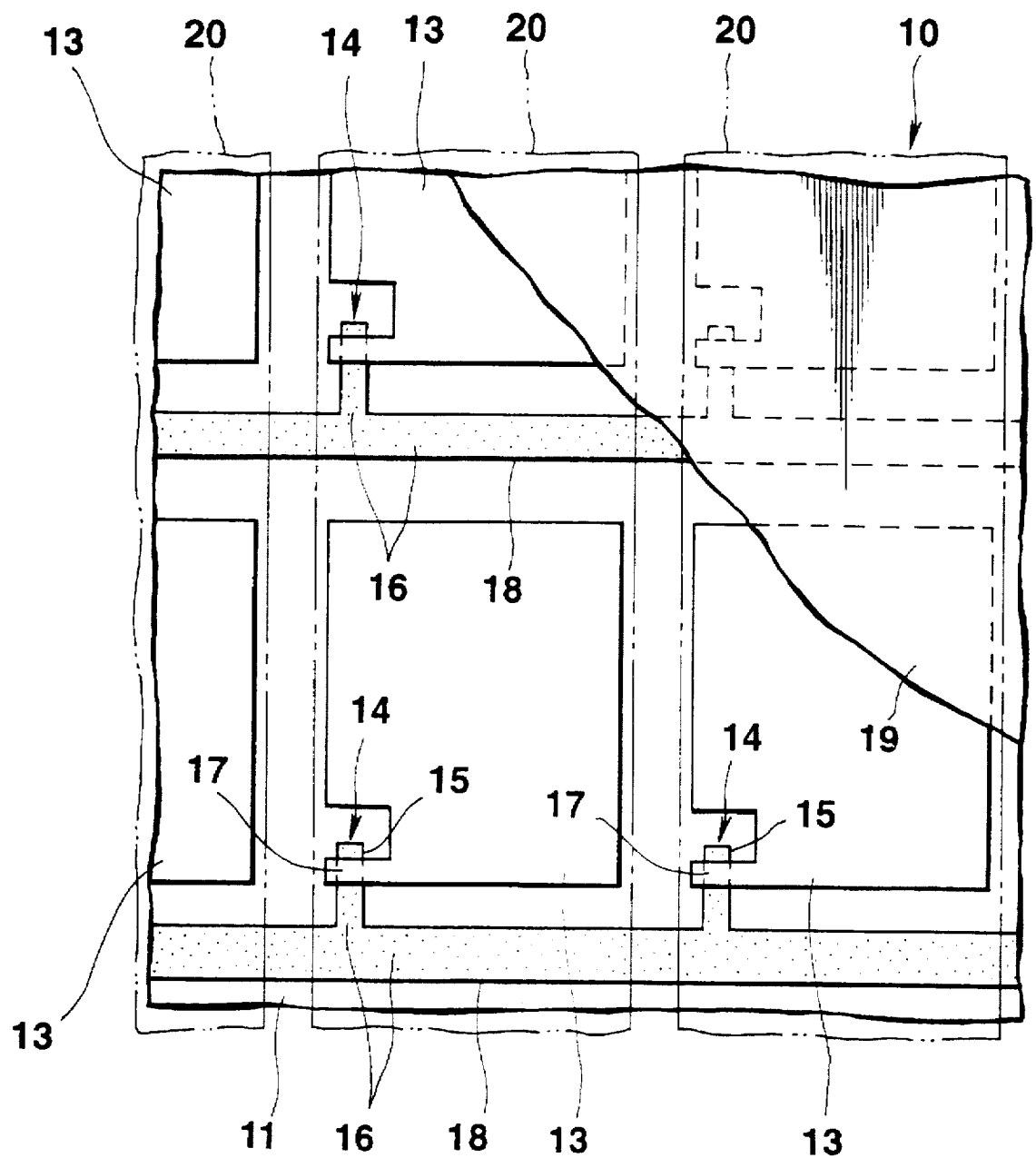
FIG. 2 is a plan view showing part of the liquid crystal cell in FIG. 1.

FIG. 1 is a sectional view showing part of a reflection type liquid crystal display device according to the first embodiment, and FIG. 2 is a plan view showing part of the liquid crystal cell of the liquid crystal display device in FIG. 1.

The liquid crystal display device of this embodiment is constituted by a liquid crystal cell 10, a pair of polarizing plates 30 and 31 arranged on the front and rear surface sides of the liquid crystal cell 10, and a reflecting plate 40 arranged behind the rear polarizing plate 31. Note that the reflecting plate 40 constituted by a metal film consisting of Al (aluminum) or the like and having a high reflectance, and the front surface of the reflecting plate 40 is subjected to a roughening process to be a scattering/reflecting surface.

First, the liquid crystal cell 10 will be described below. This liquid crystal cell 10 is an active matrix liquid crystal cell having a plurality of two-terminal nonlinear resistor elements as active elements. In this embodiment, a two-terminal element (MIM) having a metal-insulator-metal structure is used as the active element.

The liquid crystal cell 10 is formed by sandwiching a layer of a liquid crystal LC between a pair of transparent substrates 11 and 12. On the inner surface, i.e., the surface opposing the liquid crystal layer, of the rear substrate (lower substrate in FIG. 1) of the pair of substrates 11 and 12, a plurality of pixel electrodes 13 each constituted by a transparent conductive film such as an ITO film and MIMs 14 corresponding to the pixel electrodes 13 are arranged in the row and column directions (lateral and vertical directions in FIG. 2) in the form of a matrix. A transparent aligning film 19 is arranged on the pixel electrodes 13 and the MIMs 14.

Each MIM 14 is constituted by a lower electrode 15 formed on the rear substrate 11, a thin insulating film 16 covering the lower electrode 15, and an upper electrode 17 formed on the insulating film 16. The lower electrodes 15 of the MIMs 14 of each row are connected to a drive signal supply line 18 arranged for each pixel electrode row. The upper electrode 17 of each MIM 14 is connected to the pixel electrode 13 corresponding to a corresponding one of the MIMs 14.

Note that, in this embodiment, the lower electrodes 15 of the MIMs 14 and the drive signal supply line 18 are integrally formed by a single metal film (Al film, Al-based alloy film, or the like), and each upper electrode 17 and a corresponding one of the pixel electrodes 13 are integrally formed by a single transparent conductive film.

In this embodiment, the insulating films 16 of the MIMs 14 are formed by anodizing the surfaces of the lower electrodes 15 and the drive signal supply line 18. Therefore, the surface of the drive signal supply line 18 is covered with the insulating film (anodized film) 16 except for the terminal portions (not shown) of the drive signal supply line 18.

On the inner surface, i.e., a surface opposing the liquid crystal layer, of the front substrate (upper substrate in FIG. 1) 12 of the liquid crystal cell 10, a counter electrode 20 constituted by a transparent conductive film such as an ITO film is arranged to oppose the pixel electrodes 13 of each column arranged on the rear substrate 11, and an aligning film 21 is formed on the counter electrode 20.

The rear substrate 11 and the front substrate 12 are joined to each other at their outer peripheral portions via a frame-like seal member, and the liquid crystal LC is filled in an area surrounded by the seal member between both the substrates 11 and 12.

This liquid crystal LC is a nematic liquid crystal having a positive dielectric anisotropy. The molecule aligning directions of the liquid crystal LC are regulated on the substrates 11 and 12 by the aligning films 19 and 21 arranged on both the substrates 11 and 12, respectively. The molecules are twisted/aligned between both the substrates 11 and 12. Note that the aligning films 19 and 21 are horizontal aligning films consisting of polyimide or the like, and the surfaces of the aligning films 19 and 20 are rubbed to perform an aligning process for the surfaces.

In the liquid crystal display device of this embodiment, the liquid crystal molecule aligning directions (rubbing directions of the aligning films 19 and 20) on both the substrates 11 and 12 of the liquid crystal cell 10 and the directions of the transmission axes of the pair of polarizing plates 30 and 31 are set as follows.

Note that, in this embodiment, the liquid crystal molecule aligning direction on the rear substrate 11 of the liquid crystal cell 10 is defined as a direction at an azimuth of 0°, and the liquid crystal molecule aligning direction on the front substrate 12 of the liquid crystal cell 10 and the directions of the transmission axes of the pair of polarizing plates 30 and 31 are set with reference to the direction at the azimuth of 0°.

Figure 3A:
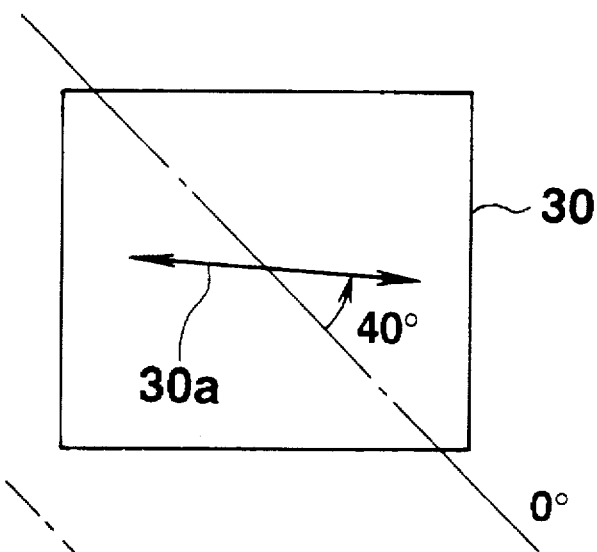
FIGS. 3A, 3B, and 3C are plan views respectively showing the direction of the transmission axis of a front polarizing plate, the molecule aligning film direction of a liquid crystal layer, and the direction of the transmission axis of a rear polarizing plate, in the color liquid crystal display device in FIG. 1.
Figure 3B:
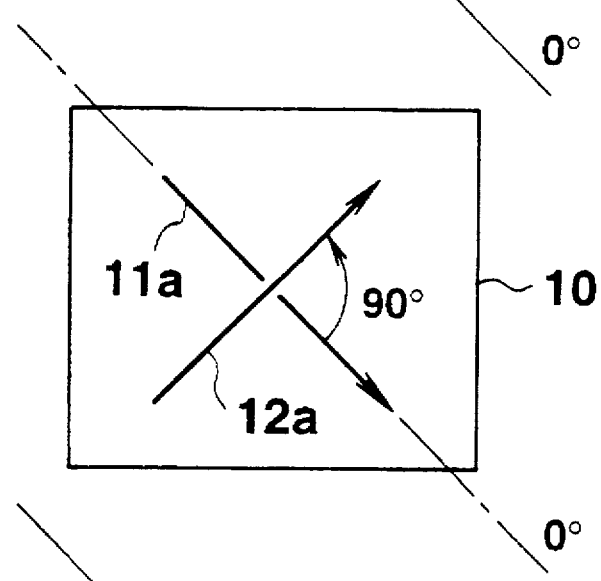
Figure 3C:
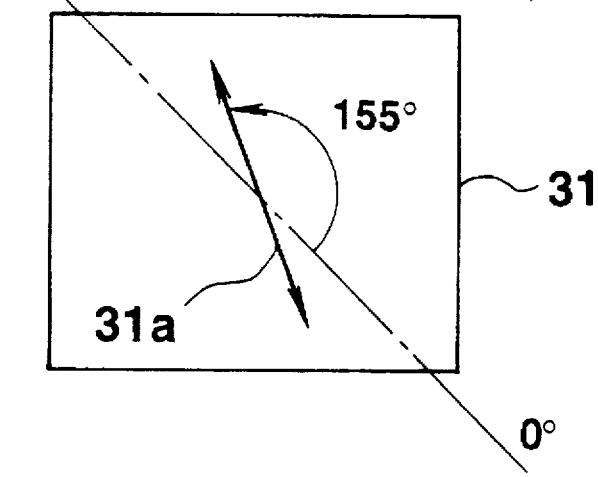

FIGS. 3A, 3B, and 3C are plan views respectively showing the transmission axis direction of the front polarizing plate 30, the liquid crystal molecule aligning direction of the liquid crystal cell 10, and the transmission axis of the rear polarizing plate 31 in the liquid crystal display device. Referring to FIG. 3B, reference numeral 11a denotes a liquid crystal molecule aligning direction on the rear substrate 11 of the liquid crystal cell 10; and 12a, a liquid crystal molecule aligning direction on the front substrate 12 of the liquid crystal cell 10.

As shown in FIG. 3B, the liquid crystal molecule aligning direction 12a on the front substrate 12 of the liquid crystal cell 10 shifted counterclockwise by almost 90° with respect to the liquid crystal molecule aligning direction 11a on the rear substrate 11, i.e., the azimuth of 0°, when viewed from the front surface side of the liquid crystal display device, and the liquid crystal molecules are twisted/aligned at a twist angle of almost 90° between both the substrates 11 and 12.

Referring to FIG. 3A, reference numeral 30a denotes a transmission axis of the front polarizing plate 30 arranged on the upper surface of the liquid crystal cell 10. The transmission axis 30a of the front polarizing plate 30 is shifted counterclockwise by almost 40° with respect to the direction at the azimuth of 0° when viewed from the front surface side of the liquid crystal display device. That is, the transmission axis 30a of the front polarizing plate 30 is obliquely shifted by about 50° with respect to the liquid crystal molecule aligning direction 12a on the front substrate 12 of the liquid crystal cell 10.

Referring to FIG. 3C, reference numeral 31a denotes a transmission axis of the rear polarizing plate 31 arranged on the rear surface of the liquid crystal cell 10. The transmission axis 31a of the rear polarizing plate 31 is shifted counterclockwise by almost 155° with respect to the direction at the azimuth of 0° when viewed from the front surface side of the liquid crystal display device.

This liquid crystal display device performs a display operation using external light such as natural light or indoor illumination light. External light incident on the front surface of the liquid crystal display device is polarized into linearly polarized light by the polarizing action of the front polarizing plate 30. Light passing through the liquid crystal cell 10 is incident on the rear polarizing plate 31, and transmission of the light is controlled by the analyzing action of the rear polarizing plate 31. Light passing through the rear polarizing plate 31 is reflected by the reflecting plate 40, passes through the rear polarizing plate 31, the liquid crystal cell 10, and the front polarizing plate 30 again, and emerges from the front surface side of the liquid crystal display device.

In the liquid crystal display device, since the transmission axis 30a of the front polarizing plate 30 is obliquely shifted with respect to the aligning direction 12a on the front substrate 12 of the liquid crystal cell 10, linearly polarized light incident through the front polarizing plate 30 is polarized by a birefringence effect into elliptically polarized light components whose polarized states are different from each other at respective wavelengths, and the elliptically polarized light components are incident on the rear polarizing plate 31. Of the elliptically polarized light components, light components transmitted through the rear polarizing plate 31 emerge from the rear polarizing plate 31. The exit light becomes light colored with a color corresponding to the ratio of light amounts of the wavelength light components, and this colored light is reflected by the reflecting plate 40 and emerges from the front surface side of the liquid crystal display device.

In this manner, in the liquid crystal display device, light is colored using the birefringence effect of the liquid crystal cell 10 and the polarizing/analyzing actions of the pair of polarizing plates 30 and 31 without using a color filter. According to this liquid crystal display device, a reduction in light absorption amount can be larger than that in a case wherein light passes through a color filter. For this reason, although the liquid crystal display device is a reflection type liquid crystal display device, a bright color display can be obtained by increasing the transmittance for light.

More specifically, a color filter absorbs wavelength light except for light in the wavelength band of the color of the color filter. However, the color filter also absorbs the light in the wavelength band corresponding to the color of the filter at a considerably large absorption coefficient. For this reason, in a liquid crystal display device in which light is colored by a color filter, an amount of colored light passing through the color filter becomes considerably smaller than an amount of light, in a wavelength band, serving as colored light of light incident on the display device.

In contrast to this, in the liquid crystal display device of this embodiment, since transmitted light is colored without using a color filter, light absorption by a color filter does not occur. Therefore, an amount of colored light incident through the front polarizing plate 30, having a polarized state changed by the birefringence effect of the liquid crystal cell 10, and emerging through the rear polarizing plate 31 is almost equal to an amount of light, in a wavelength band, serving as the colored light of linearly polarized light incident through the front polarizing plate 30. For this reason, colored light having a high luminance can be obtained.

Note that this colored light is reflected by the reflecting plate 40 and incident on the front surface side of the liquid crystal display device through the rear polarizing plate 31, the liquid crystal cell 10, and the front polarizing plate 30. For this reason, in the process of passage of the light through the polarizing plates and the liquid crystal cell, light amount loss owing to light absorption occurs due to the light absorption or the like of the polarizing plates 30 and 31. However, this light loss amount is very small. Therefore, the luminance of the colored light emerging from the front surface side of the liquid crystal display device is sufficiently high.

In the liquid crystal display device in which light is colored by a color filter, since the display color is determined by the color of the color filter, a plurality of colors cannot be displayed by one pixel. However, in the liquid crystal display device of this embodiment, a plurality of colors can be displayed by one pixel.

More specifically, in the liquid crystal display device of this embodiment, the aligned state of the liquid crystal molecules is changed in accordance with the magnitude of a voltage applied between the pixel electrodes 13 and the counter electrode 20 of the liquid crystal cell 10, and the birefringence effect of the liquid crystal layer changes accordingly. For this reason, when the polarized state of elliptically polarized light incident on the rear polarizing plate 31 is changed by controlling the voltage applied to the liquid crystal cell 10, the color of colored light emerging through the rear polarizing plate 31 can be changed. Therefore, a plurality of colors can be displayed by one pixel.

The color liquid crystal display device of the present invention uses a two-terminal nonlinear resistor element as an active element. As this two-terminal nonlinear resistor element, an MIM element having a structure obtained by stacking conductive thin films and an insulating film or a diode obtained by stacking p-, i-, and n-type semiconductors can be used. The structure of the two-terminal element is very simple. For this reason, the two-terminal element can be easily manufactured, and an yield of production increases.

Note that the liquid crystal display device is basically driven by a method similar to a method of driving an active matrix liquid crystal display device using an active element having diode characteristics. Scanning signals may be sequentially supplied to the drive signal supply lines 18 (or the counter electrodes 20) of the liquid crystal cells 10, and, in synchronism with this, data signals corresponding to image data may be supplied to the counter electrodes 20 (or the drive signal supply lines 18). When the liquid crystal display device is driven as described above, a voltage corresponding to a potential difference between each drive signal supply line 18 and each counter electrode 20 is charged, through the MIM 14, in a pixel capacitor constituted by the pixel electrode 13, the counter electrode 20, and the liquid crystal LC sandwiched therebetween to charge the pixel capacitor. The liquid crystal molecules are operated by the charge voltage.

The display colors of the above liquid crystal display device will be described. Assume, as described above, that the liquid crystal molecules of the liquid crystal cell 10 are twisted/aligned between the two substrates 11 and 12 at a twist angle of almost 90°, and the liquid crystal molecule aligning directions 11a and 12a on the two substrates 11 and 12 and the transmission axes 30a and 31a of the polarizing plates 30 and 31 are respectively set in the directions shown in FIGS. 3A to 3C, while a value $\Delta n \cdot d$ (the product of a refractive index anisotropy $\Delta n$ and a liquid crystal layer thickness d of the liquid crystal LC) of the liquid crystal cell 10 is about 980 nm (e.g., $\Delta n=0.204$ and d=4.8 µm). In this case, the display color of each pixel is changed to green, blue, red, white, and black in accordance with a voltage applied to the liquid crystal cell 10.

Figure 4:
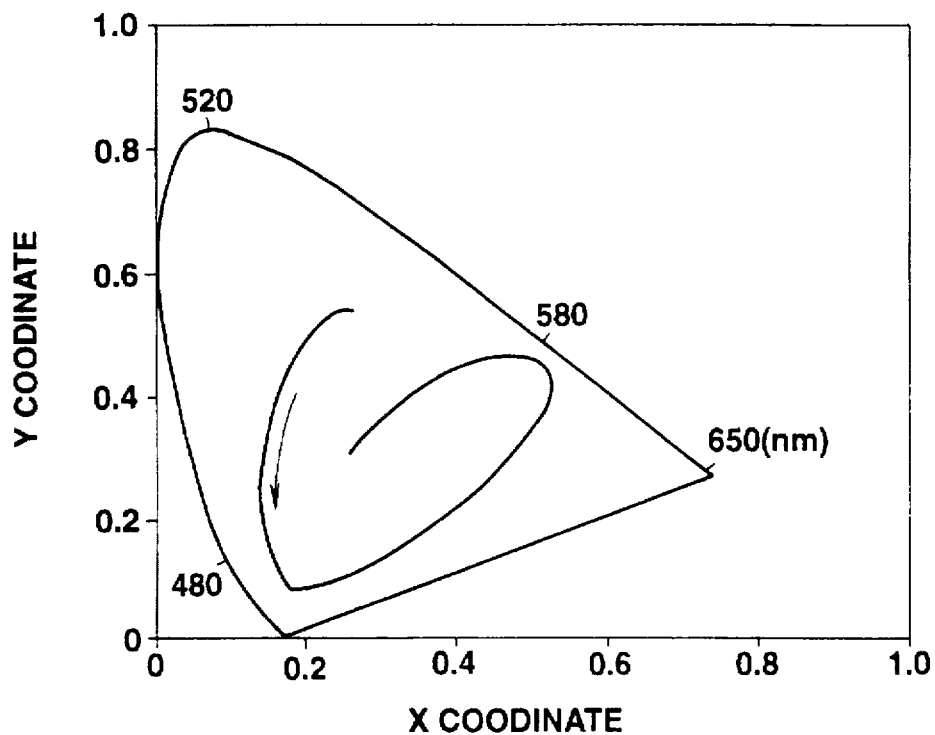
FIG. 4 is a CIE chromaticity diagram showing a change in display color with respect to a voltage applied to the color liquid crystal display device shown in FIG. 1.
Figure 5:
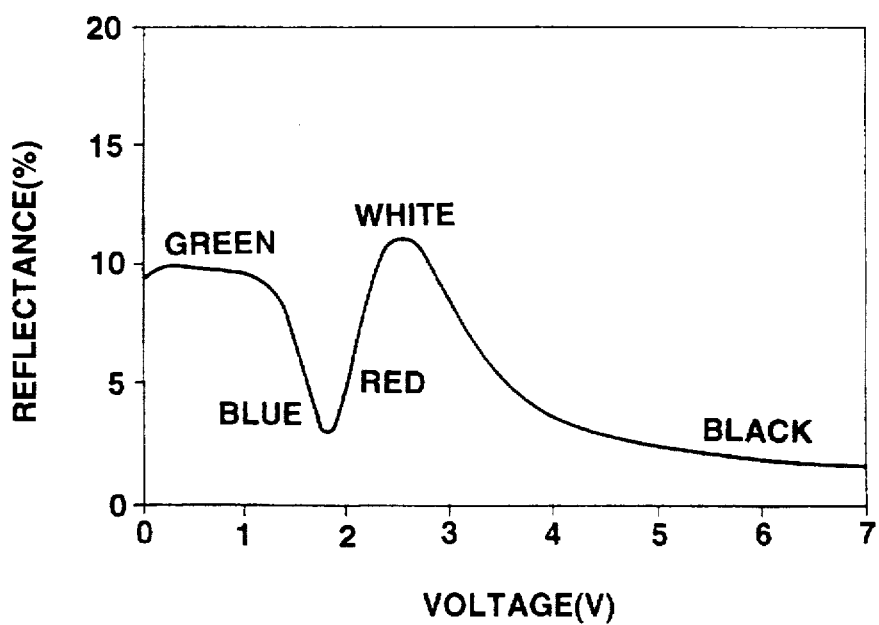
FIG. 5 is a graph showing voltage-reflectance characteristics showing a change in reflectance with respect to a voltage applied to the color liquid crystal display device shown in FIG. 1.
Figure 6:
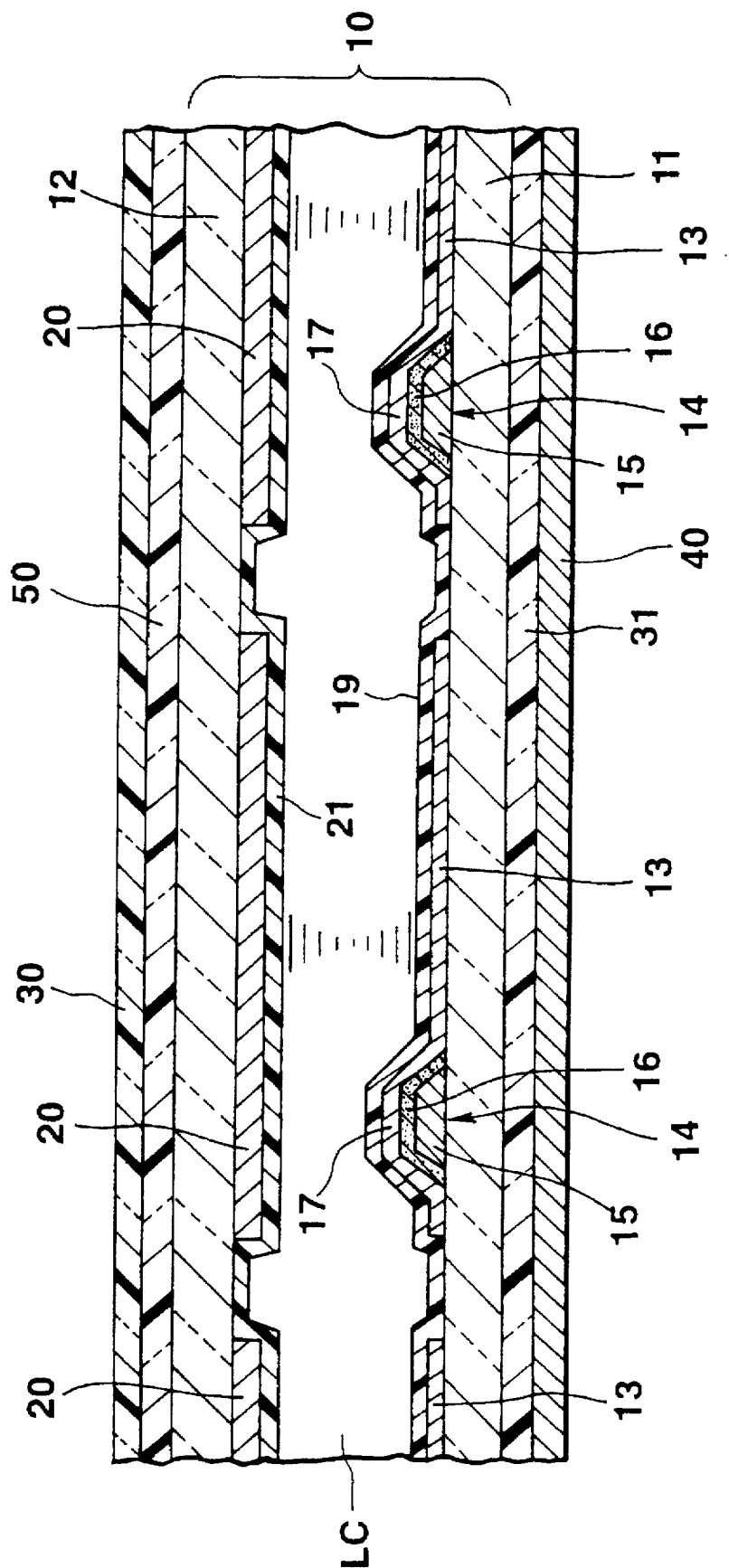
FIG. 6 is a sectional view showing part of a color liquid crystal display device according to the second embodiment of the present invention.

FIGS. 4 and 5 show a change in display color of the liquid crystal display device. FIG. 4 is a CIE chromaticity diagram showing a change in color of reflected light with respect to an applied voltage, and FIG. 5 is a graph showing voltage-reflectance characteristics. Note that FIGS. 4 and 5 show results obtained by observing exit light, obtained by causing white light to be incident on the liquid crystal display device in a direction shifted by 30° with respect to the normal of the liquid crystal display device, from the direction of the normal of the liquid crystal display device.

More specifically, in the liquid crystal display device, as the value of a voltage applied between the electrodes 13 and 20 of the liquid crystal cell 10, the color of the reflected light changes in the direction of an arrow as shown in FIG. 4. In the process of change in the color, as shown in FIG. 5, reflected light becomes green, blue, red, white, and black each having a high light intensity and a high chromaticity purity.

In this manner, in the liquid crystal display device, green, blue, red, white, and black can be displayed by one pixel. In addition, when different colors are displayed by a plurality of adjacent pixels, a color obtained by mixing a plurality of colors of green, blue, red, white, and black can be displayed.

The display color of the liquid crystal display device is determined by the liquid crystal molecule aligning directions 11a and 12a on both the substrates 11 and 12, a liquid crystal molecule twist angle, the directions of the transmission axes 30a and 31a of the polarizing plates 30 and 31, the value of $\Delta n \cdot d$, of the liquid crystal cell 10, and an applied voltage. For this reason, when these conditions are selected, the display color of the liquid crystal display device can be arbitrarily selected.

In the liquid crystal display device of this embodiment, light is colored using the birefringence effect of the liquid crystal cell 10 and the polarizing/analyzing actions of the pair of polarizing plates 30 and 31. However, the liquid crystal display device, a retardation plate may be arranged between the liquid crystal cell 10 and the rear polarizing plate 31.

When the retardation plate is arranged between the liquid crystal cell 10 and the rear polarizing plate 31 as described above, the polarized state of light elliptically polarized by the birefringence effect of the liquid crystal cell 10 is further changed by the birefringence effect of the retardation plate. For this reason, when elliptically polarized light components whose polarized states are considerably different from each other at respective wavelengths are incident on the rear polarizing plate 31, colored light having a vivid color can be obtained. In addition, when a voltage is applied to the liquid crystal cell 10 to raise/align the liquid crystal molecules with respect to the surfaces of the substrates 11 and 12, i.e., when the birefringence effect of the liquid crystal layer decreases, a display operation having a color changed from white to black (dark) can be obtained by the birefringence effect of the retardation plate. Note that, in this case, two or more retardation plates may be arranged to be stacked.

Second Embodiment

FIGS. 6 to 9 show a reflection type color liquid crystal display device according to the second embodiment of the present invention. In this liquid crystal display device, a vivid display color is displayed, and white is displayed when a voltage is applied to a liquid crystal layer. The liquid crystal display device of the second embodiment is obtained by adding a retardation plate to the color liquid crystal display device of the first embodiment shown in FIG. 1. For this reason, the same reference numerals as in the first embodiment denote the same parts in the second embodiment, and a description thereof will be omitted.

The liquid crystal display device of the second embodiment is constituted by a liquid crystal cell 10, a pair of polarizing plates 30 and 31 arranged on the front and rear surface sides of the liquid crystal cell 10, a retardation plate 50 arranged between the front polarizing plate 30 and the liquid crystal cell 10, and a reflecting plate 40 (scattering/reflecting plate having a front surface subjected to a roughening process) arranged behind the rear polarizing plate 31.

The liquid crystal cell 10 is an active matrix liquid crystal cell having MIMs 14 as active elements.

The retardation plate 50 constituted by a stretched film as of polycarbonate, and is arranged such that the phase delay axis (stretching axis) of the retardation plate 50 is obliquely shifted with respect to the transmission axis of the front polarizing plate 30.

In this embodiment, the liquid crystal molecule aligning directions on both substrates 11 and 12 of the liquid crystal cell 10, the directions of the transmission axes of the pair of polarizing plates 30 and 31, and the direction of the phase delay axis of the retardation plate 50 are set as follows.

Note that, in this embodiment, the liquid crystal molecule aligning direction on the rear substrate 11 of the liquid crystal cell 10 is defined as a direction at an azimuth of 0°, and the liquid crystal molecule aligning direction on the front substrate 12 of the liquid crystal cell 10, the directions of the transmission axes of the polarizing plates 30 and 31, and the direction of the phase delay axis of the retardation plate 50 are set with reference to the direction at the azimuth of 0°.

Figure 7A:
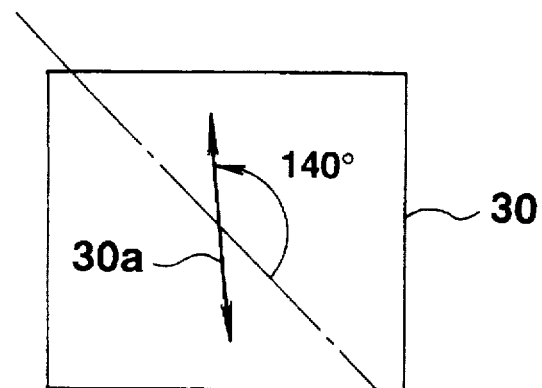
FIGS. 7A, 7B, 7C, and 7D are plan views respectively showing the direction of the transmission axis of a front polarizing plate, the direction of the phase delay axis of a retardation plate, the molecule aligning film direction of a liquid crystal layer, and the direction of the transmission axis of a rear polarizing plate, in the color liquid crystal display device in FIG. 6.
Figure 7B:
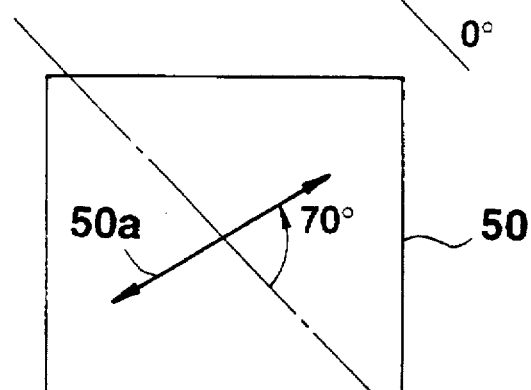
Figure 7C:
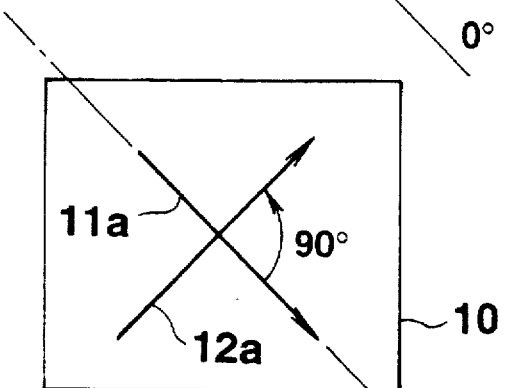

FIGS. 7A to 7D are plan views respectively showing a transmission axis 30a of the front polarizing plate 30, a phase delay axis 50a of the retardation plate 50, the liquid crystal molecule aligning directions 11a, 12a of the liquid crystal cell 10, and a transmission axis 31a of the rear polarizing plate 31 in the liquid crystal display device. Referring to FIG. 7C, a liquid crystal molecule aligning direction 12a on the front substrate 12 of the liquid crystal cell 10 is shifted counterclockwise by almost 90° with respect to a liquid crystal molecule aligning direction 11a on the rear substrate 11, i.e., the direction of the azimuth angle of 0°, when viewed from the front surface side of the liquid crystal display device. The liquid crystal molecules are twisted/aligned at a twist angle of 90° between both the substrates 11 and 12.

Figure 7D:
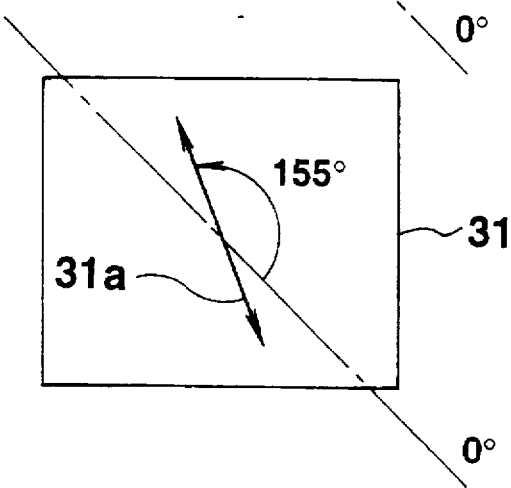

As shown in FIGS. 7A, 7B, and 7D, the transmission axis 30a of the front polarizing plate 30 is shifted counterclockwise by almost 140° with respect to the direction at the azimuth of 0° when viewed from the front surface side of the liquid crystal display device, and the phase delay axis 50a of the retardation plate 50 is shifted counterclockwise by almost 70° with respect to the direction at the azimuth of 0° when viewed from the front surface side of the liquid crystal display device. Therefore, the phase delay axis 50a of the retardation plate 50 is obliquely shifted by almost 70° with respect to the transmission axis 30a of the front polarizing plate 30. In addition, the transmission axis 31a of the rear polarizing plate 31 is shifted counterclockwise by almost 155° with respect to the direction at the azimuth of 0° when viewed from the front surface side of the liquid crystal display device.

In this liquid crystal display device, as in the liquid crystal display device of the first embodiment, a display operation is performed using external light such as natural light or indoor illumination light. In the liquid crystal display device of the second embodiment, external light incident on the front surface side is polarized into linearly polarized light by the polarizing action of the front polarizing plate 30, and the linearly polarized light is incident on the retardation plate 50. The light passing through the retardation plate 50 is incident on the rear polarizing plate 31 through the liquid crystal cell 10, and transmission of this light is controlled by the analyzing action of the rear polarizing plate 31. The light passing through the rear polarizing plate 31 is reflected by the reflecting plate 40, passes through the rear polarizing plate 31, the liquid crystal cell 10, the retardation plate 50, and the front polarizing plate 30 again, and emerges from the front surface side of the liquid crystal display device.

In this liquid crystal display device, since the phase delay axis 50a of the retardation plate 50 is obliquely shifted with respect to the transmission axis 30a of the front polarizing plate 30, while the linearly polarized light incident through the front polarizing plate 30 passes through the retardation plate 50, the linearly polarized light is polarized by the birefringence effect of the retardation plate 50 into elliptically polarized light components whose polarized states are different from each other at respective wavelengths. In the process of passage of the elliptically polarized light components through the liquid crystal cell 10, the elliptically polarized light components are incident on the rear polarizing plate 31 such that the polarized states of the elliptically polarized light components are further changed. Of the elliptically polarized light components, light components transmitted through the rear polarizing plate 31 emerge from the rear polarizing plate 31. The exit light becomes light colored with a color corresponding to the ratio of light amounts of the wavelength light components, and this colored light is reflected by the reflecting plate 40 and emerges from the front surface side of the liquid crystal display device.

In this manner, in the liquid crystal display device, light is colored using the birefringence effects of the retardation plate 50 and the liquid crystal cell 10 and the polarizing/analyzing actions of the pair of polarizing plates 30 and 31 without using a color filter. According to this liquid crystal display device, a reduction in light absorption amount can be larger than that in a case wherein light passes through a color filter. For this reason, although the liquid crystal display device is a reflection type liquid crystal display device, a bright color display can be obtained by increasing the transmittance for light. Since a two-terminal element is used as an active element, the liquid crystal display device has a simple structure, and the liquid crystal display device can be easily manufactured.

The display colors of the above liquid crystal display device will be described. Assume, as described above, that the liquid crystal molecules of the liquid crystal cell 10 are twisted/aligned between the two substrates 11 and 12 at a twist angle of almost 90°, and the liquid crystal molecule aligning directions 11a and 12a on the two substrates 11 and 12, the transmission axes 30a and 31a of the polarizing plates 30 and 31, and the phase delay axis 50a of the retardation plate 50 are respectively set in the directions shown in FIGS. 7A to 7D, while the retardation of the retardation plate 50 is 570 nm; and a value $\Delta n \cdot d$ of the liquid crystal cell 10, about 980 nm (e.g., $\Delta n=0.204$ and $d=4.8$ µm). In this case, the display color of each pixel is changed to red, green, blue, black, and white in accordance with a voltage applied to the liquid crystal cell 10.

Figure 8:
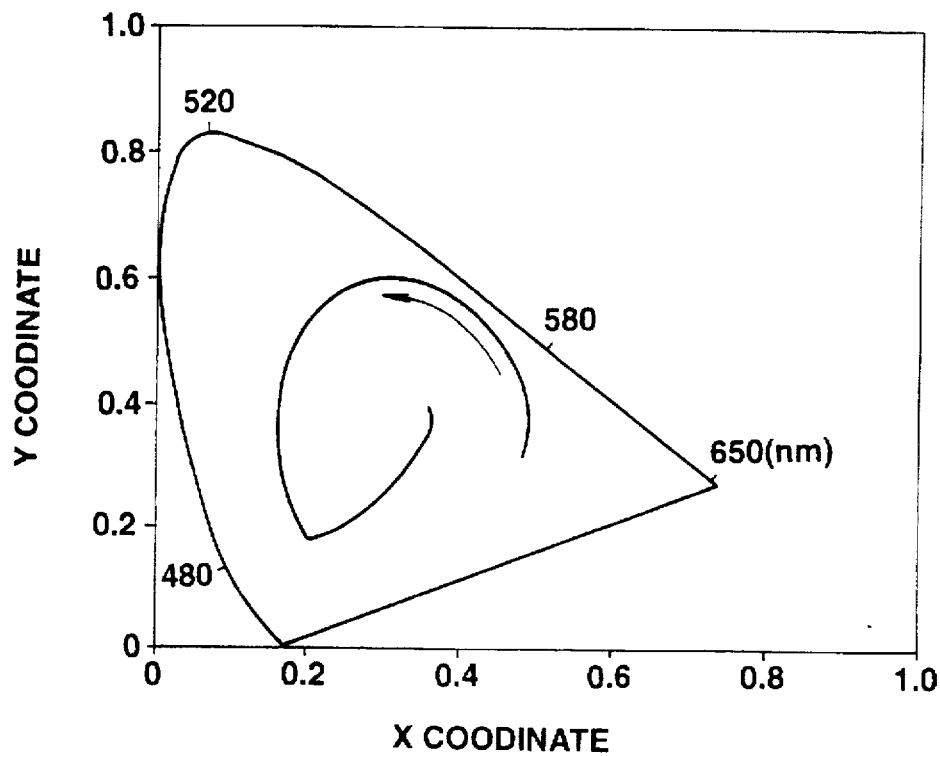
FIG. 8 is a CIE chromaticity diagram showing a change in display color with respect to a voltage applied to the color liquid crystal display device shown in FIG. 6.
Figure 9:
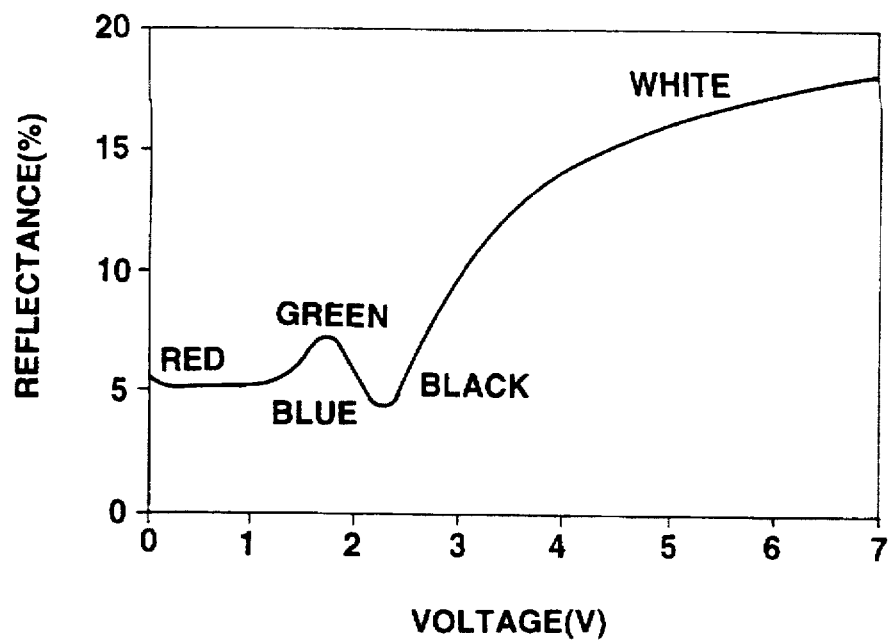
FIG. 9 is a graph showing voltage-reflectance characteristics showing a change in reflectance with respect to a voltage applied to the color liquid crystal display device shown in FIG. 6.

FIGS. 8 and 9 show a change in display color of the liquid crystal display device. FIG. 8 is a CIE chromaticity diagram showing a change in color of reflected light with respect to an applied voltage, and FIG. 9 is a graph showing voltage-reflectance characteristics. Note that FIGS. 8 and 9 show results obtained by observing exit light, obtained by causing white light to be incident on the liquid crystal display device in a direction shifted by 30° with respect to the normal of the liquid crystal display device, from the direction of the normal of the liquid crystal display device.

More specifically, in the liquid crystal display device, as the value of a voltage applied between the electrodes 13 and 20 of the liquid crystal cell 10, the color of the reflected light changes in the direction of an arrow as shown in FIG. 8. In the process of change in the color, as shown in FIG. 9, reflected light becomes red, green, blue, black, and white each having a high light intensity and a high chromaticity purity.

In this manner, in the liquid crystal display device, red, green, blue, red, black, and white can be displayed by one pixel. In addition, when different colors are displayed by a plurality of adjacent pixels, a color obtained by mixing a plurality of colors of red, green, blue, red, black, and white can be displayed.

Third Embodiment

Figure 10:
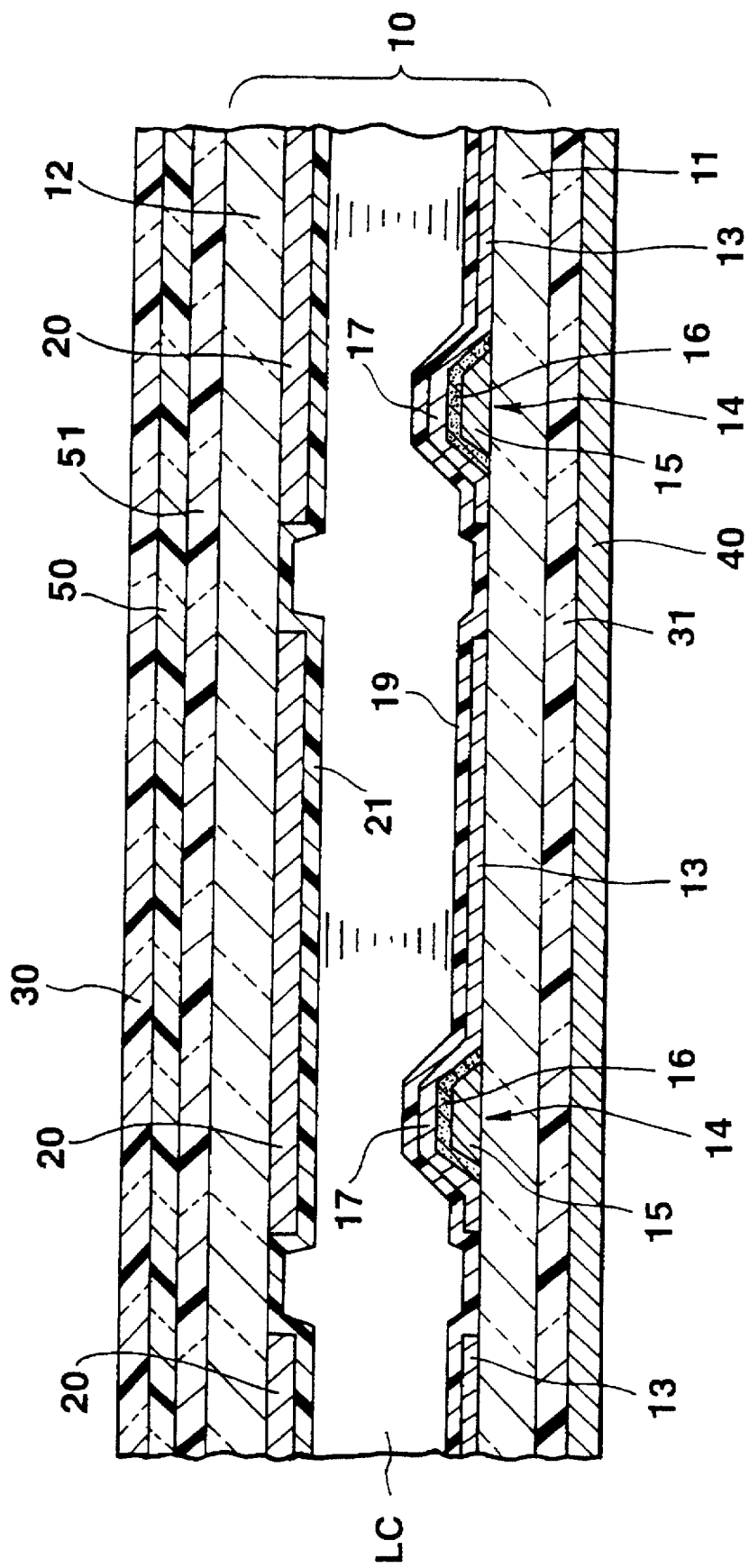
FIG. 10 is a sectional view showing part of a color liquid crystal display device according to the third embodiment of the present invention.
Figure 11A:
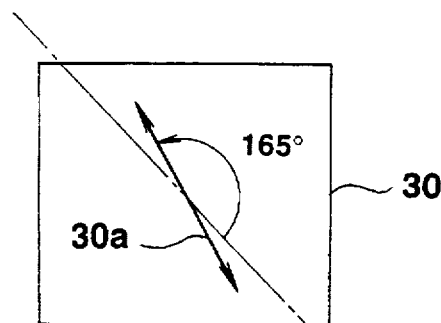
FIGS. 11A, 11B, 11C, 11D, and 11E are plan views respectively showing the direction of the transmission axis of a front polarizing plate, the direction of the phase delay axis of a first retardation plate, the direction of the phase delay axis of a second retardation plate, the molecule aligning film direction of a liquid crystal layer, and the direction of the transmission axis of a rear polarizing plate, in the color liquid crystal display device in FIG. 10.
Figure 11B:
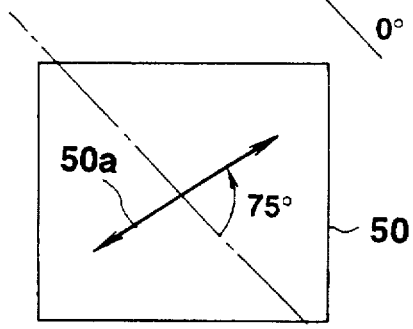
Figure 11C:
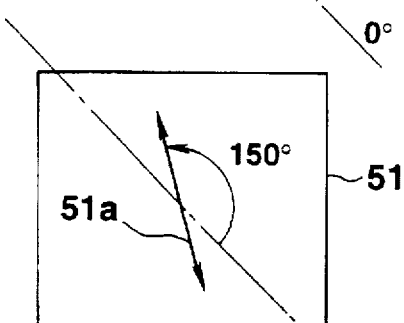
Figure 11D:
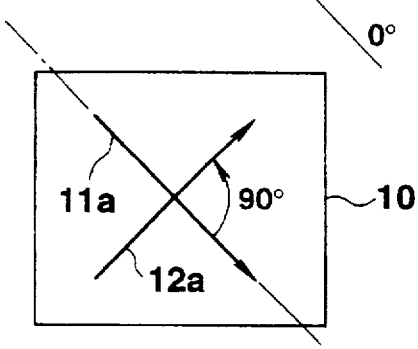
Figure 11E:
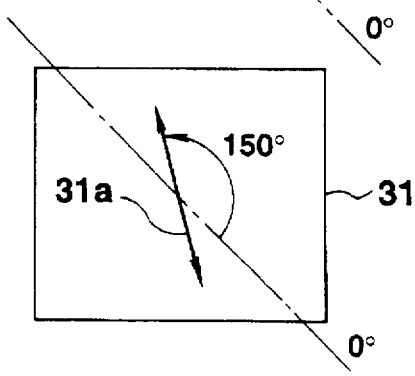
Figure 12:
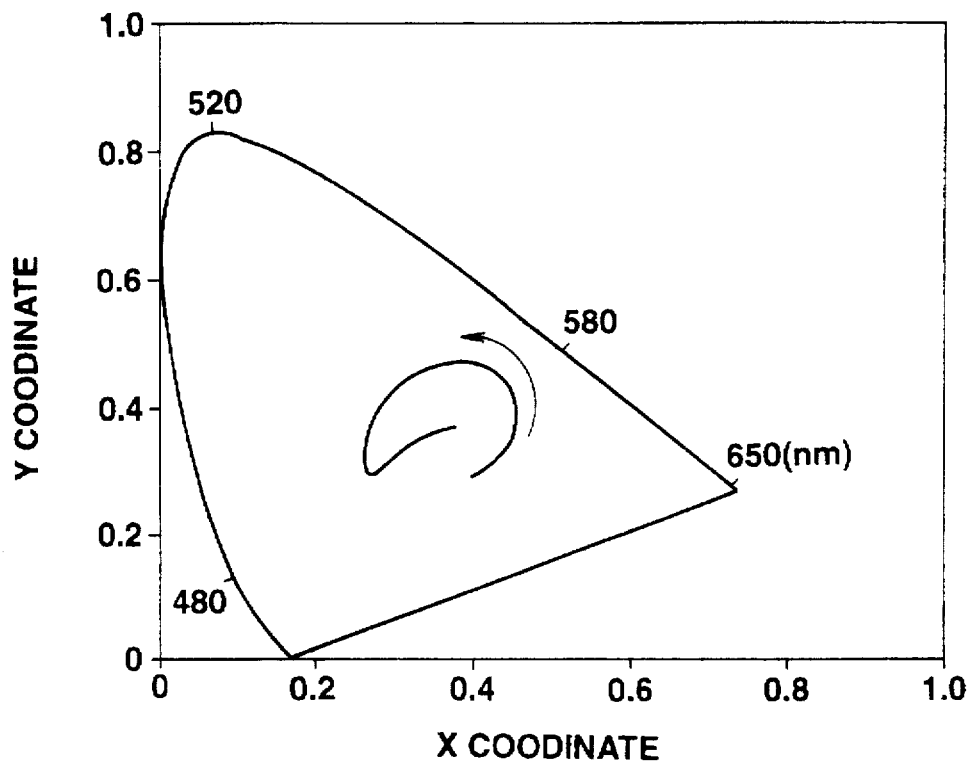
FIG. 12 is a CIE chromaticity diagram showing a change in display color with respect to a voltage applied to the color liquid crystal display device shown in FIG. 10.

FIGS. 10 to 12 show a reflection type color liquid crystal display device according to the third embodiment of the present invention. In this liquid crystal display device, white is displayed when a voltage is applied to a liquid crystal layer. The liquid crystal display device of the third embodiment is obtained by adding another retardation plate to the color liquid crystal display device of the second embodiment shown in FIG. 6. The same reference numerals as in the second embodiment denote the same parts in the third embodiment, and a description thereof will be omitted.

The liquid crystal display device of the third embodiment is constituted by a liquid crystal cell 10, a pair of polarizing plates 30 and 31 arranged on the front and rear surface sides of the liquid crystal cell 10, retardation plates 50 and 51 arranged to be stacked on each other between the front polarizing plate 30 and the liquid crystal cell 10, and a reflecting plate 40 (scattering/reflecting plate having a front surface subjected to a roughening process) arranged behind the rear polarizing plate 31.

The liquid crystal cell 10 is an active matrix liquid crystal cell having MIMs 14 as active elements.

Each of the retardation plates 50 and 51 is constituted by a stretched film as of polycarbonate. The retardation plates 50 and 51 are arranged such that the phase delay axes (stretching axes) of the retardation plates 50 and 51 are obliquely shifted from each other.

In this embodiment, the liquid crystal molecule aligning directions on both substrates 11 and 12 of the liquid crystal cell 10, the directions of the transmission axes of the pair of polarizing plates 30 and 31, and the directions of the phase delay axes of the first and second retardation plates 50 and 51 are set as follows.

In this embodiment, the liquid crystal molecule aligning direction on the rear substrate 11 of the liquid crystal cell 10 is defined as a direction at an azimuth of 0°, and the liquid crystal molecule aligning direction on the front substrate 12 of the liquid crystal cell 10, the directions of the transmission axes of the polarizing plates 30 and 31, and the directions of the phase delay axes of the retardation plates 50 and 51 are set with reference to the direction at the azimuth of 0°.

FIGS. 11A to 11E are plan views respectively showing the direction of a transmission axis 30a of the front polarizing plate 30, the direction of a phase delay axis 50a of the first retardation plate 50, the direction of a phase delay axis 51a of the second retardation plate 51, the liquid crystal molecule aligning directions of the liquid crystal cell 10, and the direction of a transmission axis 31a of the rear polarizing plate 31. A liquid crystal molecule aligning direction 12a on the front substrate 12 of the liquid crystal cell 10 is shifted counterclockwise by almost 90° with respect to a liquid crystal molecule aligning direction 11a on the rear substrate 11, i.e., the direction of the azimuth angle of 0°, when viewed from the front surface side of the liquid crystal display device. The liquid crystal molecules are twisted/aligned at a twist angle of 90° between both the substrates 11 and 12.

The transmission axis 30a of the front polarizing plate 30 is shifted counterclockwise by almost 165° with respect to the direction at the azimuth of 0° when viewed from the front surface side of the liquid crystal display device, and the transmission axis 31a of the rear polarizing plate 31 is shifted counterclockwise by almost 150° with respect to the direction at the azimuth of 0° when viewed from the front surface side of the liquid crystal display device.

The phase delay axis 50a of the first retardation plate 50 is shifted counterclockwise by almost 75° with respect to the direction at the azimuth of 0° when viewed from the front surface side of the liquid crystal display device (the phase delay axis 50a is shifted by almost 90° with respect to the transmission axis 30a of the front polarizing plate 30), and the phase delay axis 51a of the retardation plate 51 is shifted counterclockwise by almost 150° with respect to the direction at the azimuth of 0° when viewed from the front surface direction of the liquid crystal display device (the phase delay axis 51a is shifted by almost 15° with respect to the transmission axis 30a of the front polarizing plate 30). Therefore, the phase delay axis 50a of the retardation plate 50 and the phase delay axis 51a of the retardation plate 51 are obliquely shifted from each other by almost 75°.

In this liquid crystal display device, as in the liquid crystal display device of the first embodiment, a display operation is performed using external light such as natural light or indoor illumination light. In the liquid crystal display device of the third embodiment, external light incident on the front surface side is polarized into linearly polarized light by the polarizing action of the front polarizing plate 30, and the linearly polarized light is incident on the two retardation plates 50 and 51. The light passing through the retardation plates 50 and 51 is incident on the rear polarizing plate 31 through the liquid crystal cell 10, and transmission of this light is controlled by the analyzing action of the rear polarizing plate 31. The light passing through the rear polarizing plate 31 is reflected by the reflecting plate 40, passes through the rear polarizing plate 31, the liquid crystal cell 10, the two retardation plates 50 and 51, and the front polarizing plate 30 again, and emerges from the front surface side of the liquid crystal display device.

In this liquid crystal display device, since the phase delay axes 50a and 50b of the two retardation plates 50 and 51 are obliquely shifted from each other, while the linearly polarized light incident through the front polarizing plate 30 passes through the retardation plates 50 and 51, the linearly polarized light is polarized by the birefringence effects of the retardation plates 50 and 51 into elliptically polarized light components whose polarized states are different from each other at respective wavelengths. In the process of passage of the elliptically polarized light components through the liquid crystal cell 10, the elliptically polarized light components are incident on the rear polarizing plate 31 such that the polarized states of the elliptically polarized light components are further changed. Of the elliptically polarized light components, light components transmitted through the rear polarizing plate 31 emerge from the rear polarizing plate 31. The exit light become light colored with a color corresponding to the ratio of light amounts of the wavelength light components, and this colored light is reflected by the reflecting plate 40 and emerges from the front surface side of the liquid crystal display device.

In this manner, in the liquid crystal display device, light is colored using the birefringence effects of the two retardation plates 50 and 51 and the liquid crystal cell 10 and the polarizing/analyzing actions of the pair of polarizing plates 30 and 31 without using a color filter. According to this liquid crystal display device, a reduction in light absorption amount can be larger than that in a case wherein light passes through a color filter. For this reason, although the liquid crystal display device is a reflection type liquid crystal display device, a bright color display can be obtained by increasing the transmittance for light.

The display colors of the above liquid crystal display device will be described. Assume, as described above, that the liquid crystal molecules of the liquid crystal cell 10 are twisted/aligned between the two substrates 11 and 12 at a twist angle of almost 90°, and the liquid crystal molecule aligning directions 11a and 12a on the two substrates 11 and 12, the transmission axes 30a and 31a of the polarizing plates 30 and 31, and the phase delay axes 50a and 51a of the retardation plates 50 and 51 are respectively set in the directions shown in FIGS. 11A to 11E, while the retardation values of the first and second retardation plates 50 and 51 are 370 nm; and a value $\Delta n \cdot d$ of the liquid crystal cell 10, about 1,040 nm (e.g., $\Delta n=0.204$ and $d=5.1$ μm). In this case, the display color of each pixel is changed to red, green, blue, black, and white in accordance with a voltage applied to the liquid crystal cell 10.

Figure 13:
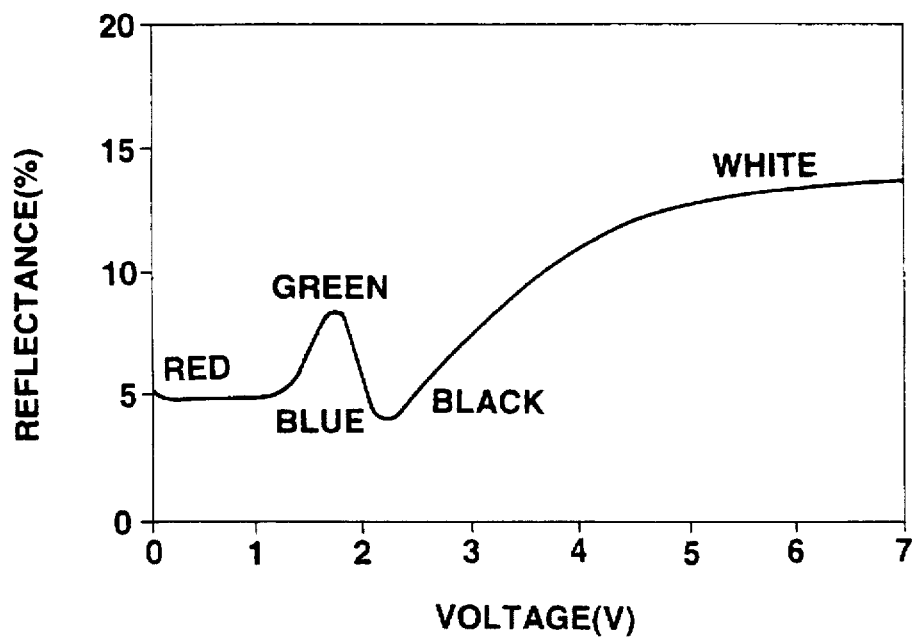
FIG. 13 is a graph showing voltage-reflectance characteristics showing a change in reflectance with respect to a voltage applied to the color liquid crystal display device shown in FIG. 10.

FIGS. 12 and 13 show a change in display color of the liquid crystal display device. FIG. 12 is a CIE chromaticity diagram showing a change in color of reflected light with respect to an applied voltage, and FIG. 13 is a graph showing voltage-reflectance characteristics. Note that FIGS. 12 and 13 show results obtained by observing exit light, obtained by causing white light to be incident on the liquid crystal display device in a direction shifted by 30° with respect to the normal of the liquid crystal display device, from the direction of the normal of the liquid crystal display device.

More specifically, in the liquid crystal display device, as the value of a voltage applied between the electrodes 13 and 20 of the liquid crystal cell 10, the color of the reflected light changes in the direction of an arrow as shown in FIG. 12. In the process of change in the color, as shown in FIG. 13, reflected light becomes red, green, blue, black, and white each having a high light intensity and a high chromaticity purity.

In this manner, in the liquid crystal display device, red, green, blue, red, black, and white can be displayed by one pixel. In addition, when different colors are displayed by a plurality of adjacent pixels, a color obtained by mixing a plurality of colors of red, green, blue, red, black, and white can be displayed.

In the above liquid crystal display device, incident light is polarized by the birefringence effects of the retardation plates 50 and 51 and the liquid crystal cell 10 into elliptically polarized light components whose polarized states are considerably different from each other at respective wavelengths, and the elliptically polarized light components are incident on the rear polarizing plate 31. For this reason, colored light having a vivid color can be obtained. When a voltage which is high enough to raise/align the liquid crystal molecules with respect to the surfaces of the substrates 11 and 12 is applied to the liquid crystal cell 10, sufficiently bright white can be displayed.

In the above embodiment, as shown in FIGS. 11A to 11E, the phase delay axis 50a of the first retardation plate 50 is shifted by almost 90° with respect to the transmission axis 30a of the front polarizing plate 30, and the phase delay axis 51a of the retardation plate 51 is shifted by almost 15° with respect to the transmission axis 30a. However, when the phase delay axes 50a and 51a of the retardation plates 50 and 51 are obliquely shifted from each other, and the phase delay axis of at least one of the retardation plates is obliquely shifted with respect to the transmission axis 30a of the front polarizing plate 30, linearly polarized light incident through the front polarizing plate 30 is polarized into elliptically polarized light by the birefringence effects of the retardation plates 50 and 51.

In addition, in the above embodiment, although the two retardation plates 50 and 51 are arranged between the front polarizing plate 30 and the liquid crystal cell 10, three or more retardation plates may be arranged. In this case, when the phase delay axes of the retardation plates are obliquely shifted from each other, linearly polarized light incident through the front polarizing plate 30 is polarized into elliptically polarized light by the birefringence effects of these retardation plates.

In each of the first to third embodiments, although an active matrix cell having the MIMs 14 as active elements is used as the liquid crystal cell, an active matrix cell having two-terminal nonlinear resistor elements, such as thin-film diodes, as active elements may be used as the liquid crystal cell. In addition, the twist angle of the liquid crystal molecules is not limited to 90°, and the twist angle may be set to be, e.g., 180° to 270°. As the liquid crystal cell 10, a liquid crystal cell in which liquid crystal molecules are aligned in an aligned state such as a homogeneously aligned state, a homeotropically aligned state, or a hybrid aligned state may be used.

Fourth Embodiment

FIGS. 14 to 17 show a reflection type color liquid crystal display device according to the fourth embodiment of the present invention. In the reflection type color liquid crystal display device of the fourth embodiment, reflecting members are formed on the inner surfaces of a pair of substrates constituting a liquid crystal layer cell. In this manner, a reflection type liquid crystal display device having a brighter display is to be obtained. The same reference numerals as in the second embodiment shown in FIG. 6 denote the same parts in the reflection type color liquid crystal display device of the fourth embodiment, and a description thereof will be omitted.

Figure 14:
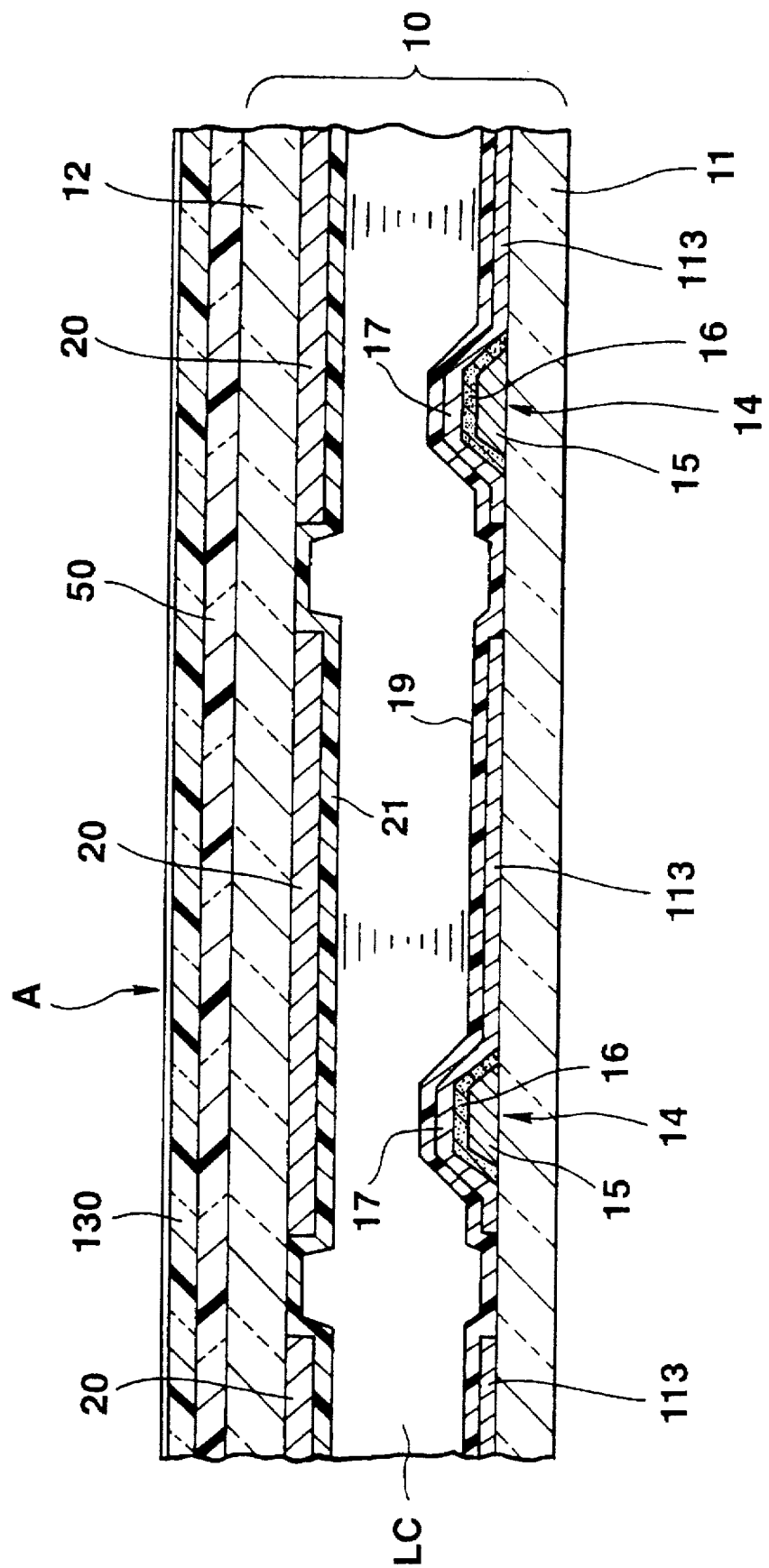
FIG. 14 is a sectional view showing part of a color liquid crystal display device according to the fourth embodiment of the present invention.

The fourth embodiment of the present invention will be described below with reference to the accompanying drawings. FIG. 14 is a sectional view showing part of the reflection type color liquid crystal display device of this embodiment.

The liquid crystal display device of the embodiment is constituted by a liquid crystal cell 10, one polarizing plate 130, and one retardation plate 50. The polarizing plate 130 is arranged on the front surface side of the liquid crystal cell 10, and the retardation plate 50 is arranged between the liquid crystal cell 10 and the polarizing plate 130.

First, the liquid crystal cell 10 will be described below. The liquid crystal cell 10 is an active matrix liquid crystal cell having two-terminal nonlinear resistor elements as active elements. In this embodiment, MIMs are used as active elements.

Of a pair of substrates 11 and 12 of the liquid crystal cell 10, the rear substrate (lower substrate in FIG. 14) 11 is an insulating substrate (need not be transparent) constituted by a glass plate or the like. On the inner surface, i.e., a surface opposing the liquid crystal layer, of the rear substrate 11, a plurality of pixel electrodes 113 and MIMs 14 corresponding to the pixel electrodes 113 are arranged in the row and column directions in the form of a matrix. A transparent aligning film 19 is arranged on the pixel electrodes 113 and the MIMs 14.

Each MIM 14 is constituted by a lower electrode 15 formed on the rear substrate 11, a thin insulating film 16 covering the lower electrode 15, and an upper electrode 17 formed on the insulating film 16. The lower electrodes 15 of the MIMs 14 of each row are connected to a drive signal supply line arranged for each pixel electrode row. The upper electrode 17 of each MIM 14 is connected to the pixel electrode 113 corresponding to a corresponding one of the MIMs 14.

Each pixel electrode 113 is also used as a reflecting film. The pixel electrode 113 is constituted by a metal film having a high reflectance and consisting of aluminum, an aluminum-based alloy, or the like. The upper surface, i.e., the reflecting surface, of the pixel electrode 113 is an almost mirror surface.

Note that, in this embodiment, the lower electrodes 15 of the MIMs 14 and the drive signal supply line are integrally formed by a single metal film (Al film, Al-based alloy film, or the like), and each upper electrode 17 and a corresponding one of the pixel electrodes 13 are integrally formed by a single transparent conductive film. In this embodiment, the insulating films 16 of the MIMs 14 are formed by anodizing the surfaces of the lower electrodes 15 and the drive signal supply line 18. Therefore, the surface of the drive signal supply line is covered with the insulating film (anodized film) 16 except for the terminal portions (not shown) of the drive signal supply line.

The front substrate (upper substrate in FIG. 14) 12 of the liquid crystal cell 10 is transparent substrate (glass plate in FIG. 14) constituted by a glass plate or a transparent resin film. On the inner surface, i.e., a surface opposing the liquid crystal layer, of the front substrate 12, a plurality of transparent counter electrodes 20 respectively opposing the pixel electrodes 113 of each column arranged on the rear substrate 11 are arranged. A transparent aligning film 21 is arranged on the counter electrodes 20. Note that each counter electrode 20 is constituted by a transparent conductive film such as an ITO film.

The rear substrate 11 and the front substrate 12 are joined to each other at their outer peripheral portions via a frame-like seal member (not shown), and a nematic liquid crystal LC having a positive dielectric anisotropy is filled in an area surrounded by the seal member between both the substrates 11 and 12.

The polarizing plate 130 is a polarizing plate having one surface, e.g., a front surface, formed into a light-scattering surface A. The polarizing plate 130 is arranged such that the transmission axis of the polarizing plate 130 is obliquely shifted with respect to the liquid crystal molecule aligning direction on the front substrate 12 of the liquid crystal cell 10.

Figure 15:
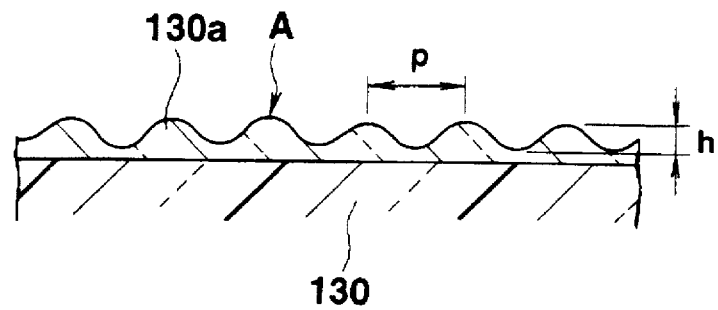
FIG. 15 is an enlarged sectional view showing a light-scattering surface arranged on the polarizing plate in the color liquid crystal display device of FIG. 14.

As indicated by the partial sectional view in FIG. 15, the light-scattering surface A as the front surface of the polarizing plate 130 is constituted by a transparent layer 130a having small corrugations on the front surface of the polarizing plate 130.

The transparent layer 130a consists of a resin, e.g., acrylic resin, having a high transmittance. This transparent layer 130a is formed by one of the following methods: a method of transferring/printing a resin material on the surface of the polarizing plate 130 by using a printing plate having small corrugations and hardening the resin material; a method of coating the above resin material on the surface of the polarizing plate 130 to a uniform thickness, forming corrugations by embossing, and hardening the resin material; and a method of coating the above resin material containing transparent particles consisting of silica or the like on the surface of the polarizing plate 130, and hardening the material.

An average height of corrugations (an average difference in height between recessed surfaces and projected surfaces) h of the transparent layer 130a is 1 to 5 μm; an average pitch p of the corrugations, 5 to 40 μm; and the haze value of the light-scattering surface A, 9 to 14%.

The above haze value is a value measured by an integrating sphere type transmittance meter (hazemeter) conforming to JIS K 6714. This haze value is calculated by the following equations:

total light transmittance: Tt (%)=T2/T1 parallel light transmittance: Tp (%)=Tt−Td diffusion transmittance: Td (%)=[T4−T3××(T2/T1)]/T1 haze value: H (%)=(Td/Tt)×100

T1: incident light amount

T2: total transmitted light amount

T3: diffused light amount measured by measuring instrument

T4: diffused light amount measured by using test sample (transparent layer 130a) and measuring instrument In the liquid crystal display device of this embodiment, the liquid crystal molecule aligning directions on the two substrates 11 and 12 of the liquid crystal cell 10 (i.e., the rubbing directions of the aligning films 19 and 21), the direction of the transmission axis of the polarizing plate 130, and the direction of the phase delay axis of the retardation plate 50 are set as follows.

In this embodiment, the liquid crystal molecule aligning direction on the rear substrate 11 of the liquid crystal cell 10 is defined as a direction at an azimuth of 0°, and the liquid crystal molecule aligning direction on the front substrate 12 of the liquid crystal cell 10, the transmission axis direction of the polarizing plate 130, and the phase delay axis direction of the retardation plate 50 are set at an azimuth of 0° with reference to this direction.

Figure 16A:
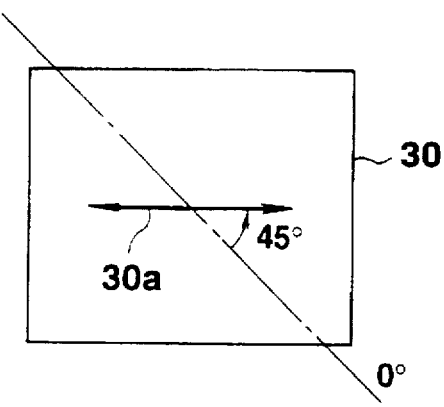
FIGS. 16A, 16B, and 16C are plan views respectively showing the transmission axis of the polarizing plate, the phase delay axis of a retardation plate, and the molecule aligning film direction of a liquid crystal layer.
Figure 16B:
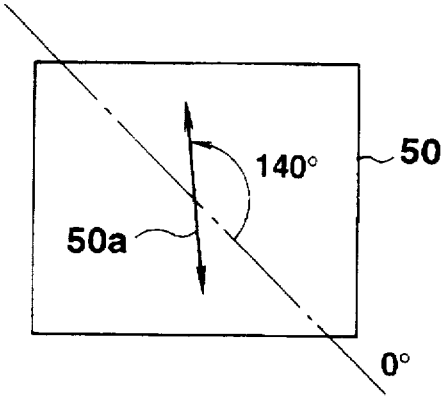
Figure 16C:
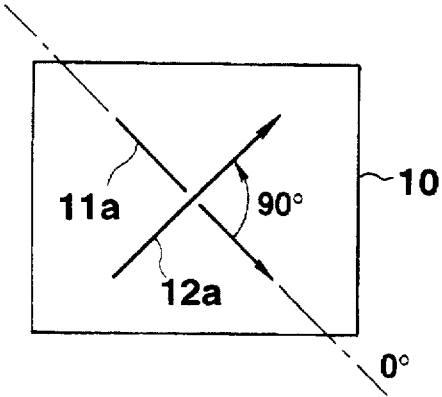

FIGS. 16A, 16B, and 16C are plan views respectively showing the direction of the transmission axis of the polarizing plate 130, the direction of the phase delay axis of the retardation plate 50, and the liquid crystal molecule aligning directions of the liquid crystal cell 10 in the above liquid crystal display device. Referring to FIGS. 16A to 16C, reference numeral 11a denotes a liquid crystal molecule aligning direction on the rear substrate 11 of the liquid crystal cell 10; and 12a, a liquid crystal molecule aligning direction on the front substrate 12 of the liquid crystal cell 10.

As shown in FIG. 16C, the liquid crystal molecule aligning direction 12a on the front substrate 12 of the liquid crystal cell 10 is shifted counterclockwise from the liquid crystal molecule aligning direction 11a, i.e., the direction at an azimuth of 0°, on the rear substrate 11 by almost 90° when viewed from the front surface side, and the molecules of the liquid crystal LC are twisted/aligned between the two substrates 11 and 12 at a twist angle of almost 90°.

Referring to FIGS. 16A and 16B, reference numeral 130a denotes a transmission axis of the polarizing plate 130. The transmission axis 130a of the polarizing plate 130 is shifted counterclockwise by almost 45° from the direction at an azimuth of 0° when viewed from the front surface side, and the phase delay axis 50a of the retardation plate 50 is shifted counterclockwise by almost 140° from the direction at the azimuth of 0° when viewed from the front surface direction. Therefore, the phase delay axis 50a of the retardation plate 50 is obliquely shifted from the transmission axis 130a of the polarizing plate 130 by almost 95° when viewed from the front surface side.

This liquid crystal display device is of a reflection type, which performs a display operation by using light (natural light or indoor illumination light) incident on the front surface side. In the liquid crystal display device, light incident on the front surface side of the device passes through the polarizing plate 130 and the retardation plate 50 to be incident on the liquid crystal cell 10. The light passing through the liquid crystal layer is reflected by the pixel electrodes 113 also serving as reflecting films on the inner surface of the rear substrate 11 of the liquid crystal cell 10 to pass through the liquid crystal layer and the retardation plate 50 again to be incident on the polarizing plate 130. The light transmitted through the polarizing plate 130 then emerges from the front surface side of the liquid crystal display device.

In this liquid crystal display device, since the phase delay axis 50a of the retardation plate 50 is obliquely shifted from the transmission axis 130a of the polarizing plate 130, while the linearly polarized light incident through the polarizing plate 130 passes through the retardation plate 50, the linearly polarized light is polarized by the birefringence effect of the retardation plate 50 into elliptically polarized light components whose polarized states are different from each other at respective wavelengths. In the process of passage of the elliptically polarized light components through the liquid crystal layer of the liquid crystal cell 10, the polarized states of the elliptically polarized light components are changed by the birefringence effect of the liquid crystal layer of the liquid crystal cell 10, and the elliptically polarized light components are reflected by the pixel electrodes 113 on the inner surface of the rear substrate 11 of the liquid crystal cell 10. In the process of passage of the elliptically polarized light components through the liquid crystal layer and the retardation plate 50, the polarized states of the elliptically polarized light components are further changed. The elliptically polarized light components are incident on the polarizing plate 130.

The reflected light incident on the polarizing plate 130 is the elliptically polarized light having light components whose polarized states are changed by the birefringence effects of the retardation plate 50 and the liquid crystal layer and different from each other at respective wavelengths. For this reason, of the elliptically polarized light, only light of wavelength having polarized light components passing through the polarizing plate 130 emerges through the polarizing plate 130, and the exit light emerges from the front surface of the liquid crystal display device as colored light having a color corresponding to the light amount ratio of the wavelength light.

The display colors of the above liquid crystal display device will be described. Assume, as described above, that the liquid crystal molecules of the liquid crystal cell 10 are twisted/aligned between the two substrates 11 and 12 at a twist angle of almost 90°, and the liquid crystal molecule aligning directions 11a and 12a on the two substrates 11 and 12, the transmission axis 130a of the polarizing plate 130, and the phase delay axis 50a of the retardation plate 50 are respectively set in the directions shown in FIGS. 16A to 16C, while a value Δn·d (the product of a refractive index anisotropy Δn and a liquid crystal layer thickness d of the liquid crystal LC) of the liquid crystal cell 10 is about 1,000 nm; and the retardation value of the retardation plate 50, about 600 nm. In this case, red, green, blue, and white can be displayed by one pixel.

Figure 17:
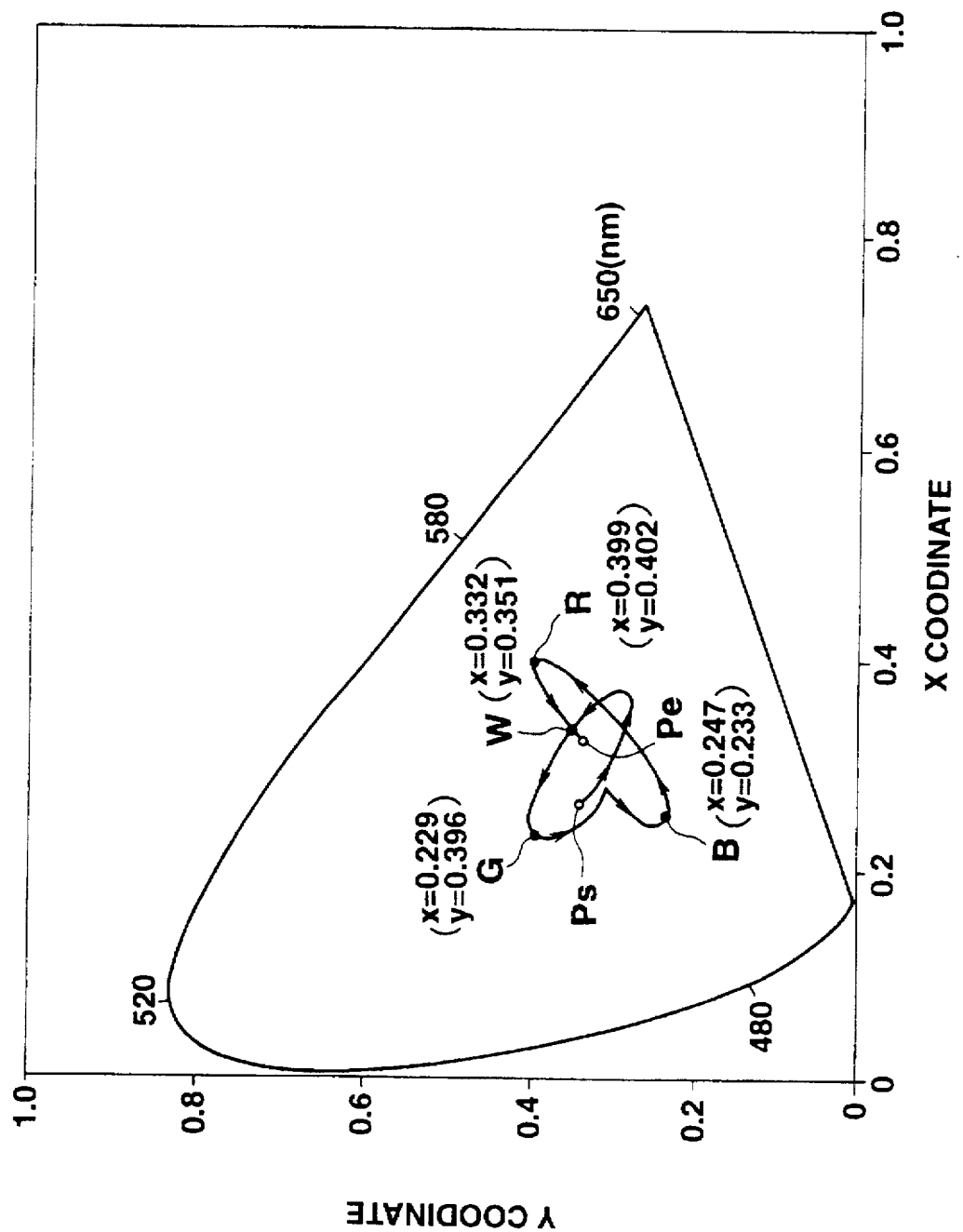
FIG. 17 is a CIE chromaticity diagram showing a change in display color with respect to a voltage applied to the color liquid crystal display device shown in FIG. 14.

FIG. 17 shows a CIE chromaticity diagram indicating a change in the color of exit light with a change in the voltage applied to the liquid crystal display device. More specifically, FIG. 17 shows a result obtained by causing white light to be incident, on the liquid crystal display device, from a direction at 30° (an arbitrary azimuth) with respect to the normal of the device, and observing exit light from the direction of the normal of the liquid crystal display device.

As shown in FIG. 17, in the above liquid crystal display device, as the voltage applied between the electrodes 113 and 20 of the liquid crystal cell 10 is raised, the color of exit light changes from a point Ps to a point Pe, as indicated by the arrows. In this process, the exit light becomes green G, blue B, red R, and white W, each having a high light intensity and a high chromaticity purity.

These colors G, B, R, and W have the following x- and y-coordinate values: x=0.229 and y=0.396 for green G; x=0.247 and y=0.233 for blue B; x=0.399 and y=0.402 for red R; and x=0.332 and y=0.351for white W, each exhibiting a sufficiently high chromatic purity.

In the above liquid crystal display apparatus, as shown in FIG. 17, even in the process of a change in the color of exit light from green G to blue B, the color of the reflected light approaches white W. However, in this case, a change in color with a change in voltage is large. For this reason, cumbersome voltage control is required to display this color. Therefore, white W is preferably displayed by using a voltage higher than a voltage for obtaining a display color of red R.

Although the above liquid crystal display device is of a reflection type, the light amount loss due to light absorption in the substrates of the liquid crystal cell 10 and the polarizing plate can be reduced, and the device can provide a brighter color display because light is reflected by the pixel electrodes 113 arranged on the inner surface of the rear substrate 11 of the liquid crystal cell 10, the polarizing plate 130 arranged on the front surface side of the liquid crystal cell 10 has a polarizing action for linearly polarizing external incident light and a analyzing action for controlling transmission of light whose polarized state is changed by the retardation plate 50 and the liquid crystal layer, the light passes through only the front substrate 12 of the two substrates 11 and 12 of the liquid crystal cell 10, and only one polarizing plate 130 is used.

In the above liquid crystal display device, although the pixel electrodes 113 arranged on the inner surface of the rear substrate 11 of the liquid crystal cell 10 are also used as reflecting films, the front surface of the polarizing plate 130 is the light-scattering surface A. Even if, therefore, the front surfaces (reflecting surfaces) of the pixel electrodes 113 are mirror surfaces, so-called reflection of an external image, i.e., reflection of an external image such as the face of a display observer or its background in the reflecting surface, can be prevented.

More specifically, the above liquid crystal display device has a very high transmittance. For this reason, if the front surfaces of the pixel electrodes 113 also serving as reflecting films are mirror surfaces, an external image such as the face of a display observer or its background is reflected by the front surfaces of the pixel electrodes 113. As a result, the image overlaps a display image. If, however, the front surface of the polarizing plate 130 arranged on the front surface of the liquid crystal display device is the light-scattering surface A, light corresponding to the external image is scattered by the front surface of the polarizing plate 130. For this reason, the reflection of the above external image does not occur.

Furthermore, in the above liquid crystal display device, since the front surfaces of the pixel electrodes 113 serving as reflecting films are mirror surfaces, light whose polarized state is changed by the birefringence effects of the retardation plate 50 and the liquid crystal layer can be reflected to be incident on the polarizing plate 130 without being scattered. When the front surface of the polarizing plate 130 is the light-scattering surface A, light which is incident on the liquid crystal display device from its front surface side is scattered and linearly polarized by the polarizing action of the polarizing plate 130. In addition, light reflected by the pixel electrodes 113 is changed into colored light by the analyzing action of the polarizing plate 130 and then scattered. For this reason, the light is not scattered until the light incident through the polarizing plate 130 passes through the polarizing plate 130 again to be colored light. Therefore, a color image having high quality can be displayed.

The scattering effect of the light-scattering surface A is determined by the above haze value. If this haze value is 25% or more, light emerging through the polarizing plate 130 is scattered greatly, resulting in an unclear display image. If the haze value is 6% or less, reflection of the above external image occurs. If the haze value of the light-scattering surface A falls within the range of 9 to 14%, a clear display image can be obtained, and reflection of an external image can be prevented.

In addition, in the liquid crystal display device, the pixel electrodes 113 arranged on the inner surface of the rear substrate 11 of the liquid crystal cell 10 are used as reflecting films. For this reason, although light is reflected by the inner surface of the rear substrate 11 of the liquid crystal cell 10 in the liquid crystal display device, the structure of the liquid crystal cell 10 can be simplified, and the liquid crystal display device can be easily manufactured.

Fifth Embodiment

Figure 18:
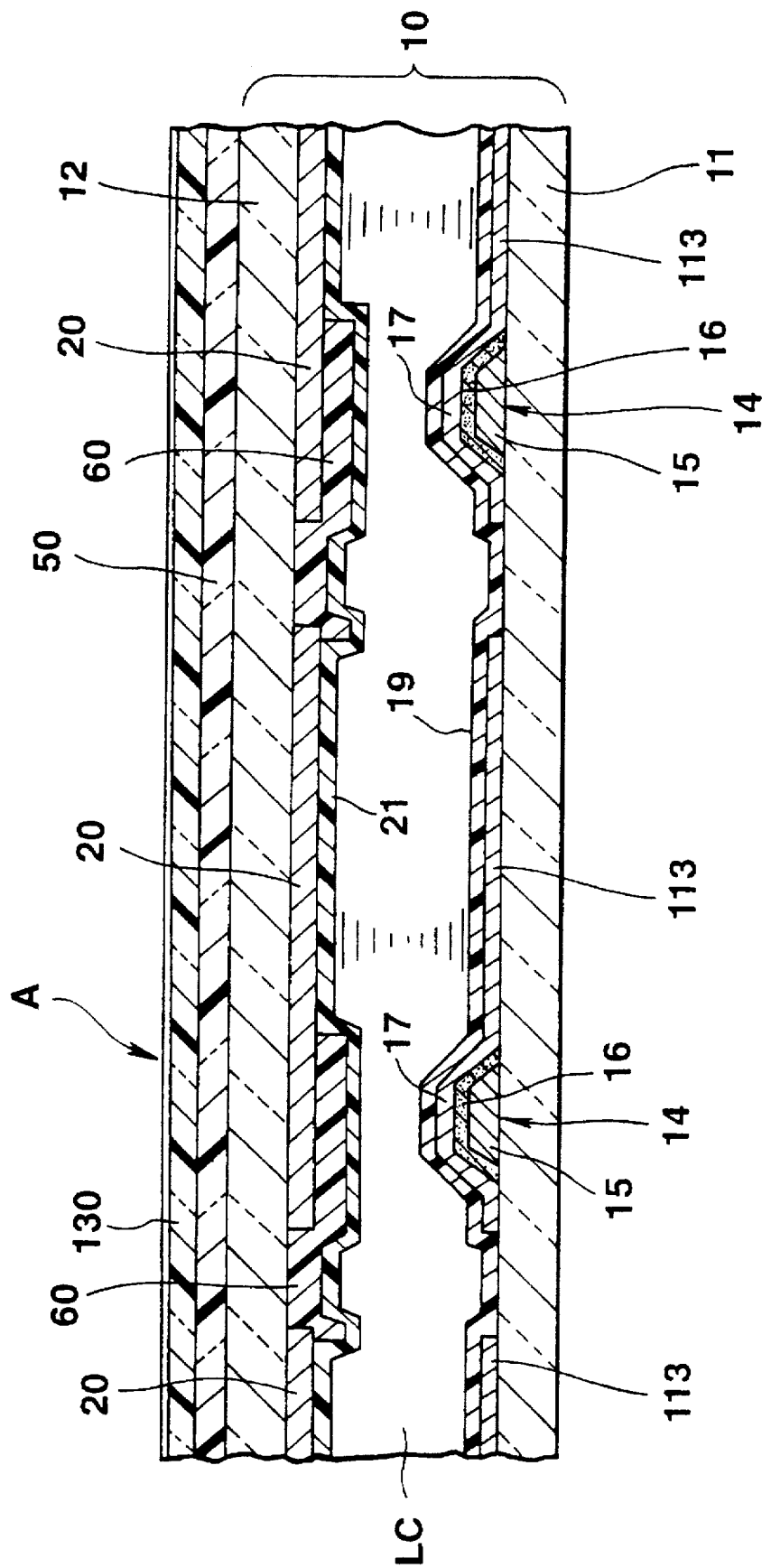
FIG. 18 is a sectional view showing part of a color liquid crystal display device according to the fifth embodiment of the present invention.
Figure 19:
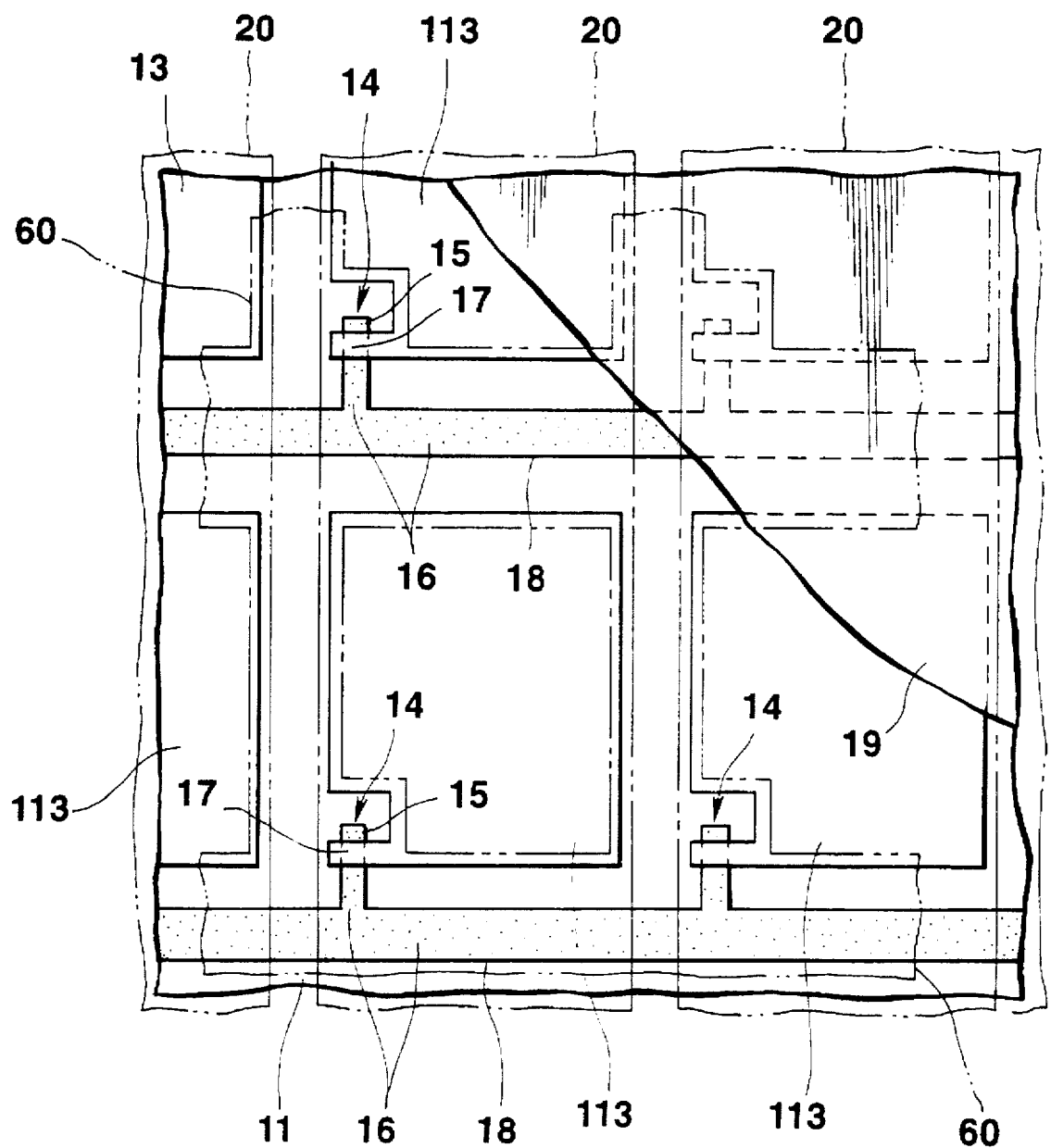
FIG. 19 is a plan view showing part of a liquid crystal cell in FIG. 18.

FIGS. 18 and 19 show a reflection type color liquid crystal display device according to the fifth embodiment of the present invention. In the reflection type color liquid crystal device of the fifth embodiment, light-shielding members for preventing leakage of light between the plurality of pixels are arranged on the inner surface of the front substrate of a pair of substrates, thereby increasing contrast. Unlike the color liquid crystal display device of the fourth embodiment shown in FIG. 14, the reflection type color liquid crystal display device of the fifth embodiment has black masks. Since the remaining arrangement of the fifth embodiment is the same as that of the fourth embodiment, the same reference numerals as in the fourth embodiment denote the same parts in the fifth embodiment, and a description thereof will be omitted.

The fifth embodiment of the present invention will be described below with reference to the FIGS. 18 and 19. FIG. 18 is a sectional view showing part of the reflection type color liquid crystal display device, and FIG. 19 is a plan view showing part of the liquid crystal cell of the reflection type color liquid crystal display device in FIG. 18.

The liquid crystal display device of the embodiment is constituted by a liquid crystal cell 10, one polarizing plate 130, and one retardation plate 50. The polarizing plate 130 is arranged on the front surface side of the liquid crystal cell 10, and the retardation plate 50 is arranged between the liquid crystal cell 10 and the polarizing plate 130.

The liquid crystal cell 10 is an active matrix liquid crystal cell having two-terminal nonlinear resistor elements as active elements. In this embodiment, MIMs are used as active elements.

On the inner surface, i.e., the surface opposing a liquid crystal layer, of a rear substrate 11 of a pair of substrates 11 and 12 of the liquid crystal cell 10, a plurality of pixel electrodes 113 also serving as reflecting films and MIMs 14 corresponding to the pixel electrodes 113 are arranged in the row and column directions (lateral and vertical directions in FIG. 19) in the form of a matrix. A transparent aligning film 19 is arranged on the pixel electrodes 113 and the MIMs 14.

The lower electrodes 15 of the MIMs 14 of each row are connected to a drive signal supply line 18 arranged for each pixel electrode row. The upper electrode 17 of each MIM 14 is connected to the pixel electrode 113 corresponding to a corresponding one of the MIMs 14.

On the inner surface, i.e., the surface opposing the liquid crystal layer, of the front substrate 12 of the liquid crystal cell 10, a plurality of transparent counter electrodes 20 respectively opposing the pixel electrodes 113 of each column arranged on the rear substrate 11 are arranged. A transparent aligning film 21 is arranged on the counter electrodes 20.

Black masks 60 corresponding to the gaps between the respective pixel electrodes 113 arranged on the rear substrate 11 are arranged on the inner surface of the front substrate 12, and the black masks 60 are covered with the aligning film 21.

The black masks 60 are formed into a matrix pattern corresponding to the gaps between the rows and columns of the respective pixel electrodes 113 arranged on the rear substrate 11. This black mask 60 is formed to have vertical and lateral side portions each having such a width that its edge portion opposes an edge portion of the pixel electrode 113 with a small overlapping width.

Note that each MIM 14 arranged on the rear substrate 11 is present in a portion between the corresponding pixel electrodes 113. Therefore, the black masks 60 also oppose the MIMs 14 to entirely cover them.

Each black mask 60 described above is an insulating mask made of a black resin. The vertical side portions (side portions corresponding to the portion between the columns of the pixel electrodes 113) of the black mask 60 are formed on the portion between the corresponding counter electrodes 20 (inner surface of the substrate 12) to have both edge portions which overlap the edge portions of the adjacent counter electrodes 20, and the lateral side portions (side portions corresponding to the portion between the rows of the pixel electrodes 113) are formed on the counter electrodes 20 to cross the electrodes 20.

Note that the black mask 60 is formed by the following method. A black photosensitive resin is coated on the surface of the front substrate on which the counter electrodes 20 are formed, and the black photosensitive resin is subjected to an exposing process by using an exposure mask having a predetermined pattern. Thereafter, the photosensitive resin is calcined by a developing process.

The rear and front substrates 11 and 12 are joined to each other at their outer peripheral portions via a frame-like seal member, and a nematic liquid crystal LC having a positive dielectric anisotropy is filled in the area surrounded by the seal member between the substrates 11 and 12.

In the liquid crystal display device described above, since the black mask 60 corresponding to the gap between the corresponding pixel electrodes 113 arranged on the rear substrate 11 of the liquid crystal cell 10 is arranged on the inner surface of the front substrate 12 of the liquid crystal cell 10, the contrast between the respective pixels can be made higher, and a high-quality image can be displayed.

Sixth Embodiment

Figure 20:
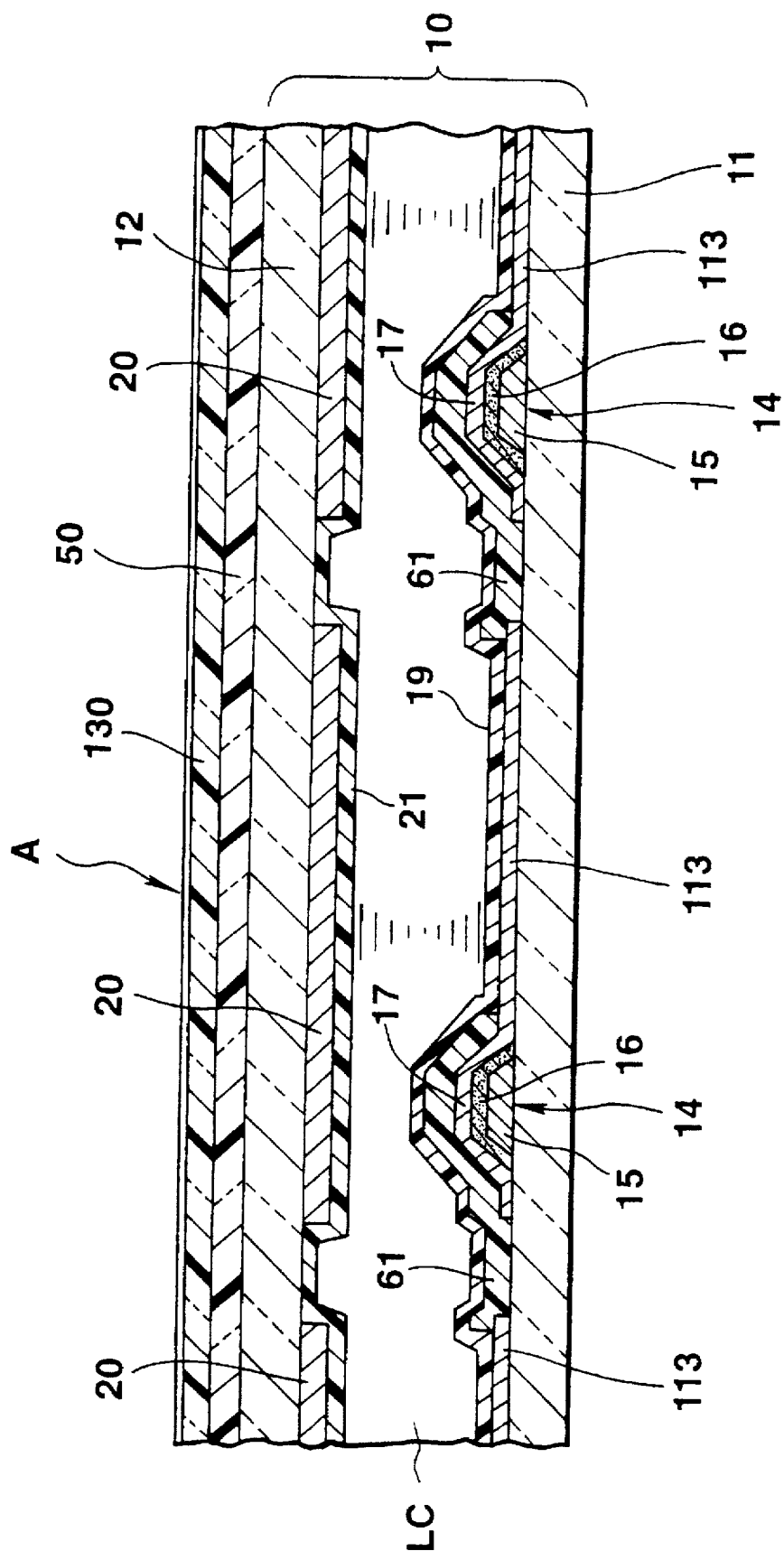
FIG. 20 is a sectional view showing part of a color liquid crystal display device according to the sixth embodiment of the present invention.
Figure 21:
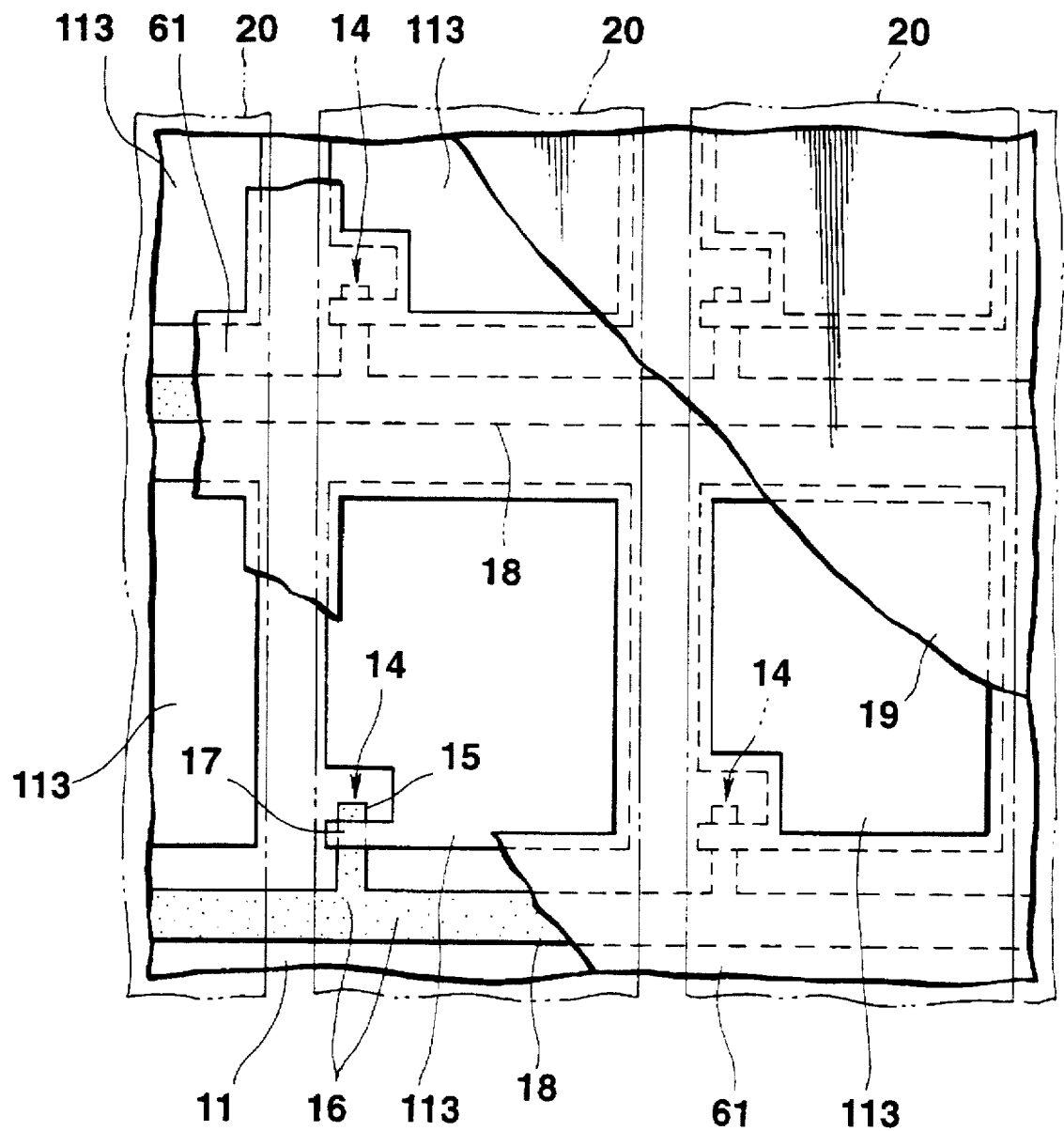
FIG. 21 is a plan view showing part of a liquid crystal cell in FIG. 20.

FIGS. 20 and 21 show a reflection type color liquid crystal display device according to the sixth embodiment of the present invention. In the reflection type color liquid crystal device of the sixth embodiment, light-shielding members for preventing leakage of light between the plurality of pixels are arranged on the inner surface of a rear substrate, thereby increasing contrast. Unlike the color liquid crystal display device of the fifth embodiment shown in FIG. 18, black masks are arranged on the inner surface of the rear substrate in the reflection type color liquid crystal display device of the sixth embodiment. Since the remaining arrangement of the sixth embodiment is the same as that of the fifth embodiment, the same reference numerals as in the fifth embodiment denote the same parts in the sixth embodiment, and a description thereof will be omitted.

In the fifth embodiment described above, the black masks 60 are formed on the inner surface of the front substrate 12 of the liquid crystal cell 10. However, these black masks 60 may be formed on the inner surface of the rear substrate 11 on which the pixel electrodes 113 and the TFTs 14 are arranged.

FIG. 20 is a sectional view showing part of the reflection type color liquid crystal display device according to the sixth embodiment of the present invention, and FIG. 21 is a plan view showing part of the liquid crystal cell of the reflection type color liquid crystal display device in FIG. 20. In this embodiment, black masks 61 are arranged on the inner surface of a rear substrate 11 of a liquid crystal cell 10 to correspond to the gaps between the respective pixel electrodes 113 arranged on the substrate 11, and an aligning film (transparent film) 19 is arranged on the black masks 61. Each black mask 61 is formed to have almost the same shape as that of the black mask 60 in the fifth embodiment described above.

In the sixth embodiment, since the black masks 61 are arranged on the inner surface of the rear substrate 11 on which the pixel electrodes 113 and MIMs 14 are arranged, the black masks 61 can be formed in the gaps between the pixel electrodes 113 at a high positional accuracy.

More specifically, each of the black masks 61 is formed by the following method. For example, a black photosensitive resin is coated, and the black photosensitive resin is subjected to an exposing process by using an exposure mask having a predetermined pattern. Thereafter, the photosensitive resin is calcined by a developing process. However, when the black masks 61 are to be formed on the surface of the rear substrate 11 on which the pixel electrodes 113 and the MIMs 14 are formed, the exposure mask can be positioned at a high accuracy. For this reason, the black masks 61 can be formed in the gaps between the pixel electrodes 113 at a high positional accuracy.

In the fifth embodiment described above, since the black masks 60 are arranged on the front substrate 12 on which the counter electrodes 20 are arranged, in consideration of the positional offset between the pixel electrodes 113 and the black masks 60 which is caused by a positional error between both the substrates 11 and 12 while the liquid crystal cell 10 is assembled, the widths of the side portions of the black masks 60 must be selected such that the both the edges of the black masks 60 oppose the edge portions of the pixel electrodes 113 with a overlapping width slightly larger than the amount of the positional offset. However, when the black masks 61 are arranged on the inner surface of the rear substrate 11 on which the pixel electrodes 113 are arranged as described in the sixth embodiment, the positional offset between the pixel electrodes 113 and the black masks 61 caused by the positional error between both the substrates 11 and 12 need not be considered. For this reason, the overlapping width between the edge of the pixel electrodes 113 and each of both the edges of the side portions of the black mask 61 may be small. Therefore, the opening ratio of the liquid crystal display device can be increased by decreasing the overlapping width.

Note that, in each of the liquid crystal display devices of the fifth and sixth embodiments, although the retardation plate 50 is arranged between the polarizing plate 130 and the liquid crystal cell 10, the retardation plate 50 need not be arranged. In this case, when the polarizing plate 130 is arranged such that its transmission axis is obliquely shifted with respect to the liquid crystal molecule aligning direction on the front substrate 12 of the liquid crystal cell 10, light can be colored by using the birefringence effect of the liquid crystal layer of the liquid crystal cell 10 and the polarizing and analyzing actions of the polarizing plate 130.

Seventh Embodiment

Figure 22:
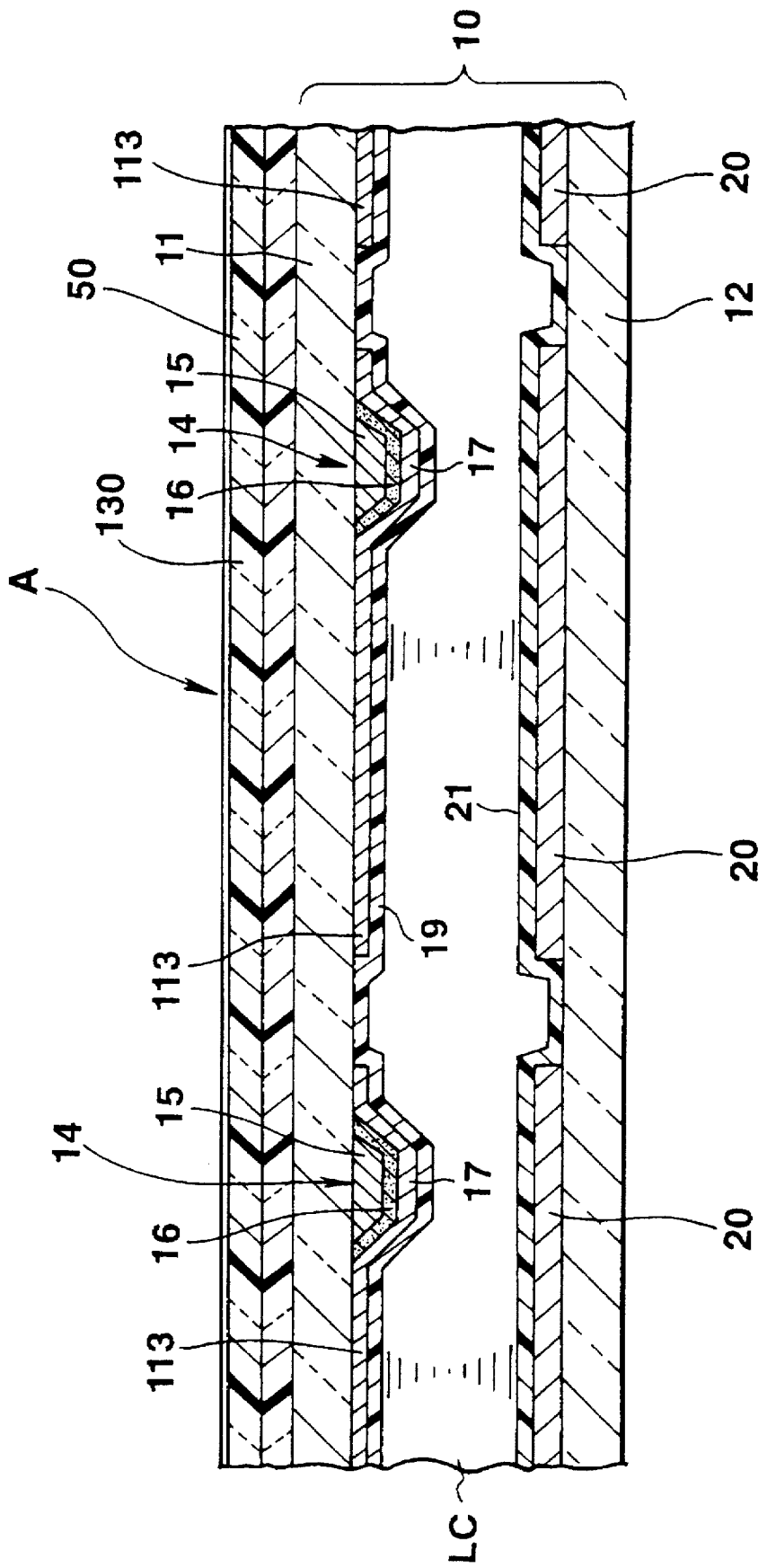
FIG. 22 is a sectional view showing part of a color liquid crystal display device according to the seventh embodiment of the present invention.

FIG. 22 shows a reflection type color liquid crystal display device according to the seventh embodiment of the present invention. In the reflection type color liquid crystal display device of the seventh embodiment, pixel electrodes and two-terminal nonlinear resistor elements are arranged on the inner surface of a front substrate. In this reflection type color liquid crystal display device, unlike the reflection type color liquid crystal display device of the fourth embodiment shown in FIG. 14, the front and rear substrates are replaced with each other such that the color liquid crystal display device can be observed from the direction of the rear substrate. Since the remaining arrangement of the seventh embodiment is the same as that of the fourth embodiment, the same reference numerals as in the fourth embodiment denote the same parts in the seventh embodiment, and a description thereof will be omitted.

The seventh embodiment of the present invention will be described below with reference to the FIG. 22. FIG. 22 is a sectional view showing part of the reflection type color liquid crystal display device.

The liquid crystal display device of the embodiment is constituted by a liquid crystal cell 10, one polarizing plate 130, and one retardation plate 50. The polarizing plate 130 is arranged on the front surface side of the liquid crystal cell 10, and the retardation plate 50 is arranged between the liquid crystal cell 10 and the polarizing plate 130.

The liquid crystal cell 10 is an active matrix liquid crystal cell having two-terminal nonlinear resistor elements as active elements. In this embodiment, MIMs are used as active elements.

On the inner surface, i.e., the surface opposing a liquid crystal layer, of a front substrate 11 (upper substrate in FIG. 22) of a pair of substrates 11 and 12 of the liquid crystal cell 10, a plurality of pixel electrodes 113 also serving as reflecting films and MIMs 14 corresponding to the pixel electrodes 113 are arranged in the row and column directions in the form of a matrix. A transparent aligning film 19 is arranged on the pixel electrodes 113 and the MIMs 14.

Each MIM 14 is constituted by a lower electrode 15 formed on the surface of the front substrate 11, an insulating film 16 covering the lower electrode 15, and an upper electrode 17 formed on the insulating film 16. The lower electrodes 15 of the MIMs 14 of each row are connected to a drive signal supply line (not shown) arranged for each pixel electrode row. The upper electrode 17 of each MIM 14 is connected to the pixel electrode 113 corresponding to a corresponding one of the MIMs 14.

On the inner surface, i.e., the surface opposing a liquid crystal layer, of the rear substrate (lower substrate in FIG. 22) 12 of the liquid crystal cell 10, a plurality of counter electrodes 20 respectively opposing the pixel electrodes 113 are arranged in rows on the front substrate 11. A transparent aligning film 21 is arranged on the counter electrodes 20.

Each counter electrode 20 is constituted by a metal film having a high reflectance and consisting of aluminum or an aluminum-based alloy. That is, the counter electrode 20 also serves as a reflecting film, and the front surface, i.e., the reflecting surface, of the counter electrode 20 is an almost mirror surface.

The front and rear substrates 11 and 12 are joined to each other at their outer peripheral portions via a frame-like seal member (not shown), and a liquid crystal LC is filled in the area surrounded by the seal member between the substrates 11 and 12.

Although the above liquid crystal display device is of a reflection type, the light amount loss due to light absorption in the substrates of the liquid crystal cell 10 and the polarizing plate can be reduced, and the device can provide a brighter color display because light is reflected by the counter electrodes 20 arranged on the inner surface of the rear substrate 12 of the liquid crystal cell 10. the polarizing plate 130 arranged on the front surface side of the liquid crystal cell 10 has a polarizing action for linearly polarizing external incident light and a analyzing action for controlling transmission of light whose polarized state is changed by the retardation plate 50 and the liquid crystal layer. the light passes through only the front substrate 11 of the two substrates 11 and 12 of the liquid crystal cell 10. and only one polarizing plate 130 is used.

In addition. in the liquid crystal display device. the counter electrodes 20 arranged on the inner surface of the rear substrate 12 of the liquid crystal cell 10 are used as reflecting films. For this reason. although light is reflected by the inner surface of the rear substrate 12 of the liquid crystal cell 10 in the liquid crystal display device. the structure of the liquid crystal cell 10 can be simplified. and the liquid crystal display device can be easily manufactured.

Eighth Embodiment

Figure 23:
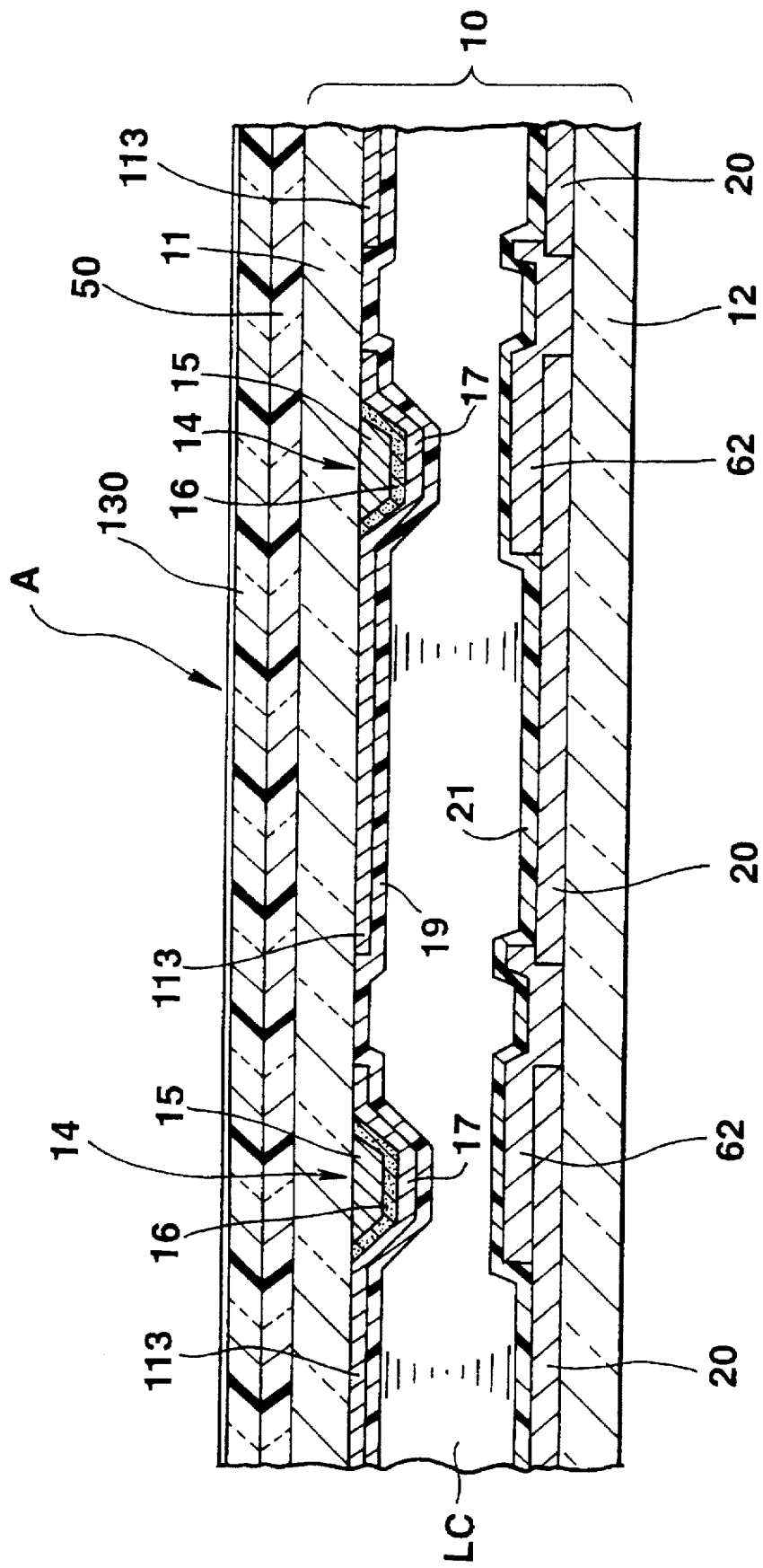
FIG. 23 is a sectional view showing part of a color liquid crystal display device according to the eighth embodiment of the present invention.

FIG. 23 shows a reflection type color liquid crystal display device according to the eighth embodiment of the present invention. The reflection type color liquid crystal display device of the eighth embodiment is obtained by arranging light-shielding members on the inner surface of the rear substrate of the liquid crystal cell of the reflection type color liquid crystal display device according to the seventh embodiment shown in FIG. 22 to prevent leakage of light between the plurality of pixels. Unlike the color liquid crystal display device of the seventh embodiment shown in FIG. 22. black masks are arranged in the reflection type color liquid crystal device of the eighth embodiment. Since the remaining arrangement of the eighth embodiment is the same as that of the seventh embodiment. the same reference numerals as in the seventh embodiment denote the same parts in the eighth embodiment. and a description thereof will be omitted.

The eighth embodiment of the present invention will be described below with reference to FIG. 23. FIG. 23 is a sectional view showing part of the reflection type color liquid crystal display device.

The liquid crystal display device of the embodiment is constituted by a liquid crystal cell 10. one polarizing plate 130. and one retardation plate 50. The polarizing plate 130 is arranged on the front surface side of the liquid crystal cell 10. and the retardation plate 50 is arranged between the liquid crystal cell 10 and the polarizing plate 130.

The liquid crystal cell 10 is an active matrix liquid crystal cell having two-terminal nonlinear resistor elements as active elements. In this embodiment. MIMs are used as active elements.

On the inner surface. i.e.. the surface opposing a liquid crystal layer. of a front substrate 11 of a pair of substrates 11 and 12 of the liquid crystal cell 10. a plurality of transparent pixel electrodes 113 constituted by transparent conductive films such as ITO films and a plurality of MIMs 14 respectively corresponding to the pixel electrodes 113 are arranged in the row and column directions in the form of a matrix. A transparent aligning film 19 is arranged on the pixel electrodes 113 and the MIMs 14.

On the inner surface. i.e.. the surface opposing a liquid crystal layer. of the rear substrate (lower substrate in FIG. 23) 12 of the liquid crystal cell 10. a plurality of counter electrodes 20 respectively opposing the pixel electrodes 113 arranged in rows on the front substrate 11. A transparent aligning film 21 is arranged on the counter electrodes 20.

Each counter electrode 20 is constituted by a metal film having a high reflectance and consisting of aluminum or an aluminum-based alloy. That is. the counter electrode 20 also serves as a reflecting film. and the front surface. i.e.. the reflecting surface. of the counter electrode 20 is an almost mirror surface.

Black masks 62 corresponding to the gaps between the respective pixel electrodes 113 arranged on the front substrate 11 are arranged on the inner surface of the rear substrate 12. and the black masks 62 are covered with the aligning film 21.

The black masks 62 are formed into a matrix pattern corresponding to the gaps between the rows and columns of the respective pixel electrodes 113 arranged on the front substrate 11. This black mask 62 is formed to have vertical and lateral side portions each having such a width that its edge portion opposes an edge portion of the pixel electrode 113 with a small overlapping width.

Note that each MIM 14 arranged on the front substrate 11 constitutes the gap between the respective pixel electrodes 113. Therefore. the black masks 62 also oppose the MIMs 14 to entirely cover them.

Each black mask 62 described above is an insulating mask made of a black resin. The vertical side portions (side portions corresponding to the portion between the columns of the pixel electrodes 113) of the black mask 62 are formed on the portion between the corresponding counter electrodes 20 (inner surface of the substrate 12) to have both edge portions which overlap the edge portions of the adjacent counter electrodes 20. and the lateral side portions (side portions corresponding to the portion between the rows of the pixel electrodes 113) are formed on the counter electrodes 20 to cross the electrodes 20.

Note that the black mask 62 is formed by the following method. A black photosensitive resin is coated on the surface of the rear substrate 12 on which the counter electrodes 20 are formed. and the black photosensitive resin is subjected to an exposing process by using an exposure mask having a predetermined pattern. Thereafter. the photosensitive resin is calcined by a developing process.

The rear and front substrates 11 and 12 are joined to each other at their outer peripheral portions via a frame-like seal member (not shown). and a liquid crystal LC is filled in the area surrounded by the seal member between the substrates 11 and 12.

In the liquid crystal display device described above. since the black mask 62 corresponding to the gap between the respective pixel electrodes 113 arranged on the front substrate 11 of the liquid crystal cell 10 is arranged on the inner surface of the rear substrate 12 of the liquid crystal cell 10. the contrast between the respective pixels can be made higher. and a high-quality image can be displayed.

Ninth Embodiment

In the eighth embodiment described above. the black masks 62 are arranged on the inner surface of the rear substrate 12 of the liquid crystal cell 10. However. the black masks 62 may be arranged on the inner surface of the front substrate 11 on which the pixel electrodes 113 and the MIMs 14 are arranged.

Figure 24:
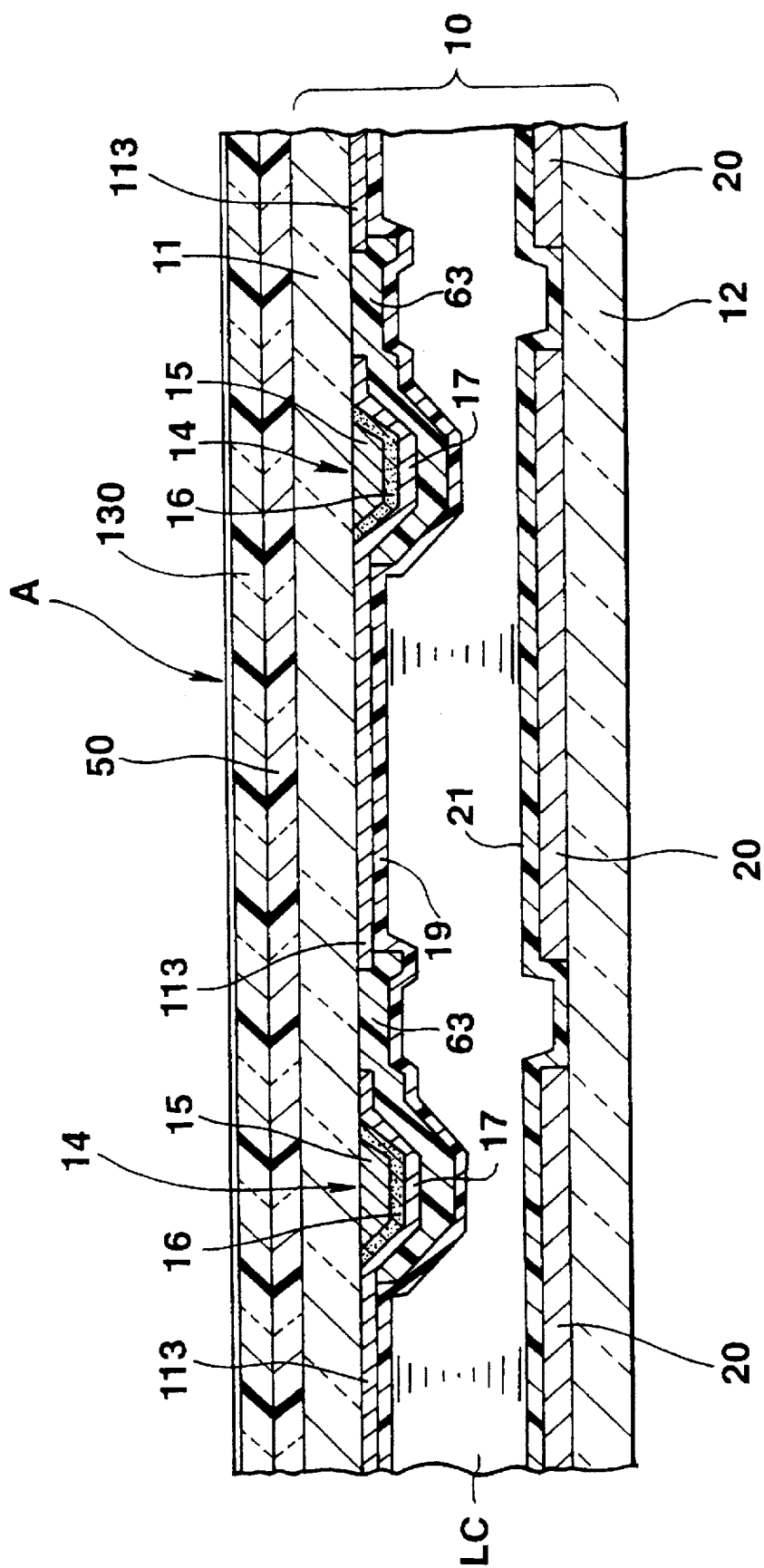
FIG. 24 is a sectional view showing part of a color liquid crystal display device according to the ninth embodiment of the present invention.

FIG. 24 shows a reflection type color liquid crystal display device according to the ninth embodiment of the present invention. In the reflection type color liquid crystal display device of the ninth embodiment. light-shielding members are arranged on the inner surface of a front substrate of a liquid crystal cell to prevent leakage of light between pixels. Unlike the reflection type color liquid crystal display device of the eighth embodiment shown in FIG. 23, black masks are arranged on the inner surface of the front substrate in the reflection type color liquid crystal display device of the ninth embodiment. Since the remaining arrangement of the ninth embodiment is the same as that of the eighth embodiment, the same reference numerals as in the eighth embodiment denote the same parts in the ninth embodiment, and a description thereof will be omitted.

FIG. 24 is a sectional view showing part of a reflection type color liquid crystal display device according to the ninth embodiment of the present invention. In this embodiment, black masks 63 are arranged on the inner surface of a front substrate 11 of a liquid crystal cell 10 to correspond to the gaps between respective pixel electrodes 113 arranged on the substrate 11, and an aligning film (transparent film) 19 is arranged on the black masks 63 and the pixel electrodes 113.

In the liquid crystal display device of this embodiment, light is reflected by counter electrodes 20 arranged on the inner surface of a rear substrate 12 of the liquid crystal cell 10 to perform a display operation, and the light is colored by using the birefringence effects of a retardation plate 50 and a layer of liquid crystal LC of the liquid crystal cell 10 and the polarizing/analyzing actions of a polarizing plate 130 without using a color filter. Various effects which are the same as those obtained in each of the first to eighth embodiments can be obtained.

In the ninth embodiment, since the black masks 63 are arranged on the inner surface of the front substrate 11 on which the pixel electrodes 113 and MIMs 14 are formed, the black masks 63 can be formed in the gaps between the pixel electrodes 113 at a high positional accuracy.

More specifically, each of the black masks 63 is formed by the following method. For example, a black photosensitive resin is coated, and the black photosensitive resin is subjected to an exposing process by using an exposure mask having a predetermined pattern. Thereafter, the photosensitive resin is calcined by a developing process. However, when the black masks 63 are to be formed on the surface of the rear substrate 11 on which the pixel electrodes 113 and the MIMs 14 are formed, the exposure mask can be positioned at a high accuracy. For this reason, the black masks 63 can be formed in the gaps between the pixel electrodes 113 at a high positional accuracy.

10th Embodiment

In each of the first to ninth embodiments described above, a display operation using colored light is performed by external light. However, when the external light is weak, a display becomes dark, and the visibility thereof is degraded. In addition, when no external light is present, the display cannot be visually recognized. In a color liquid crystal display device of the 10th embodiment a display can be visually recognized at a dark place where no external light is present.

FIGS. 25 to 36 show a reflection type color liquid crystal display device according to the 10th embodiment of the present invention. Since the basic structure of the reflection type color liquid crystal display device of the 10th embodiment is the same as that of the reflection type color liquid crystal display device of the fifth embodiment shown in FIG. 18, the same reference numerals as in the fifth embodiment denote the same parts in the 10th embodiment, and a description thereof will be omitted.

Figure 25:
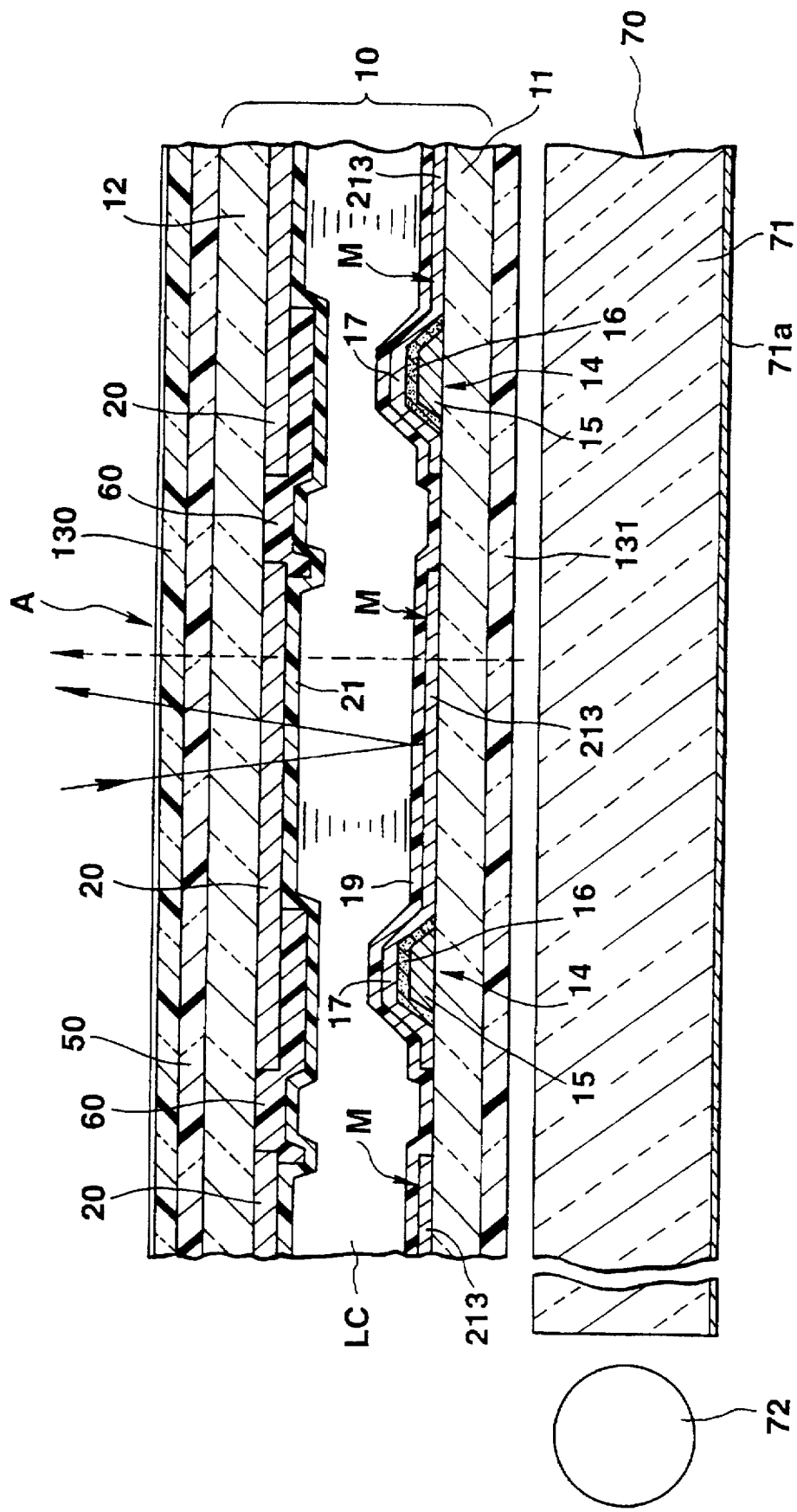
FIG. 25 is a sectional view showing part of a color liquid crystal display device according to the 10th embodiment of the present invention.

Referring to FIG. 25, in the liquid crystal display device, a first polarizing plate (to be referred to as a front polarizing plate hereinafter) 130 is arranged on the front surface side (upper side in FIG. 25) of a liquid crystal cell 10, a second polarizing plate (to be referred to as a rear polarizing plate hereinafter) 131 is arranged on the rear surface side (lower side in FIG. 25) of the liquid crystal cell 10, a retardation plate 50 is arranged between the liquid crystal cell 10 and the front polarizing plate 130, and a light source 70 is arranged behind the rear polarizing plate 131.

As in the fifth embodiment, the liquid crystal cell 10 is an active matrix liquid crystal cell using two-terminal nonlinear resistor elements as active elements. In this embodiment, MIMs 14 are used as active elements.

In the liquid crystal cell 10, on the inner surface, i.e., the surface opposing a liquid crystal layer, of a rear substrate 11 of a pair of substrates 11 and 12, a plurality of pixel electrodes 213 and a plurality of MIMs 14 respectively corresponding to the pixel electrodes 213 are arranged in the row and column directions in the form of a matrix. A transparent aligning film 19 is arranged on the pixel electrodes 213 and the MIMs 14.

Each pixel electrode 213 also serves as a semitransparent reflecting film M, and its reflecting surface is an almost mirror surface. This semitransparent film M, like a half mirror, reflects/transmits light at a predetermined reflectance/transmittance. In this embodiment, a semitransparent reflecting film M having a transmittance of 5 to 20% is used as the pixel electrode 213. Note that the reflectance of the semitransparent reflecting film M may be set to be about 14% or more.

The semitransparent reflecting film M (pixel electrode 213) is formed by a metal film consisting of Al, an Al-based alloy, or the like, or the semi-transparent reflecting film M is constituted by a film obtained by stacking a transparent conductive film such as an ITO film on a metal film.

Figure 26:
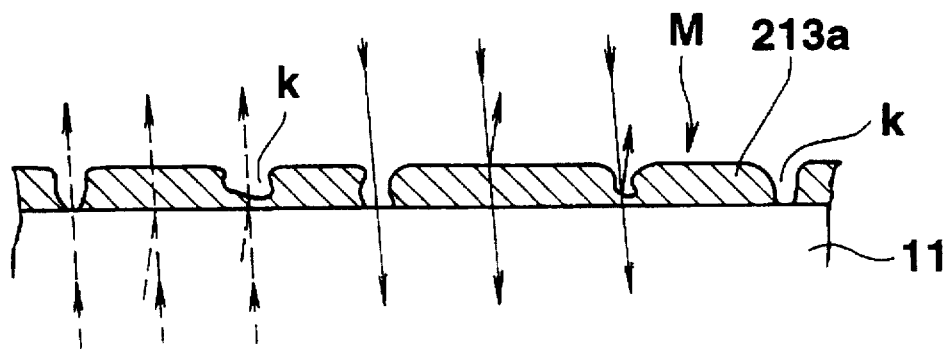
FIG. 26 is an enlarged sectional view showing a semitransparent reflecting film in the color liquid crystal display device of FIG. 25.
Figure 27:
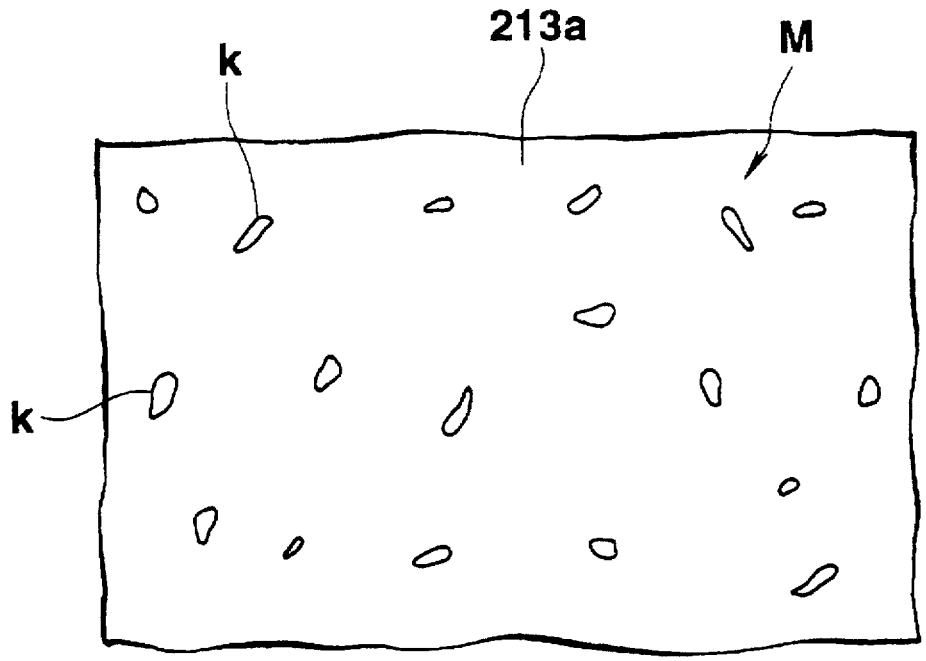
FIG. 27 is an enlarged plan view of the semitransparent reflecting film shown in FIG. 26.

FIGS. 26 and 27 are sectional and plan views showing part of the first example of the semi-transparent reflecting film M. The semitransparent reflecting film M is constituted by a metal thin film 213a having a very small thickness and formed by a sputtering device.

More specifically, the semitransparent reflecting film M is formed such that metal particles are deposited on the underlying surface (the surface of the rear substrate 11 in this case) by a sputtering device to have a very small thickness. The semitransparent reflecting film M shown in FIGS. 25 and 26 is constituted by the metal thin film 213a in which small defective portions k such as hole defects in which no metal particles are deposited or recessed defects having a small deposition thickness of metal particles are formed at various positions. Note that the defective portions k have irregular shapes, and the sizes and distribution state of the defective portions k change in accordance with the thickness of the metal thin film 213a.

The semitransparent reflecting film M reflects/transmits light incident from the front surface side, as indicated by solid arrows in FIG. 26, and light incident from the rear surface side, as indicated by broken arrows, at a predetermined reflectance/transmittance. Part of light incident on a film portion (portion except for the defective portion k) of the metal thin film 213a is reflected by the film surface of the metal thin film 213a, and another part of the light is transmitted through the metal thin film 213a. The remaining light is absorbed by the metal thin film 213a.

Since each of the recessed defective portions, each having a small deposition thickness of metal particles, of the defective portions k of the metal thin film 213a has a very small thickness, a very small amount of light is reflected and absorbed by the recessed defective portion. For this reason, large part of light incident on the recessed defective portions is transmitted through the metal thin film 213a. On the other hand, almost all part of light incident on the hole defective portions in which no metal particles are deposited is transmitted through the metal thin film 213a.

However, the total area of the defective portions k per unit area of the metal thin film 213a is considerably smaller than the area of the film portion per unit area. Therefore, the transmittance of the semitransparent reflecting film M is almost entirely controlled by the transmittance of the film portion of the metal thin film 213a.

The transmittance of the film portion of the metal thin film 213a is determined by the optical constant and film thickness of a metal serving as a material. For this reason, when the film thickness of the metal thin film 213a is properly selected, the above semitransparent reflecting film M having a transmittance of 5 to 20% can be obtained.

Although the semitransparent reflecting film M shown in FIGS. 26 and 27 is constituted by the metal thin film 213a in which the small defective portions k such as hole defects and recessed defects are formed at various positions, the semitransparent reflecting film M may be a metal thin film in which the hole defects and recessed defects are rarely formed. In this case, when the thickness of the metal thin film may be about 20 nm or less, this metal thin film can be used as the semitransparent reflecting film M.

More specifically, in formation of a metal thin film using a sputtering device, when the thickness of the film is about 10 nm or less, the obtained metal thin film has hole and recessed defects. However, the thickness of the metal thin film is increased to about 10 nm or more, the sizes of the hole defects and recessed defects decrease accordingly, and the number of hole and recessed defects decreases. When the thickness becomes a predetermined thickness or more, the hole and recessed defects almost entirely clog, and the metal thin film having an almost flat surface is obtained.

For example, when the metal thin film consists of Al or an Al-Ti (titanium) alloy and has a thickness of, e.g., 8.5 nm, the metal thin film is the film having the small defective portions k shown in FIGS. 26 and 27. This metal thin film has a transmittance of about 10 to 20% and a sheet resistance of 53 Ω/□.

In addition, a metal thin film consisting of Al or the Al-Ti alloy and having a thickness of 17.0 nm is a film which has an almost flat surface and rarely has the hole and recessed defects. The metal thin film has a transmittance of about 5% or less and a sheet resistance of 14 Ω/□.

Although the transmittance of the semitransparent reflecting film M may be set within the range of 5 to 20%, the transmittance is desirably set to be 6% or more, and preferably 7% or more to effectively use light from the light source 70.

However, in order to increase the transmittance of the semitransparent reflecting film M described above, the thickness of the metal thin film must be decreased to some extent. For this reason, the sheet resistance of the metal thin film increases. However, when the semitransparent reflecting film M is constituted by a film obtained by stacking a transparent conductive film such as an ITO film on a metal having a high reflectance, the sheet resistance can be decreased.

Figure 28:
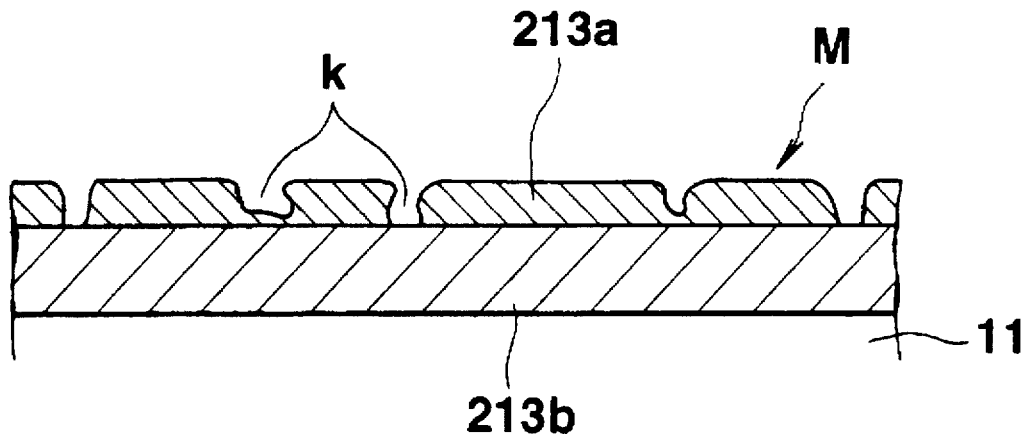
FIG. 28 is an enlarged sectional view showing another semitransparent reflecting film in the color liquid crystal display device of FIG. 25.
Figure 29:
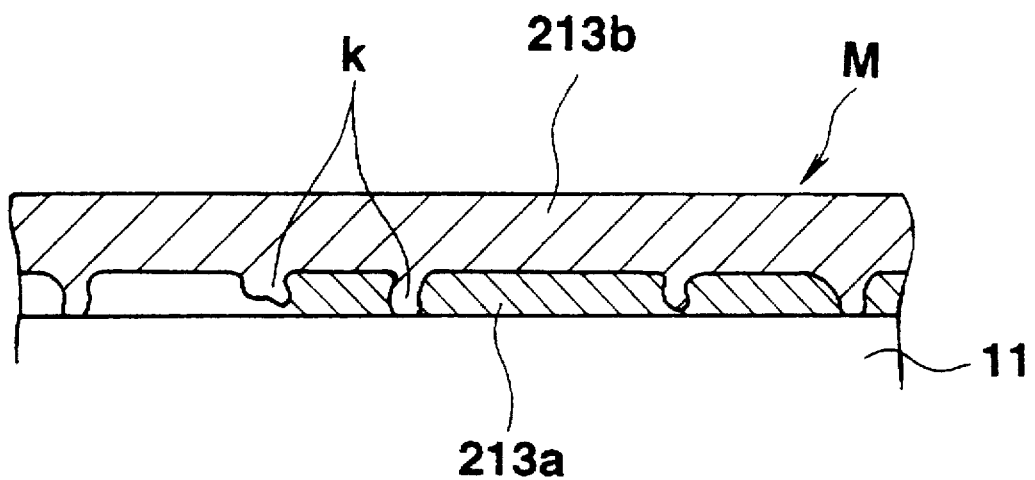
FIG. 29 is an enlarged sectional view showing still another semitransparent reflecting film in the color liquid crystal display device of FIG. 25.

More specifically, FIGS. 28 and 29 are sectional views showing parts of the second and third examples of the semitransparent reflecting film M, respectively. The semitransparent reflecting film M shown in FIG. 28 is formed as follows. That is, an ITO film 213b is formed by a sputtering device on the underlying surface (surface of the rear substrate 11) of the semitransparent reflecting film M, and the metal thin film 213a shown in FIGS. 26 and 27 is formed on the ITO film 213b.

The semitransparent reflecting film M shown in FIG. 29 is formed as follows. That is, the metal thin film 213a shown in FIGS. 26 and 27 is formed on the underlying surface (surface of the rear substrate 11) of the semitransparent reflecting film M, and the ITO film 213b is formed on the metal thin film 213a by a sputtering device.

The sheet resistance of the ITO film 213b of each of the semitransparent reflecting films M shown in FIGS. 28 and 29 is 40 Ω/□ when the thickness of the ITO film 213b is 50 nm. For this reason, even if the sheet resistance of the metal thin film 213a is high to some extent, the apparent sheet resistance of the semitransparent reflecting film M can be decreased.

Although the metal thin film 213a of each of the semitransparent reflecting films M shown in FIGS. 28 and 29 is a metal thin film in which small defective portions k such as hole defects and recessed defects, the metal thin film may be a metal thin film which has an almost flat surface and rarely has the defective portions k.

Figure 30:
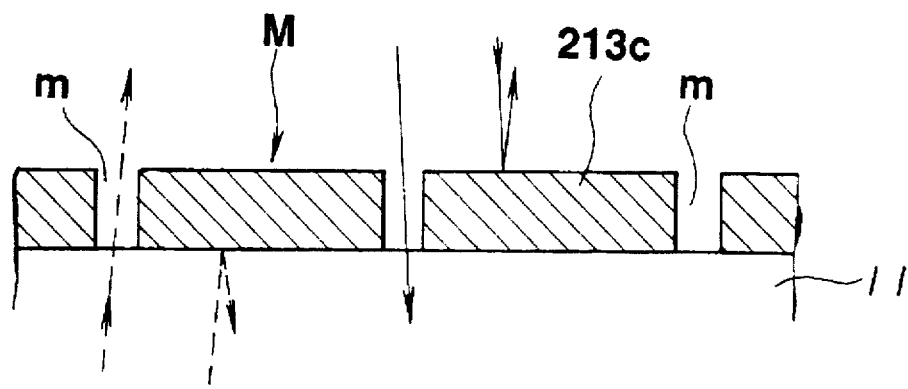
FIG. 30 is an enlarged sectional view showing still another semitransparent reflecting film in the color liquid crystal display device of FIG. 25.
Figure 31:
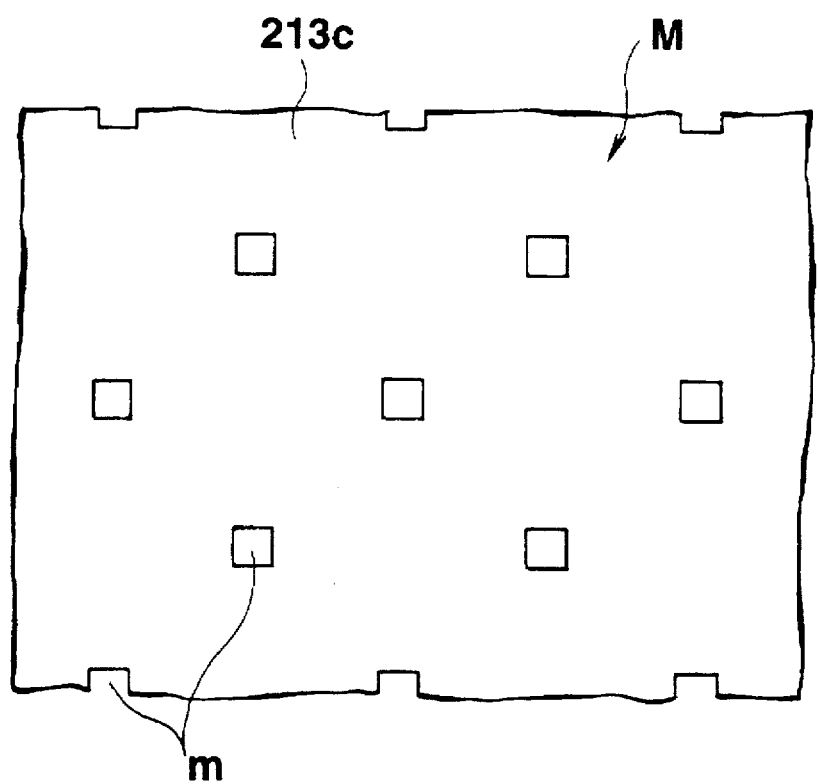
FIG. 31 is an enlarged plan view of the semitransparent reflecting film shown in FIG. 30.

In addition, FIGS. 30 and 31 are sectional and plan views showing part of the fourth example of the semitransparent reflecting film M. This semitransparent reflecting film M is constituted by an opaque metal film 213c in which small openings m are scattered.

More specifically, the semitransparent reflecting film M is formed as follows. That is, the metal film 213c consisting of Al or an Al-based alloy is formed on the underlying surface (surface of the lower substrate 11) of the semitransparent reflecting film M to have a thickness (about 300 nm) at which the metal film 213c does not transmit light. A large number of small openings m are formed in the metal film 213c by a photolithography method.

In the semitransparent reflecting film M, light incident on the film portion (except for the openings m) of the metal film 213c is reflected, and light incident on the openings m is transmitted through the metal film 213c. Light incident from the front surface side, as indicated by solid arrows in FIG. 30, and light incident from the rear surface side, as indicated by broken arrows, are reflected by the metal film 213c at a predetermined reflectance and transmitted through the metal film 213c at a predetermined transmittance respectively.

Since the semitransparent reflecting film M is constituted by the relatively thick metal film 213c having a thickness at which light is not transmitted through the metal film 213c, the semitransparent reflecting film M advantageously has a low sheet resistance. In addition, the transmittance of the semitransparent reflecting film M is determined by the total area of the openings m distributed in a unit area of the metal film 213c.

In the semitransparent reflecting film M, when the area of each opening m is large, the portion of the opening m is viewed as a black point when light obtained by reflecting light incident from the front surface side is observed. In addition, the portion of the opening m is viewed as a bright point when light obtained by transmitting light incident from the rear surface side is observed. For this reason, in order to prevent such black and bright points from being conspicuous, the width of each opening m is desirably set to be about 3 μm or less, and a desirable transmittance is obtained by controlling the number of openings m.

The pixel electrodes 213 are formed by forming one of the semitransparent reflecting films M according to the first to fourth examples on the rear substrate 11 and patterning the semitransparent reflecting film M by a photolithography method. Note that, when the pixel electrodes are to be formed by the semitransparent reflecting film M shown in FIGS. 28 and 29, formation of the openings in the metal film 213c and patterning for the pixel electrodes 213 can be performed at once.

As shown in FIG. 25, on the inner surface, i.e., the surface opposing the liquid crystal layer, of the front substrate 12 of the liquid crystal cell 10, a plurality of transparent counter electrodes 20 respectively opposing the pixel electrodes 113 of each column arranged on the rear substrate 11 are arranged. A transparent aligning film 21 is arranged on the counter electrodes 20. Note that each counter electrode 20 is constituted by a transparent conductive film such as an ITO film.

Black masks 60 corresponding to the gaps between the respectice pixel electrodes 213 arranged on the rear substrate 11 are arranged on the inner surface of the front substrate 12, and the blacks 60 are covered with the aligning film 21.

The black mask 60 are formed into a matrix pattern corresponding to the gaps between the rows and columns of the respective pixel electrodes 213 arranged on the rear substrate 11. This black mask 60 is formed to have vertical and lateral side portions opposes an edge portion of the pixel electrode 213 with a small overlapping width.

note that each MIM 14 arranged on the rear substrate 11 is present in a portion between the corresponding pixel electrodes 213. Therefore, the black masks 60 also oppose the MIMs 14 to entirely cover them.

The rear and front substrates 11 and 12 are joined to each other at their outer peripheral portions via a frame-like seal member (not shown), and a liquid crystal LC is filled in the area surrounded by the seal member between the substrates 11 and 12.

The rear polarizing plate 131 adheres to the rear surface (outer surface of the rear substrate 11) of the liquid crystal cell 10.

The light source 70 is constituted by a light-guide plate 71 opposing the entire rear surface of the rear polarizing plate 131 and a light source lamp 72, arranged to oppose one end face of the light-guide plate 71, for emitting white light.

As shown in FIG. 25, the light-guide plate 71 is obtained such that a reflecting film 71a constituted by a deposition film such as an Al film is formed on the entire rear surface of a transparent plate consisting of an acrylic resin or the like. Illumination light from the light source lamp 72 is incident on the light-guide plate 71 from one end face thereof, guided in the light-guide plate 71, and emerges from the entire front surface of the light-guide plate 71 to the liquid crystal cell 10.

In the liquid crystal display device of this embodiment, the front polarizing plate 130 is arranged such that its transmission axis is obliquely shifted by a predetermined angle with respect to a liquid crystal molecule aligning direction (rubbing direction of the aligning film 21) on the front substrate 12 of the liquid crystal cell 10, and the retardation plate 50 is arranged such that its phase delay axis (stretching axis) is obliquely shifted by a predetermined angle with respect to the transmission axis of the front polarizing plate 130. The rear polarizing plate 131 is arranged such that its transmission axis is obliquely shifted by a predetermined angle with respect to a liquid crystal molecule aligning direction (rubbing direction of the aligning film 19) on the rear substrate 11 of the liquid crystal cell 10.

Note that, in this embodiment, the liquid crystal molecule aligning direction on the rear substrate 11 of the liquid crystal cell 10 is defined as a direction at an azimuth of 0°, and the liquid crystal molecule aligning direction on the front substrate 12 of the liquid crystal cell 10, the directions of the transmission axes of the polarizing plates 130 and 131, and the direction of the phase delay axis of the retardation plate 50 are set with reference to the direction at the azimuth of 0°.

Figure 32A:
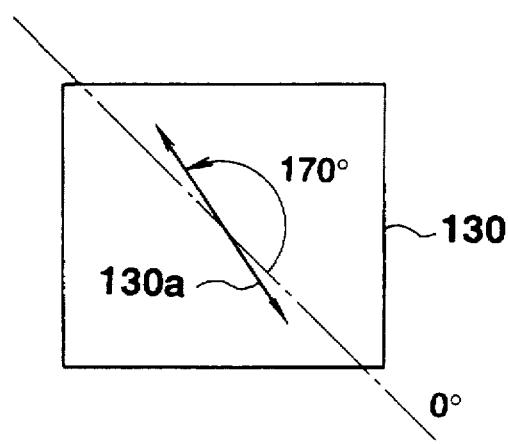
FIGS. 32A, 32B, 32C, and 32D are plan views respectively showing the direction of the transmission axis of a front polarizing plate, the direction of the phase delay axis of a retardation plate, the molecule aligning film direction of a liquid crystal layer, and the direction of the transmission axis of a rear polarizing plate, in the color liquid crystal display device in FIG. 25.
Figure 32B:
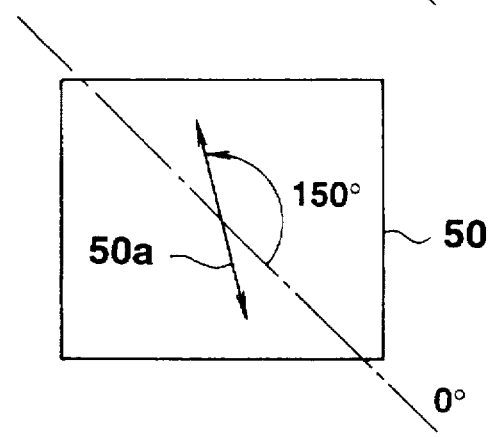
Figure 32C:
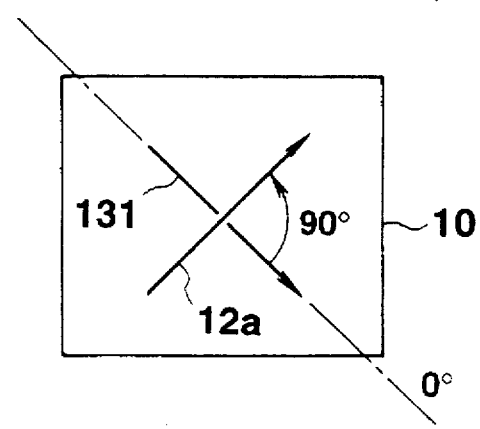

More specifically, FIGS. 32A to 32D are plan views respectively showing the direction of the transmission axis 13a of the front polarizing plate 130, the direction of the phase delay axis 50a of the retardation plate 50, the liquid crystal molecule aligning directions of the liquid crystal cell 10, and the direction of the transmission axis 131a of the rear polarizing plate 131 in the liquid crystal display device. Referring to FIG. 32C, reference numeral 11a denotes a liquid crystal molecule aligning direction on the rear substrate 11 of the liquid crystal cell 10; and 12a, a liquid crystal molecule aligning direction on the front substrate 12 of the liquid crystal cell 10.

As shown in FIG. 32C, the liquid crystal molecule aligning direction 12a on the front substrate 12 of the liquid crystal cell 10 is shifted counterclockwise by almost 90° with respect to the liquid crystal molecule aligning direction 11a on the rear substrate 11, i.e., the direction at the azimuth of 0°, when viewed from the front surface side of the liquid crystal display device, and the liquid crystal molecules of the liquid crystal LC are twisted/aligned between both the substrates 11 and 12 at a twist angle of almost 90°.

Referring to FIG. 32A, reference numeral 130a denotes a transmission axis of the front polarizing plate 130. Referring to FIG. 32B, reference numeral 50a denotes a phase delay axis of the retardation plate 50. The transmission axis 130a of the front polarizing plate 130 is shifted counterclockwise by almost 170° with respect to the direction at the azimuth of 0° when viewed from the front surface side of the liquid crystal display device and the phase delay axis 50a of the retardation plate 50 is shifted counterclockwise by almost 150° with respect to the azimuth of 0° when viewed from the front surface side. Therefore, the phase delay axis 50a of the retardation plate 50 is obliquely shifted clockwise by almost 20° with respect to the transmission axis 130a of the front polarizing plate 130 when viewed from the front surface side.

Figure 32D:
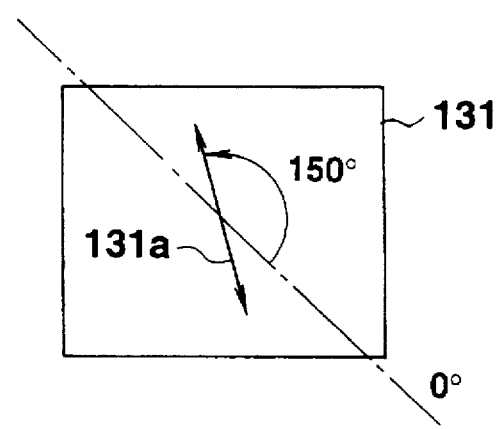

Referring to FIG. 32D, reference numeral 131a denotes a transmission axis of the rear polarizing plate 131. The transmission axis 131a of the rear polarizing plate 131 is shifted counterclockwise by almost 150° with respect to the direction at the azimuth of 0° when viewed from the front surface side.

In a bright place where an amount of external light (natural light, indoor illumination light, or the like) is sufficiently large, this liquid crystal display device performs a display operation using the external light. In this case, as indicated by a solid arrow in FIG. 25, external light incident on the liquid crystal display device from its front surface side is linearly polarized by the polarizing action of the front polarizing plate 130, and the linearly polarized light is incident on the liquid crystal cell 10. At the same time, light transmitted through the liquid crystal layer is incident on the semitransparent reflecting film M (pixel electrodes 213) arranged on the inner surface of the rear substrate 11 of the liquid crystal cell 10, and light reflected by the semitransparent reflecting film M is transmitted through the liquid crystal layer again to be incident on the front polarizing plate 130. The light transmitted through the front polarizing plate 130 emerges as image light from the front surface side of the liquid crystal display device.

In a dark place where an amount of external light is small, the liquid crystal display device can perform a display operation by using light from the light source 70. In this case, as indicated by a broken line in FIG. 25, light from the light source 70 is linearly polarized by the polarizing action of the rear polarizing plate 131, and the linearly polarized light is incident on the liquid crystal cell 10. Light transmitted through the semitransparent reflecting film M (pixel electrodes 213) arranged on the inner surface of the rear substrate 11 passes through the liquid crystal layer to be incident on the front polarizing plate 130. The light transmitted through the front polarizing plate 130 emerges as image light from the front surface side of the liquid crystal display device.

More specifically, in the liquid crystal display device, the semitransparent reflecting film M is arranged on the inner surface of the rear substrate 11 of the liquid crystal cell 10. For this reason, in a reflection type display operation using external light, by using a polarizing action for linearly polarizing light incident on the front polarizing plate 130 arranged on the front surface side of the liquid crystal cell 10 and an analyzing action for changing light passing through the liquid crystal layer of the liquid crystal cell 10 into image light, a display operation is performed without using the rear polarizing plate 131 arranged on the rear surface side of the liquid crystal cell 10. In a transmission type display operation using light from the light source 70, a display operation is performed by respectively using the rear polarizing plate 131 and the front polarizing plate 130 as a polarizer and an analyzer.

The display operation of the liquid crystal display device will be described below as a reflection type display operation using external light. In the liquid crystal display device, the transmission axis 130a of the front polarizing plate 130 is obliquely shifted with respect to the liquid crystal molecule aligning direction 12a on the front substrate 12 of the liquid crystal cell 10, and the phase delay axis 50a of the retardation plate 50 is obliquely shifted with respect to the transmission axis 130a of the front polarizing plate 130. For this reason, while linearly polarized light incident through the front polarizing plate 130 passes through the retardation plate 50, the linearly polarized light is polarized by the birefringence effect of the retardation plate 50 into elliptically polarized light components whose polarized states are different from each other at respective wavelengths. While, of the elliptically polarized light components, light having a light component reflected by the semitransparent reflecting film passes through the liquid crystal layer and the retardation plate 50 again, the polarized state of the light is further changed by the birefringence effects of the liquid crystal layer and the retardation plate 50, and the light is incident on the front polarizing plate 130.

The reflected light incident on the polarizing plate 130 is nonlinearly polarized light whose polarized state is changed by the birefringence effects of the retardation plate 50 and the liquid crystal layer of the liquid crystal cell 10. For this reason, of the light, only light having a light component transmitted through the polarizing plate 130 is transmitted through the polarized plate 130 and emerges, and colored light corresponding to the light amount ratio of respective wavelength light components of the exit light can be obtained.

A display operation using light from the light source 70 will be described below. In this case, light from the light source 70 is linearly polarized through the rear polarizing plate 131, and the linearly polarized light is incident on the liquid crystal cell 10 from its front surface side. Of the light, light transmitted through the semitransparent reflecting film M arranged on the inner surface of the rear substrate 11 of the liquid crystal cell 10 is incident on the liquid crystal layer. In the liquid crystal display device, the transmission axis 131a of the rear polarizing plate 131 is obliquely shifted with respect to the liquid crystal molecule aligning direction 11a on the rear substrate 11 of the liquid crystal cell 10. For this reason, while the linearly polarized light incident on the liquid crystal cell 10 from its rear surface side passes through the liquid crystal layer of the liquid crystal cell 10, the linearly polarized light is polarized by the birefringence effect of the liquid crystal layer into elliptically polarized light components whose polarized states are different from each other at respective wavelengths. In the process of passage of the elliptically polarized light components through the retardation plate 50, the polarized states of the elliptically polarized light components are further changed by the birefringence effect of the retardation plate 50, and the elliptically polarized light components are incident on the front polarizing plate 130.

In this case, the light incident on the polarizing plate 130 is nonlinearly polarized light whose polarized state is changed by the birefringence effects of the retardation plate 50 and the liquid crystal layer of the liquid crystal cell 10. For this reason, of the light, only light having a light component transmitted through the polarizing plate 130 emerges through the polarizing plate 130, and colored light corresponding to the light amount ratio of the wavelength light of the exit light can be obtained.

More specifically, in the reflection type display operation, the liquid crystal display device colors light by using the birefringence effects of the retardation plate 50 and the liquid crystal layer of the liquid crystal cell 10 and the polarizing and analyzing actions of the front polarizing plate 130. In the transmission type display operation, the liquid crystal display device colors light by using the birefringence effects of the liquid crystal layer and the retardation plate 50 of the liquid crystal cell 10, the polarizing action of the rear polarizing plate 131, and the analyzing action of the rear polarizing plate 131.

The liquid crystal display device colors light without using a color filter. For this reason, the loss of a transmitted light amount can be considerably smaller than that in a case wherein light is transmitted through a color filter, and colored light having a high luminance can be obtained. Therefore, a bright color image can be displayed.

In the reflection type display operation using external light, the display color of each pixel is changed to red, blue, green, black, and white in accordance with a voltage applied to the liquid crystal cell 10. In the transmission type display operation using light from the light source 70, the display color of each pixel is changed to red, green, blue, and white in accordance with a voltage applied to the liquid crystal cell 10.

Figure 33:
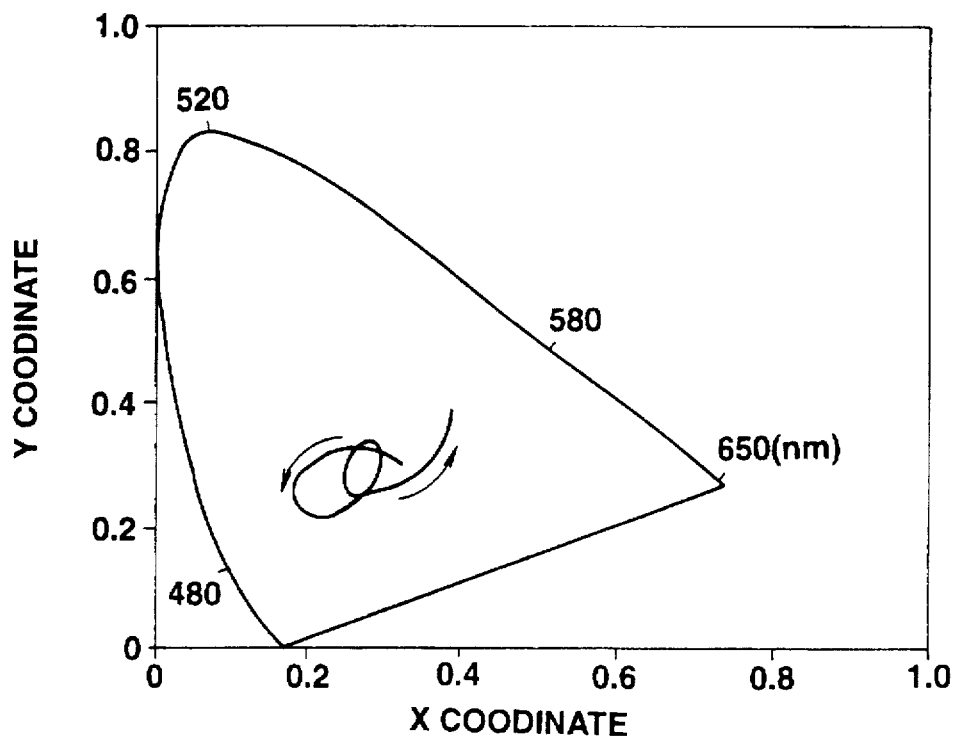
FIG. 33 is a CIE chromaticity diagram showing a change in display color of reflected light with respect to a voltage applied to the color liquid crystal display device shown in FIG. 25.
Figure 34:
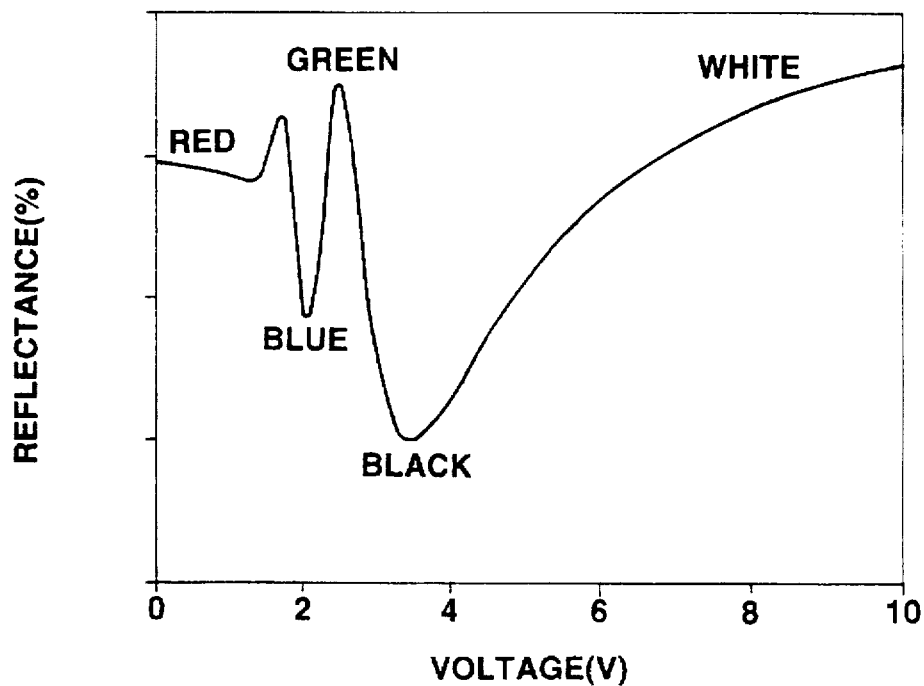
FIG. 34 is a graph showing voltage-reflectance characteristics showing a change in reflectance with respect to a voltage applied to the color liquid crystal display device shown in FIG. 25.

FIGS. 33 and 34 show a change in display color of the liquid crystal display device in the reflection type display operation. FIG. 33 is a CIE chromaticity diagram showing a change in color of reflected light with respect to an applied voltage, and FIG. 34 is a graph showing voltage-reflectance characteristics. Note that FIGS. 33 and 34 show results obtained by observing exit light, obtained by causing white light to be incident on the liquid crystal display device in a direction shifted by 30° (an arbitrary azimuth) with respect to the normal of the liquid crystal display device, from the direction of the normal of the liquid crystal display device.

In the reflection type display operation, as the value of a voltage applied between the electrodes 213 and 20 of the liquid crystal cell 10 is increased, the color of the reflected light changes in the direction of an arrow as shown in FIG. 33. In the process of change in the color, as shown in FIG. 34, reflected light becomes red, blue, green, black, and white each having a high light intensity and a high chromaticity purity.

In this manner, during the reflection type display operation using external light, in the liquid crystal display device, red, blue, green, black, and white can be displayed by one pixel. In addition, when different colors are displayed by a plurality of adjacent pixels, a color obtained by mixing a plurality of colors of red, blue, green, black, and white can be displayed.

Figure 35:
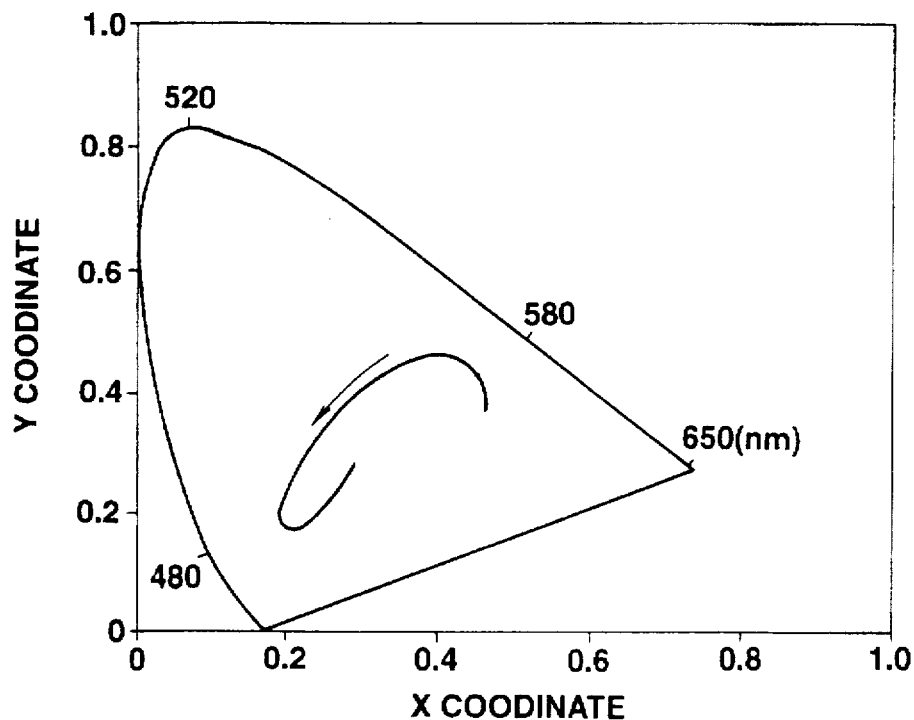
FIG. 35 is a CIE chromaticity diagram showing a change in display color of transmitted light with respect to a voltage applied to the color liquid crystal display device shown in FIG. 25.
Figure 36:
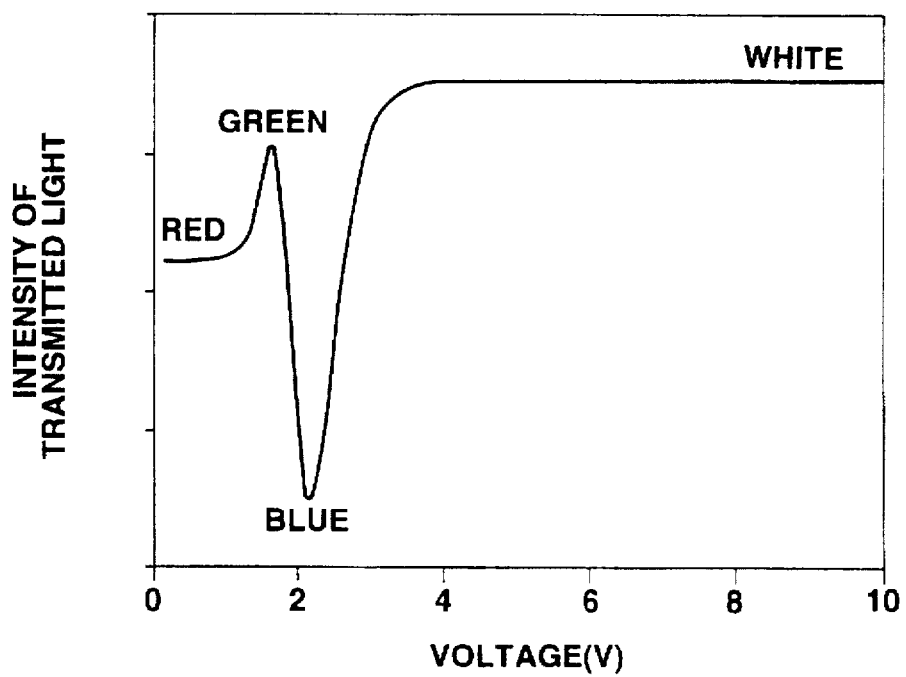
FIG. 36 is a graph showing voltage-transmitted light intensity characteristics showing a change in color of transmitted light with respect to a voltage applied to the color liquid crystal display device shown in FIG. 25.

FIGS. 35 and 36 show a change in display color of the liquid crystal display device in the transmission type display operation. FIG. 35 is a CIE chromaticity diagram showing a change in color of transmitted light with respect to an applied voltage, and FIG. 36 is a graph showing voltage-transmitted light intensity characteristics. Note that FIGS. 35 and 36 show results obtained by observing exit light, obtained by causing white light to be incident on the liquid crystal display device in a direction shifted by 30° (an arbitrary azimuth) with respect to the normal of the liquid crystal display device, from the direction of the normal of the liquid crystal display device.

In the transmission type display operation of the liquid crystal display device, as the value of a voltage applied between the electrodes 213 and 20 of the liquid crystal cell 10 is increased, the color of the transmitted light changes in the direction of an arrow as shown in FIG. 35. In the process of change in the color, as shown in FIG. 36, reflected light becomes red, green, blue, and white each having a high light intensity and a high chromaticity purity.

In this manner, during the transmission type display operation using light from the light source 70, in the liquid crystal display device, red, green, blue, and white can be displayed by one pixel. In addition, when different colors are displayed by a plurality of adjacent pixels, a color obtained by mixing a plurality of colors of red, green, blue, and white can be displayed.

The display colors and the number of colors corresponding to an applied voltage in the reflection type display operation are different from those in the transmission type display operation. For this reason, in the reflection type display operation, as in the transmission type display operation, when the liquid crystal cell 10 is driven, a color image having a color different from that of a color image in the transmission type display operation is displayed. However, the drive conditions (the potential and the like of a data signal corresponding to image data) of the liquid crystal cell 10 are controlled in the reflection type display operation, a color image having a color close to the color of the color image in the transmission type display operation can be displayed in the reflection type display operation.

However, the liquid crystal display device described above is used as a reflection type display device using external light in many cases, and the liquid crystal display device is used as a reflection type display device by turning on the light source 70 when display information is to be temporarily seen in a dark place where an amount of external light is small. For this reason, a difference between the color of a display image in the transmission type display operation and the color of a display image in the reflection type display operation rarely poses a serious problem. Therefore, the drive conditions of the liquid crystal cell 10 may be designed with reference to the conditions in the transmission type display operation, and, in the reflection type drive operation, the liquid crystal cell 10 may be driven under the same drive conditions as those in the transmission type drive operation.

In the liquid crystal display device described above, the semitransparent reflecting film M is arranged on the inner surface of the rear substrate 11 of the liquid crystal cell 10, and, in the reflection type display operation using external light, an image is displayed by using both the polarizing and analyzing actions of the front polarizing plate 130 without using the rear polarizing plate 131. For this reason, light amount loss owing to light absorption of the polarizing plates and the substrates of the liquid crystal cell in the reflection type display operation using external light can be reduced, and a sufficiently bright display can be obtained in the reflection type display operation.

In the liquid crystal display device described above, of the pixel electrodes 213 and the counter electrodes 20 respectively arranged on the inner surfaces of both the substrates 11 and 12 of the liquid crystal cell 10, the pixel electrodes 213 also serve as the semitransparent reflecting film M. For this reason, since the pixel electrodes 213 and the semitransparent reflecting film M can be formed at once, the structure of the liquid crystal cell 10 can be simplified, and the liquid crystal cell 10 can be easily manufactured.

In the liquid crystal display device, the black masks 60 corresponding to the gaps between the corresponding pixel electrodes 213 arranged on the rear substrate 11 of the liquid crystal cell 10 are arranged on the inner surface of the front substrate 12 of the liquid crystal cell 10, the contrast between the respective pixels can be made higher, and a high-quality image can be displayed.

11th Embodiment

In the 10th embodiment described above, a liquid crystal cell obtained by arranging the pixel electrodes 213 and the MIMs 14 on the inner surface of the rear substrate 11 and arranging the counter electrodes 20 on the inner surface of the front substrate 12 is used as the liquid crystal cell 10. However, a liquid crystal cell obtained by arranging the pixel electrodes 213 and the MIMs 14 on the inner surface of the front substrate 12 and arranging the counter electrodes 20 on the inner surface of the rear substrate 11 may be used as the liquid crystal cell 10.

Figure 37:
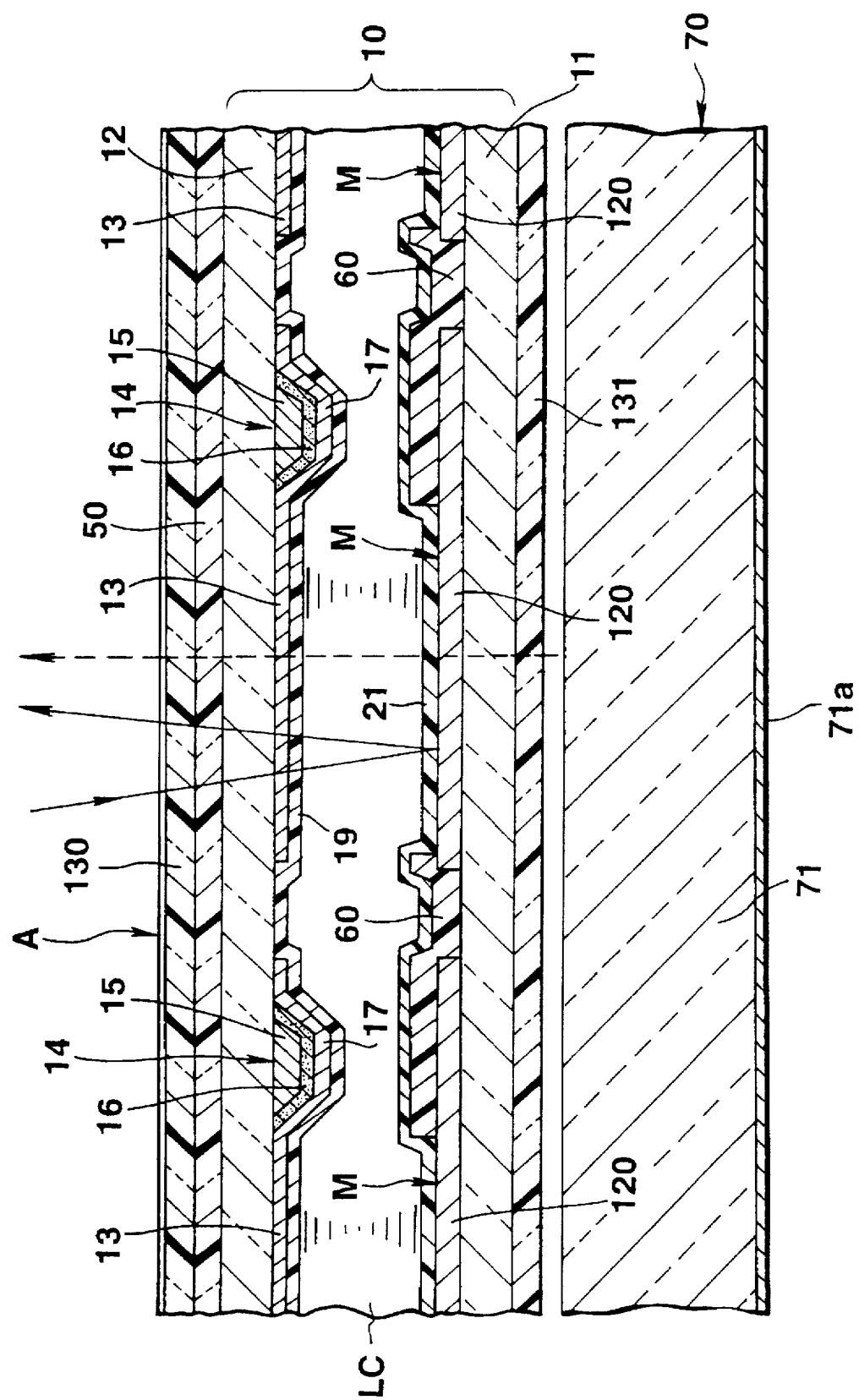
FIG. 37 is a sectional view showing part of a color liquid crystal display device according to the 11th embodiment of the present invention.

FIG. 37 is a sectional view showing part of a liquid crystal display device according to the 11th embodiment of the present invention. In this embodiment, pixel electrodes 13 and MIMs 14 are arranged on the inner surface of a front substrate 12 of a liquid crystal cell 10, and counter electrodes 120 are arranged on the inner surface of a rear substrate 11. The counter electrodes 120 arranged on the inner surface of the rear substrate 11 are also used as a semitransparent reflecting film M.

In the liquid crystal display device of this embodiment, the pixel electrodes 213 (13), the MIMs 14, and the aligning film 19 which are arranged on the rear substrate 11 of the liquid crystal cell 10 in the 10th embodiment are arranged on the front substrate 12, and the pixel electrodes 13 are constituted by transparent electrodes. In the liquid crystal display device of the 11th embodiment, the counter electrodes 20 (120), the aligning film 21, and the black masks 60 which are arranged on the front substrate 12 of the liquid crystal cell 10 in the 10th embodiment are arranged on the rear substrate 11, and the counter electrodes 120 are also used as semitransparent reflecting films M. Since the arrangement of the 10th embodiment is the same as those of the 11th embodiment, the same reference numerals as in the 10th embodiment denote the same parts in the 11th embodiment, and a description thereof will be omitted.

In the liquid crystal display device of this embodiment, the semitransparent reflecting films M are arranged on the inner surface of the rear substrate 11 of the liquid crystal cell 10, and, in the reflection type display operation using external light, an image is displayed by using both the polarizing and analyzing actions of a front polarizing plate 130 without using a rear polarizing plate 131. Light is colored by using the birefringence effects of a retardation plate 50 and the liquid crystal layer of the liquid crystal cell 10 and the polarizing and analyzing actions of the polarizing plates (the front polarizing plate 130 in a reflection type display operation, and the rear polarizing plate 131 and the front polarizing plate 130 in a transmission type display operation). Since the same effects as those of the 10th embodiment are obtained in the 11th embodiment, a description thereof will be omitted.

In the 10th or 11th embodiment, the black masks 60 are arranged on a substrate (the front substrate 12 in the 10th embodiment and the rear substrate 11 in the 11th embodiment), on which the counter electrodes 20 or 120 are arranged, of both the substrates 11 and 12 of the liquid crystal cell 10. However, the black masks 60 may be arranged on the inner surface of the substrate on which the pixel electrodes 13 or 213 and the MIMs 14 are arranged. However, the black masks 60 are not necessarily required.

In each of the liquid crystal display devices of the 10th and 11th embodiments, although the retardation plate 50 is arranged between the front polarizing plate 130 and the liquid crystal cell 10, the retardation plate 50 is not necessarily required.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A color liquid crystal display device comprising:
   a first substrate having an inner surface on which a plurality of pixel electrodes arranged in the form of a matrix, to said pixel electrodes and each having one terminal connected to a corresponding one of said pixel electrodes and another terminal applied with a signal voltage, and a first aligning film covering said pixel electrodes and said nonlinear resistor elements are arranged;
   a second substrate arranged to oppose said first substrate and having an inner surface on which counter electrodes, arranged to oppose said plurality of pixel electrodes, for forming a plurality of pixels in areas opposing said pixel electrodes and a second aligning film covering said pixel and counter electrodes are arranged;
   a liquid crystal layer sandwiched between said first and second substrates and having an initial aligned state in which liquid crystal molecules are aligned in a predetermined direction by said first and second aligning films;
   a first polarizing member arranged on an outer side of at least a light incident substrate of said first and second substrates such that a polarization axis of said first polarizing member crosses an aligning direction of liquid crystal molecules adjacent to said first or second aligning film on the substrate side at an angle other than a right angle;
   a semitransparent reflecting member, arranged on a side of the inner surface of one of said first and second substrates which opposes said light incident substrate, for reflecting part of light incident from said first polarizing member and transmitted through said liquid crystal layer and causing another part of the incident light to transmit through said semitransparent reflecting member; and
   a second polarizing member arranged on an outer side of said semitransparent reflecting member;
   and wherein said first and second polarizing members are arranged on an outer side of said first and second substrates so that light transmitted through the polarizing members becomes light colored with a color corresponding to a ratio of light amounts of wavelength light components by controlling birefringence effects of said liquid crystal layer corresponding to a voltage applied between said pixel electrodes and said counter electrodes.

2. A device according to claim 1, wherein:
   said plurality of pixel electrodes or said plurality of counter electrodes have metal films in each of which a large number of small light-transmitting holes are formed, and have a function of said semitransparent reflecting member, and
   said polarizing member arranged on an exit side comprises a light-scattering film on a surface thereof, said light-scattering film serving to scatter light transmitted therethrough.

3. A device according to claim 1, wherein:
   said plurality of pixel electrodes of said first substrate have metal films, in each of which a large number of small light-transmitting holes are formed, and have a function of said semitransparent reflecting member, and
   said counter electrodes of said second substrate have transparent conductive films and form a first optical path in which light incident from said second substrate is transmitted through said liquid crystal layer, reflected by said pixel electrodes to return, and transmitted through said liquid crystal layer again to emerge from said second substrate and form a second optical path in which light incident from said first substrate is transmitted through said pixel electrodes and said liquid crystal layer to emerge from said second substrate.

4. A device according to claim 1, wherein:
   said plurality of counter electrodes of said second substrate have metal films, in each of which a large number of small light-transmitting holes are formed, and have a function of said semitransparent reflecting member, and
   said pixel electrodes of said first substrate have transparent conductive films and form a first optical path in which light incident from said first substrate is transmitted through said liquid crystal layer, reflected by said counter electrodes to return, and transmitted through said liquid crystal layer again to emerge from said first substrate and form a second optical path in which light incident from said second substrate is transmitted through said counter electrodes and said liquid crystal layer to emerge from said first substrate.

5. A device according to claim 1, further comprising light-shielding members, arranged on a side of the inner surface of one of said first and second substrates, for preventing leakage of light between said plurality of pixels.

6. A device according to claim 1, further comprising at least one retardation plate arranged between said polarizing member arranged on an exit side and the substrate, adjacent to said exit-side polarizing member, of said first and second substrates such that an optical axis of said at least one retardation plate crosses a direction of an optical axis of said exit-side polarizing member at an angle other than a right angle.

7. A color liquid crystal display device comprising:

a first substrate having an inner surface on which a plurality of pixel electrodes arranged in the form of a matrix, two-terminal nonlinear resistor elements arranged to correspond to said pixel electrodes and each having one terminal connected to a corresponding one of said pixel electrodes and another terminal applied with a signal voltage, and a first aligning film covering said pixel electrodes and said nonlinear resistor elements are arranged;

a second substrate arranged to oppose said first substrate and having an inner surface on which counter electrodes, arranged to oppose said plurality of pixel electrodes, for forming a plurality of pixels in areas opposing said pixel electrodes and a second aligning film covering said pixel and counter electrodes are arranged;

a liquid crystal layer sandwiched between said first and second substrates and having an initial aligned state in which liquid crystal molecules are aligned in a predetermined direction by said first and second aligning films;

a first polarizing member arranged on an outer side of at least a light incident substrate of said first and second substrates such that a polarization axis of said first polarizing member crosses an aligning direction of liquid crystal molecules adjacent to said first or second aligning film on the substrate side at an angle other than a right angle;

a semitransparent reflecting member, arranged on the substrate side opposing said light incident substrate of said first and second substrates, for reflecting part of light incident from said first polarizing member and transmitted through said liquid crystal layer and causing another part of the incident light to transmit through said semitransparent reflecting member; and a second polarizing member arranged on an outer side of said semitransparent reflecting member;

and wherein:

said plurality of pixel electrodes or said plurality of counter electrodes have metal films in each of which a large number of small light-transmitting holes are formed, and have a function of said semitransparent reflecting member, and said polarizing member arranged on an exit side comprises a light-scattering film on a surface thereof, said light-scattering film serving to scatter light transmitted therethrough.

8. A color liquid crystal display device comprising:

a first substrate having an inner surface on which a plurality of pixel electrodes arranged in the form of a matrix, two-terminal nonlinear resistor elements arranged to correspond to said pixel electrodes and each having one terminal connected to a corresponding one of said pixel electrodes and another terminal applied with a signal voltage, and a first aligning film covering said pixel electrodes and said nonlinear resistor elements are arranged;

a second substrate arranged to oppose said first substrate and having an inner surface on which counter electrodes, arranged to oppose said plurality of pixel electrodes, for forming a plurality of pixels in areas opposing said pixel electrodes and a second aligning film covering said pixel and counter electrodes are arranged;

a liquid crystal layer sandwiched between said first and second substrates and having an initial aligned state in which liquid crystal molecules are aligned in a predetermined direction by said first and second aligning films;

a first polarizing member arranged on an outer side of at least a light incident substrate of said first and second substrates such that a polarization axis of said first polarizing member crosses an aligning direction of liquid crystal molecules adjacent to said first or second aligning film on the substrate side at an angle other than a right angle;

a semitransparent reflecting member, arranged on the substrate side opposing said light incident substrate of said first and second substrates, for reflecting part of light incident from said first polarizing member and transmitted through said liquid crystal layer and causing another part of the incident light to transmit through said semitransparent reflecting member; and a second polarizing member arranged on an outer side of said semitransparent reflecting member;

and wherein:

said plurality of pixel electrodes of said first substrate have metal films, in each of which a large number of small light-transmitting holes are formed, and have a function of said semitransparent reflecting member, and said counter electrodes of said second substrate have transparent conductive films and form a first optical path in which light incident from said second substrate is transmitted through said liquid crystal layer, reflected by said pixel electrodes to return, and transmitted through said liquid crystal layer again to emerge from said second substrate and form a second optical path in which light incident from said first substrate is transmitted through said pixel electrodes and said liquid crystal layer to emerge from said second substrate.

9. A color liquid crystal display device comprising:

a first substrate having an inner surface on which a plurality of pixel electrodes arranged in the form of a matrix, two-terminal nonlinear resistor elements arranged to correspond to said pixel electrodes and each having one terminal connected to a corresponding one of said pixel electrodes and another terminal applied with a signal voltage, and a first aligning film covering said pixel electrodes and said nonlinear resistor elements are arranged;

a second substrate arranged to oppose said first substrate and having an inner surface on which counter electrodes, arranged to oppose said plurality of pixel electrodes, for forming a plurality of pixels in areas opposing said pixel electrodes and a second aligning film covering said pixel and counter electrodes are arranged;

a liquid crystal layer sandwiched between said first and second substrates and having an initial aligned state in which liquid crystal molecules are aligned in a predetermined direction by said first and second aligning films;

a first polarizing member arranged on an outer side of at least a light incident substrate of said first and second substrates such that a polarization axis of said first polarizing member crosses an aligning direction of liquid crystal molecules adjacent to said first or second aligning film on the substrate side at an angle other than a right angle;

a semitransparent reflecting member, arranged on the substrate side opposing said light incident substrate of said first and second substrates, for reflecting part of light incident from said first polarizing member and transmitted through said liquid crystal layer and causing another part of the incident light to transmit through said semitransparent reflecting member; and a second polarizing member arranged on an outer side of said semitransparent reflecting member;

and wherein:

said plurality of counter electrodes of said second substrate have metal films, in each of which a large number of small light-transmitting holes are formed, and have a function of said semitransparent reflecting member, and said pixel electrodes of said first substrate have transparent conductive films and form a first optical path in which light incident from said first substrate is transmitted through said liquid crystal layer, reflected by said counter electrodes to return, and transmitted through said liquid crystal layer again to emerge from said first substrate and form a second optical path in which light incident from said second substrate is transmitted through said counter electrodes and said liquid crystal layer to emerge from said first substrate.

* * * * *